US012769423B2

(12) United States Patent
Kim et al.

(10) Patent No.: US 12,769,423 B2
(45) Date of Patent: Oct. 20, 2026

(54) TOUCH DISPLAY DEVICE AND TOUCH DRIVING CIRCUIT

(71) Applicant: LG Display Co., Ltd., Seoul (KR)

(72) Inventors: HoonBae Kim, Paju-si (KR); NamYong Gong, Paju-si (KR); SungChul Kim, Paju-si (KR); SunYeop Kim, Paju-si (KR); SungYub Lee, Paju-si (KR); Jongsung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 15 days.

(21) Appl. No.: 18/950,978

(22) Filed: Nov. 18, 2024

(65) Prior Publication Data

US 2025/0208732 A1 Jun. 26, 2025

(30) Foreign Application Priority Data

Dec. 26, 2023 (KR) ........................ 10-2023-0191655

(51) Int. Cl.
*G06F 3/041* (2006.01)
*G06F 3/044* (2006.01)

(52) U.S. Cl.
CPC ...... *G06F 3/041662* (2019.05); *G06F 3/0412* (2013.01); *G06F 3/0446* (2019.05); *G06F 2203/04108* (2013.01)

(58) Field of Classification Search
CPC ..... G06F 3/041662; G06F 2203/04108; G06F 3/04166; G06F 3/0446
See application file for complete search history.

(56) References Cited

U.S. PATENT DOCUMENTS

2015/0338964 A1* 11/2015 King .................. G06F 3/04166 345/174
2017/0199611 A1* 7/2017 Brunet .................. G06F 3/0445
2024/0028151 A1* 1/2024 Lin .................. G06F 3/041662
2024/0310947 A1* 9/2024 Chen .................. G06F 3/04166

* cited by examiner

*Primary Examiner* — Robin J Mishler
(74) *Attorney, Agent, or Firm* — Fenwick & West LLP

(57) ABSTRACT

Embodiments of the present disclosure are related to a touch display device and a touch driving circuit. In the touch display device, a touch sensing mode period may include a first touch sensing mode period in which a first touch driving signal having a first amplitude is applied to the touch sensor, and a second touch sensing mode period in which a second touch driving signal having a second amplitude greater than the first amplitude is applied to the touch sensor. During the second touch sensing mode period, the touch driving circuit may supply the second touch driving signal to a part of the touch sensor and supply an auxiliary driving signal to another part of the touch sensor.

19 Claims, 30 Drawing Sheets

| | | | | |
|---|---|---|---|---|
| VSYNC | LV1 | LV1 | LV2 | LV2 |
| HOVER_EN | LV3 | LV4 | LV3 | LV4 |
| Operating mode | Touch sensing mode | | Display Mode | - |
| | First touch sensing mode | Second touch sensing mode | | |

TOUCH DISPLAY DEVICE AND TOUCH DRIVING CIRCUIT

CROSS REFERENCE TO RELATED APPLICATION

This application claims priority from Republic of Korea Patent Application No. 10-2023-0191655, filed on Dec. 26, 2023, which is hereby incorporated by reference in its entirety.

TECHNICAL FIELD

Embodiments of the present disclosure relate to a touch display device and a touch driving circuit.

BACKGROUND

Recently, a touch display device has been developed that is capable of detecting touch by a user's finger or pen to provide touch-based input processing functions.

In order for these touch display devices to provide more diverse application functions, there is a demand for various forms of touch sensing. For example, a wearable device may require not only a function to sense contact touch in the form of a user touching the screen, but also a function to sense non-contact touch (e.g., hover touch) in the form of a user not touching the screen.

SUMMARY

Embodiments of the present disclosure may provide a touch display device and a touch driving circuit capable of supporting various touch sensing modes.

Embodiments of the present disclosure may provide a touch display device and a touch driving circuit capable of efficiently sensing contact touch and non-contact touch.

Embodiments of the present disclosure may provide a touch display device and a touch driving circuit capable of effectively and quickly sensing non-contact touch.

Embodiments of the present disclosure may provide a touch display device and a touch driving circuit capable of efficiently supporting a display mode, a contact touch sensing mode, and a hover touch sensing mode.

Embodiments of the present disclosure may provide a touch display device and a touch driving circuit capable of preventing or at least reducing unwanted parasitic capacitance from occurring when sensing non-contact touch.

Embodiments of the present disclosure may provide a touch display device and a touch driving circuit capable of efficiently driving a non-sensing touch electrode when sensing non-contact touch.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A touch display device according to embodiments of the present disclosure may include a touch sensor including a plurality of first touch electrodes and a plurality of second touch electrodes, and a touch driving circuit configured to supply a touch driving signal to the touch sensor during a touch sensing mode period.

The touch sensing mode period may include a first touch sensing mode period in which a first touch driving signal is applied to the touch sensor as the touch driving signal, and a second touch sensing mode period in which a second touch driving signal is applied to the touch sensor as the touch driving signal, During the second touch sensing mode period, the touch driving circuit may supply the second touch driving signal to a part of the touch sensor, and may supply an auxiliary driving signal to another part of the touch sensor.

The touch driving circuit may output an external auxiliary driving signal input from the outside as the auxiliary driving signal. In this case, the external auxiliary driving signal and the second touch driving signal may have the same phase.

The touch driving circuit may generate an internal auxiliary driving signal based on a reference driving signal input from the outside and output the internal auxiliary driving signal as the auxiliary driving signal. In this case, the internal auxiliary driving signal and the second touch driving signal may have the same phase.

During the first touch sensing mode period, the plurality of first touch electrodes may be electrically separated, and the plurality of second touch electrodes may be electrically separated.

During the second touch sensing mode period, two or more first touch electrodes among the plurality of first touch electrodes may be electrically connected to each other, or two or more second touch electrodes among the plurality of second touch electrodes may be electrically connected to each other.

The first touch sensing mode period may be a contact mode period for sensing a contact touch that has contacted a screen, and the second touch sensing mode period may be a hover mode period for sensing a non-contact touch that has not contacted the screen. The first touch driving signal may include first pulses having a first amplitude during the first touch sensing mode period, and the second touch driving signal may include second pulses having a second amplitude during the second touch sensing mode period. In this case, the second amplitude may be different from the first amplitude, or the number of the second pulses may be different from the number of the first pulses.

The second amplitude may be greater may be greater than the number of the first pulses.

The second touch sensing mode period may include: a first sub-sensing period in which the second touch driving signal is simultaneously applied to two or more first touch electrodes which are electrically connected to each other among the plurality of first touch electrodes; and a second sub-sensing period in which the second touch driving signal is simultaneously applied to two or more second touch electrodes which are electrically connected to each other among the plurality of second touch electrodes, During the first sub-sensing period, the touch driving circuit supplies the auxiliary driving signal to the remaining first touch electrodes excluding the two or more first touch electrodes and/or the plurality of second touch electrodes.

During the second sub-sensing period, the touch driving circuit supplies the auxiliary driving signal to the remaining second touch electrodes excluding the two or more second touch electrodes and/or the plurality of first touch electrodes.

A display mode period, a first touch sensing mode period, and a second touch sensing mode period may be defined by a first mode control signal and a second mode control signal having different signal waveforms.

The first mode control signal may include a first signal section having a first level voltage and a second signal section having a second level voltage different from the first level voltage.

The second mode control signal may include a third signal section having a third level voltage and a fourth signal section having a fourth level voltage different from the third level voltage.

During the display mode period, the first mode control signal has the second level voltage, and the second mode control signal has the third level voltage, during the first touch sensing mode period, the first mode control signal has the first level voltage, and the second mode control signal has the third level voltage, during the second touch sensing mode period, the first mode control signal has the first level voltage, and the second mode control signal has the fourth level voltage.

A touch driving circuit according to embodiments of the present disclosure may include a first touch driving signal output unit configured to supply a first touch driving signal to each of a plurality of first touch electrodes during a first touch sensing mode period, a sensing unit configured to supply a second touch driving signal to two or more touch electrodes among a plurality of touch electrodes during a second touch sensing mode period, and an auxiliary driving signal output unit configured to supply, during the second touch sensing mode period, an auxiliary driving signal to two or more touch electrodes to which the second touch driving signal is not applied among the plurality of touch electrodes.

A touch driving circuit according to embodiments of the present disclosure may further include a binding circuit for controlling an electrical connection between the plurality of first touch electrodes and an electrical connection between the plurality of second touch electrodes.

The binding circuit electrically separates the two or more first touch electrodes and electrically separate the two or more second touch electrodes during the first touch sensing mode period.

A touch display device according to exemplary embodiments of the present disclosure may include a touch sensor including a plurality of first touch electrodes and a plurality of second touch electrodes, and a touch driving circuit configured to supply a touch driving signal to the touch sensor during a touch sensing mode period.

The touch sensing mode period may include a first touch sensing mode period in which a first touch driving signal having a first amplitude is applied to the touch sensor as the touch driving signal, and a second touch sensing mode period in which a second touch driving signal having a second amplitude greater than the first amplitude is applied to the touch sensor as the touch driving signal.

During the second touch sensing mode period, the touch driving circuit may supply the second touch driving signal to a part of the touch sensor, and may supply an auxiliary driving signal to another part of the touch sensor.

According to embodiments of the present disclosure, it is possible to provide a touch display device and a touch driving circuit capable of supporting various touch sensing modes.

According to embodiments of the present disclosure, it is possible to provide a touch display device and a touch driving circuit capable of efficiently sensing contact touch and non-contact touch.

According to embodiments of the present disclosure, it is possible to provide a touch display device and a touch driving circuit capable of effectively and quickly sensing non-contact touch.

According to embodiments of the present disclosure, it is possible to provide a touch display device and a touch driving circuit capable of efficiently supporting a display mode, a contact touch sensing mode, and a hover touch sensing mode.

According to embodiments of the present disclosure, it is possible to provide a touch display device and a touch driving circuit capable of preventing unwanted parasitic capacitance from occurring when sensing non-contact touch.

According to embodiments of the present disclosure, it is possible to provide a touch display device and a touch driving circuit capable of efficiently driving a non-sensing touch electrode (e.g., auxiliary driving) when sensing non-contact touch.

According to embodiments of the present disclosure, it is possible to efficiently perform a display driving, a contact touch sensing, and a hover touch sensing in terms of driving time, thereby enabling low-power driving.

DETAILED DESCRIPTION

Figure 1:
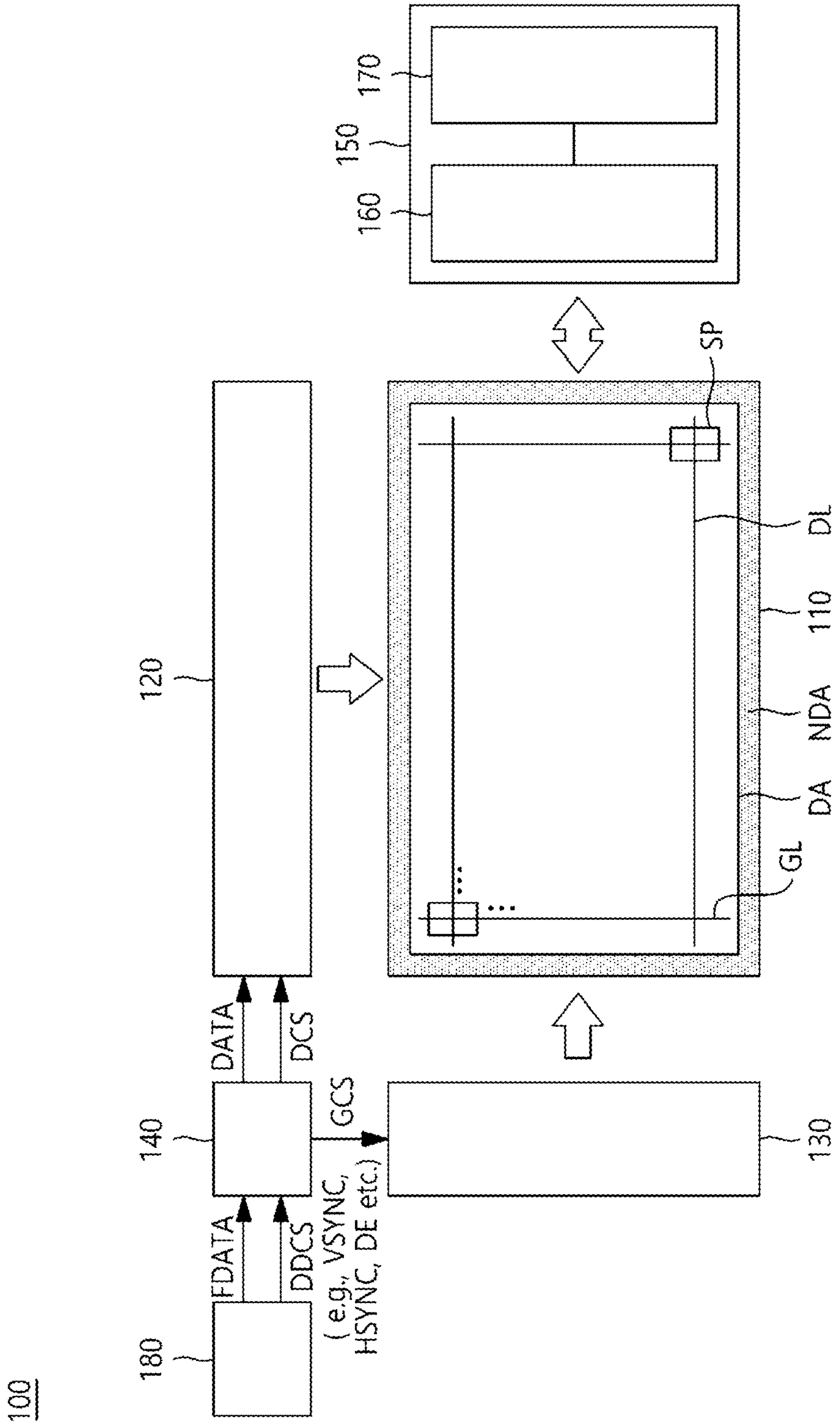
FIG. 1 is a system configuration diagram of a touch display device according to embodiments of the present disclosure.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a", "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected", "coupled" or "linked", the two or more components may be directly "connected", "coupled" or "linked"", or another component may intervene. Here, the other component may be included in one or more of the two or more components that are "connected", "coupled" or "linked" to each other.

When such terms as, e.g., "after", "next to", "after", and "before", are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

FIG. 1 is a system configuration diagram of a touch display device 100 according to embodiments of the present disclosure.

Referring to FIG. 1, a touch display device 100 may include a touch display panel 110 and a display driving circuit as components for displaying an image.

The display driving circuit may be a circuit for driving display driving components included in the touch display panel 110 so that an image is displayed on the touch display panel 110, and may include a data driving circuit 120, a gate driving circuit 130, and a display controller 140.

The touch display panel 110 may include a display area DA where an image is displayed, and may further include a non-display area NDA where an image is not displayed. Here, the non-display area may also be referred to as a bezel area. The non-display area may be also referred to as an edge area or a bezel area. All or part of the non-display area NDA may be an area visible from the front of the touch display device 100, or may be an area that is bent and not visible from the front of the touch display device 100.

The touch display panel 110 may include a plurality of subpixels SP, and various types of signal lines to drive the plurality of subpixels SP.

Various types of signal lines may include a plurality of data lines transmitting data signals (also referred to as data voltages or image signals) and a plurality of gate lines transmitting gate signals (also referred to as scan signals).

The plurality of data lines DL and the plurality of gate lines GL may intersect each other. Each of the plurality of gate lines GL may be disposed while extending in a first direction. Each of the plurality of data lines DL may be disposed while extending in a second direction. Here, the first direction may be a row direction and the second direction may be a column direction. Alternatively, the first direction may be a column direction and the second direction may be a row direction.

The data driving circuit 120 may be a circuit for driving the data lines, and may output data signals to the plurality of data lines DL. The gate driving circuit 130 may be a circuit for driving the gate lines, and may output gate signals to the plurality of gate lines GL.

The display controller 140 may receive input data FDATA and a display driving control signal DDCS from a host system 180. For example, the display driving control signal DDCS may include a vertical synchronization signal VSYNC, a horizontal synchronization signal HSYNC, and a data enable signal DE.

The display controller 140 may supply image data DATA to the data driving circuit 120 based on the input data FDATA to control the data driving circuit 120. In addition, the display controller 140 may be a device for controlling the data driving circuit 120 and the gate driving circuit 130, and may control the driving timing for a plurality of data lines DL and the driving timing for a plurality of gate lines GL. The display controller 140 may supply a data driving control signal DCS to the data driving circuit 120 to control the data driving circuit 120, and may supply a gate driving control signal GCS to the gate driving circuit 130 to control the gate driving circuit 130.

The data driving circuit 120 may supply data signals to a plurality of data lines DL according to the driving timing control of the display controller 140. The data driving circuit 120 may receive image data DATA in digital form from the display controller 140, convert the received image data DATA into data signals in analog form, and output the converted analog data signals to the plurality of data lines DL.

The gate driving circuit 130 may supply gate signals to a plurality of gate lines GL according to the timing control of the display controller 140. The gate driving circuit 130 may receive a first gate voltage corresponding to a turn-on level voltage and a second gate voltage corresponding to a turn-off level voltage together with various gate driving control signals GCS, generate gate signals, and supply the generated gate signals to a plurality of gate lines GL. For example, the first gate voltage may be a higher voltage than the second gate voltage. Alternatively, the second gate voltage may be a higher voltage than the first gate voltage.

For example, the data driving circuit 120 may be connected to the touch display panel 110 by a tape automated bonding (TAB) method, or may be connected to a bonding pad of the touch display panel 110 by a chip-on-glass (COG) or chip-on-panel (COP) method, or may be connected to the touch display panel 110 by being implemented as a chip-on-film (COF) method. Hereinafter, for convenience of explanation, it is assumed that the data driving circuit 120 is connected to the touch display panel 110 as a chip-on-film (COF) type.

The gate driving circuit 130 may be connected to the touch display panel 110 using a tape automated bonding (TAB) method, or may be connected to a bonding pad of the touch display panel 110 using a chip-on-glass (COG) or chip-on-panel (COP) method, or may be connected to the display panel 110 according to a chip-on-film (COF) method. Alternatively, the gate driving circuit 130 may be a gate-in-panel (GIP) type, and may be formed in the non-display area NDA of the touch display panel 110. The gate driving circuit 130 may be disposed on or connected to a substrate. That is, the gate driving circuit 130 may be disposed in a non-display area NDA of the substrate if it is a GIP type. The gate driving circuit 130 may be connected to the substrate if it is a chip-on-glass (COG) type, a chip-on-film (COF) type, or the like.

Meanwhile, at least one of the data driving circuit 120 and the gate driving circuit 130 may be disposed in the display area DA. For example, the gate driving circuit 130 may be disposed in the display area DA. In this case, the gate driving circuit 130 may be disposed so as not to overlap with the subpixels SP, or may be disposed so as to partially or completely overlap with the subpixels SP.

Depending on the driving method, panel design method, or panel shape, the data driving circuit 120 may be connected to one side of the display panel 110, may be connected to one side and the other side of the display panel 110, or may be connected along the side of the display panel 110.

Depending on the driving method, panel design method, or panel shape, the gate driving circuit 130 may be connected to one side of the display panel 110, may be connected to one side and the other side of the display panel 110, or may be connected along the side of the display panel 110.

The display controller 140 may be implemented as a separate component from the data driving circuit 120, or may be implemented as an integrated circuit integrated with the data driving circuit 120.

The display controller 140 may be a timing controller used in typical display technology, or may be a control device capable of further performing other control functions including a timing controller, or may be a control device different from the timing controller, or may be a circuit within the control device. The display controller 140 may be implemented with various circuits or electronic components, such as an integrated circuit (IC), a field programmable gate array (FPGA), an application specific integrated circuit (ASIC), or a processor.

The display controller 140 may be mounted on a printed circuit board, a flexible printed circuit, etc., and may be electrically connected to the data driving circuit 120 and the gate driving circuit 130 through a printed circuit board, a flexible printed circuit.

The display controller 140 may transmit and receive signals with the data driving circuit 120 according to one or more predetermined interfaces. For example, the interface may include a low voltage differential signaling (LVDS) interface, an embedded clock point-point interface (EPI) interface, or a serial peripheral interface (SPI).

The touch display device 100 may be a liquid crystal display device, or may be a self-luminous display device (e.g., an organic light emitting display device, an inorganic light emitting display device, etc.) in which the display panel 110 emits light by itself. That is, the display panel 110 may be a liquid crystal display panel or a self-luminous display panel.

Meanwhile, in order to provide a touch sensing function in addition to an image display function, the touch display device 100 according to the embodiments of the present disclosure may include a touch sensor and a touch sensing circuit 150.

The touch sensing circuit 150 may detect whether a touch has occurred by a touch object such as a finger or pen by sensing the touch sensor, or detects a touch location.

The touch sensing circuit 150 may include a touch driving circuit 160 for driving and sensing the touch sensor to generate touch sensing data, and a touch controller 170 capable of detecting touch occurrence or a touch location using the touch sensing data.

The touch sensor may include a plurality of touch electrodes. The plurality of touch electrodes may be electrically connected to the touch driving circuit 160 through a plurality of touch lines. The touch sensor is described in more detail with reference to FIG. 2.

The touch driving circuit 160 and the touch controller 170 included in the touch sensing circuit 150 may be implemented as separate devices or as one device. In addition, the touch driving circuit 160 and the data driving circuit 120 may be implemented as separate devices or as one device.

For example, the touch driving circuit 160 may be implemented as a readout integrated circuit (ROIC). Alternatively, the touch driving circuit 160 and the data driving circuit 120 may be integrated and implemented as a source and readout integrated circuit (SRIC). The touch controller 170 may be implemented as a micro control unit (MCU).

The touch display device 100 may further include a power supply circuit which supplies various types of power to the display driving circuit and/or the touch sensing circuit.

The touch display device 100 according to the embodiments of the present disclosure may be a mobile terminal such as a smart phone or a tablet, or a monitor or television (TV) of various sizes, and is not limited thereto, and may be a display of various types and sizes capable of displaying information or images.

Alternatively, the touch display device 100 according to embodiments of the present disclosure may be a wearable device which may be worn on the body, such as a smart watch.

Figure 2:
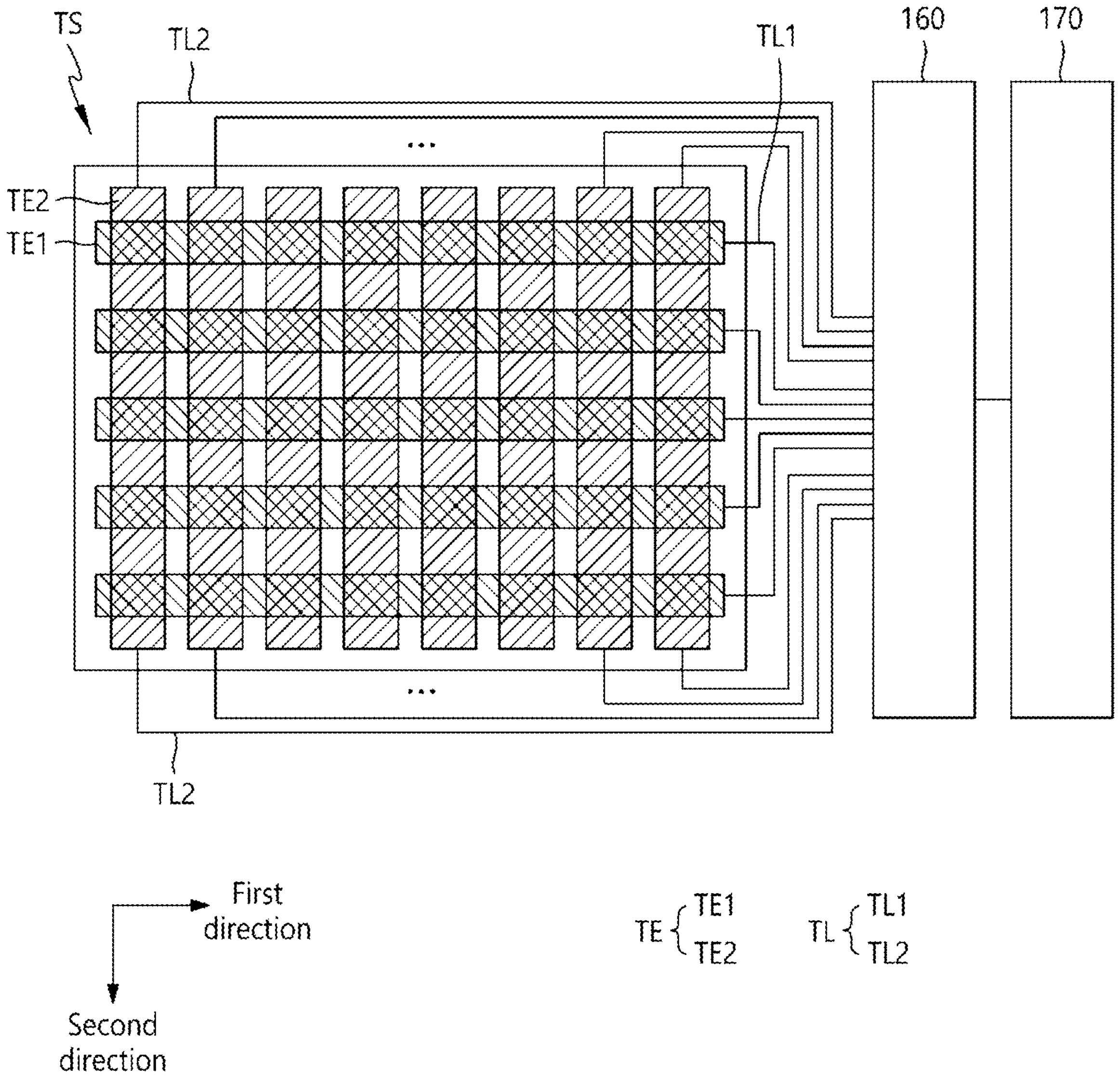
FIG. 2 illustrates a touch sensor of a touch display device according to embodiments of the present disclosure.

FIG. 2 illustrates a touch sensor TS of a touch display device 100 according to embodiments of the present disclosure.

Referring to FIG. 2, the touch driving circuit 160 may sense the touch sensor TS and generate touch sensing data as a sensing result and provide it the touch sensing data to the touch controller 170.

Referring to FIG. 2, the touch sensor TS may include a plurality of touch electrodes TE. The plurality of touch electrodes TE may be electrically connected to the touch driving circuit 160 through a plurality of touch lines TL.

Referring to FIG. 2, the plurality of touch electrodes TE may include a plurality of first touch electrodes TE1 and a plurality of second touch electrodes TE2. For example, the plurality of first touch electrodes TE1 and the plurality of second touch electrodes TE2 may intersect each other. Each of the plurality of first touch electrodes TE1 may extend in a first direction, and each of the plurality of second touch electrodes TE2 may extend in a second direction. Accordingly, a portion of each of the plurality of first touch electrodes TE1 may overlap with the plurality of second touch electrodes TE2.

Referring to FIG. 2, the plurality of first touch electrodes TE1 may be electrically connected to the touch driving circuit 160 through a plurality of first touch lines TL1, and the plurality of second touch electrodes TE2 may be electrically connected to the touch driving circuit 160 through a plurality of second touch lines TL2.

The touch sensor TS may be implemented as a touch panel, and may exist separately on the outside of the display panel 110 or may exist inside the display panel 110.

An external touch sensor TS existing on the outside of the display panel 110 may be manufactured separately from the display panel 110, and then combined with the display panel 110 during the assembly process. The external touch sensor TS may be implemented as a touch panel including a substrate and a plurality of touch electrodes TE on the substrate.

An internal or built-in touch sensor TS existing in the display panel 110 may be formed together with the electrodes and lines related to display driving during the manufacturing process of the display panel 110. Hereinafter, for convenience of explanation, it is assumed that the touch sensor TS is a built-in touch sensor or an internal touch sensor TS present inside the display panel 110.

The touch driving circuit 160 may supply a touch driving signal to at least one of the plurality of touch electrodes TE included in the touch sensor TS, and may sense at least one of the plurality of touch electrodes to generate touch sensing data. Here, the touch driving signal may be a signal whose voltage level changes.

The touch sensing circuit 150 can perform touch sensing. For example, the touch sensing circuit 150 may sense a touch using a mutual-capacitance sensing method or a self-capacitance sensing method.

In the case that the touch sensing circuit 150 performs touch sensing in a mutual-capacitance sensing method, the touch sensing circuit 150 may perform touch sensing based on the capacitance (e.g., mutual capacitance) between the first touch electrode TE1 and the second touch electrode TE2.

According to the mutual-capacitance sensing method, the plurality of touch electrodes TE may be divided into a driving touch electrode (also referred to as a transmitting touch electrode) and a sensing touch electrode (also referred to as a receiving touch electrode). The touch driving circuit 160 may drive the driving touch electrodes and sense the sensing touch electrodes. Hereinafter, mutual-capacitance sensing may also be described as "mutual-sensing."

According to the mutual-capacitance sensing technique, a plurality of touch electrodes may be divided into driving touch electrodes and sensing touch electrodes. The touch driving circuit 160 can drive the driving touch electrodes and sense the sensing touch electrodes. For example, in mutual-sensing, the plurality of first touch electrodes TE1 may be driving touch electrodes (e.g., transmitting touch electrodes) and the plurality of second touch electrodes TE2 may be sensing touch electrodes (e.g., receiving touch electrodes). For another example, in mutual-sensing, the plurality of first touch electrodes TE1 may be sensing touch electrodes (e.g., receiving touch electrodes) and the plurality of second touch electrodes TE2 may be driving touch electrodes (e.g., transmitting touch electrodes). Hereinafter, for convenience of explanation, there is exemplified a case in which the plurality of first touch electrodes TE1 are the driving touch electrodes (e.g., transmitting touch electrodes) and the plurality of second touch electrodes TE2 are the sensing touch electrodes (e.g., receiving touch electrodes).

In the case that the touch sensing circuit 150 performs touch sensing in a self-capacitance sensing method, the touch sensing circuit 150 may perform touch sensing based on the capacitance between each touch electrode TE and a touch object (e.g., a finger, a pen, etc.).

According to the self-capacitance sensing method, each of the plurality of touch electrodes TE may serve as a driving touch electrode and a sensing touch electrode. The touch driving circuit 160 may drive all or part of the plurality of touch electrodes TE and sense all or part of the plurality of touch electrodes TE. Hereinafter, self-capacitance sensing may also be referred to as "self-sensing."

For example, in self-sensing, the touch driving circuit 160 may supply a touch driving signal to at least one first touch electrode TE1 among the plurality of first touch electrodes TE1, and sense at least one first touch electrode TE1 supplied with the touch driving signal. The touch driving circuit 160 may supply a touch driving signal to at least one second touch electrode TE2 among the plurality of second touch electrodes TE2, and sense at least one second touch electrode TE2 to which the touch driving signal is supplied. That is, in self-sensing, each of the plurality of touch electrodes TE including the plurality of first touch electrodes TEL and the plurality of second touch electrodes TE2 may perform two roles (i.e., role of a driving touch electrode, role of a sensing touch electrode).

Referring to FIG. 2, one first touch line TL1 may be connected to each of the plurality of first touch electrodes TE1. Alternatively, two first touch lines TL1 may be connected to each of the plurality of first touch electrodes TE1. In this case, a first touch line TL1 may be connected to each of one end and the other end of one first touch electrode TE1.

A second touch line TL2 may be connected to each of the plurality of second touch electrodes TE2. Alternatively, two second touch lines TL2 may be connected to each of the plurality of second touch electrodes TE2. In this case, a second touch line TL2 may be connected to each of one end and the other end of one second touch electrode TE2.

As an example, each of the plurality of first touch electrodes TE1 and the plurality of second touch electrodes TE2 may have a bar shape.

As another example, each of the plurality of first touch electrodes TEL and the plurality of second touch electrodes TE2 may be configured as a plurality of sub-electrodes which are electrically connected to each other through a bridge electrode.

As another example, each of the plurality of first touch electrodes TE1 may be formed integrally, and each of the plurality of second touch electrodes TE2 may be formed of a plurality of sub-electrodes electrically connected to each other by bridge electrodes.

As another example, each of the plurality of second touch electrodes TE2 may be formed integrally, and each of the plurality of first touch electrodes TEL may be formed of a plurality of sub-electrodes electrically connected to each other by bridge electrodes.

As an example, the plurality of first touch electrodes TE1 may be disposed in a first sensor metal layer, and the plurality of second touch electrodes TE2 may be disposed in a second sensor metal layer. Here, a sensor interlayer insulating film may be disposed between the first sensor metal layer and the second sensor metal layer.

In another example, if each of the plurality of first touch electrodes TE1 is formed integrally and each of the plurality of second touch electrodes TE2 is formed of a plurality of sub-electrodes electrically connected to each other by bridge electrodes, the plurality of first touch electrodes TE1 and the plurality of sub-electrodes may be disposed within a sensor metal layer, and the bridge electrodes electrically connecting the plurality of sub-electrodes may be disposed within a bridge metal layer. Here, a sensor interlayer insulating film may be disposed between the sensor metal layer and the bridge metal layer.

In another example, if each of the plurality of second touch electrodes TE2 is formed integrally and each of the plurality of first touch electrodes TEL is formed of a plurality of sub-electrodes electrically connected to each other by bridge electrodes, the plurality of second touch electrodes TE2 and the plurality of sub-electrodes may be disposed within a sensor metal layer, and the bridge electrodes electrically connecting the plurality of sub-electrodes may be disposed within a bridge metal layer. Here, a sensor interlayer insulating film may be arranged between the sensor metal layer and the bridge metal layer.

Figure 3:
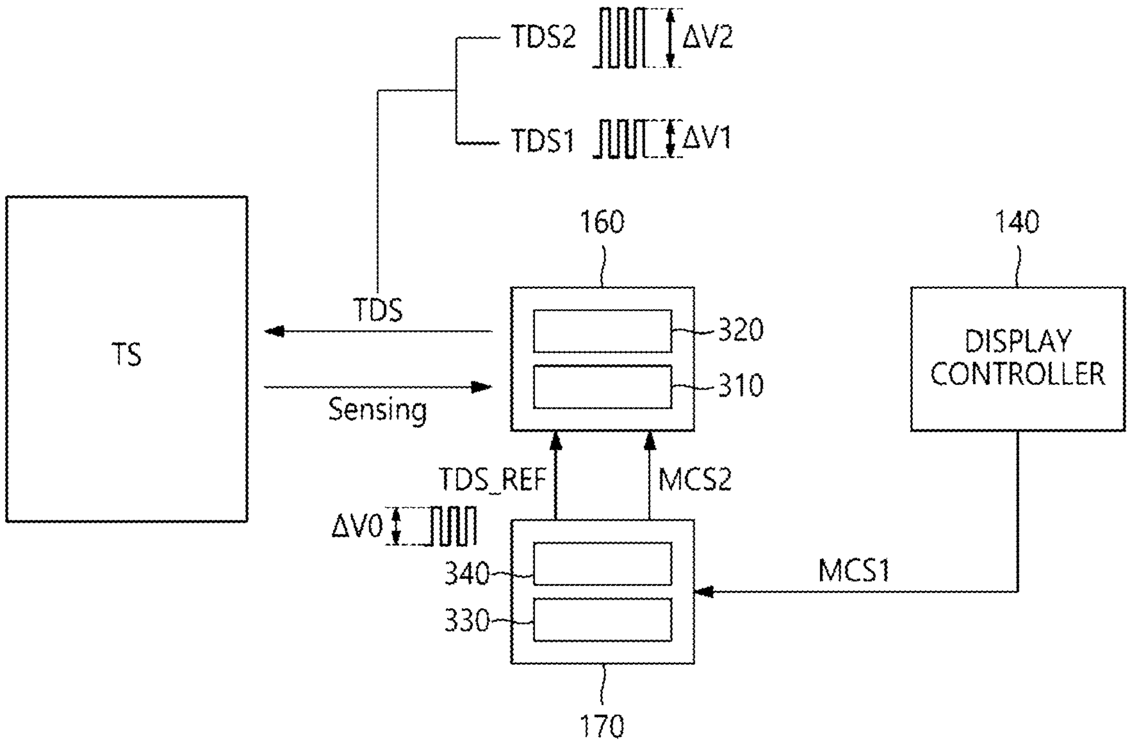
FIG. 3 illustrates a touch sensing system of a touch display device according to embodiments of the present disclosure.

FIG. 3 illustrates a touch sensing system of a touch display device 100 according to embodiments of the present disclosure.

The touch display device 100 according to the embodiments of the present disclosure may include a touch sensor TS, a touch driving circuit 160, a touch controller 170, and a display controller 140.

The touch sensor TS may include a plurality of touch electrodes. The touch sensor TS may further include a plurality of touch lines for electrically connecting the plurality of touch electrodes to the touch driving circuit 160.

The touch driving circuit 160 may drive the touch sensor TS by supplying a touch driving signal TDS to the touch sensor TS, and may sense the touch sensor TS. The touch driving circuit 160 sensing the touch sensor TS may mean sensing a capacitance between the touch electrodes TE or sensing a capacitance of the touch electrodes TE.

The touch controller 170 may supply a reference touch driving signal TDS_REF to the touch driving circuit 160. The reference touch driving signal TDS_REF may be a signal whose voltage level changes or fluctuates. The reference touch driving signal TDS_REF may be a signal having a reference amplitude ΔV0. For example, the reference touch driving signal DS_REF may be a square wave, a sine wave, a triangle wave, etc. For example, the reference touch driving signal TDS_REF may be a pulse width modulation (PWM) signal.

The touch driving circuit 160 may generate a touch driving signal TDS to be supplied to the touch sensor TS using the reference touch driving signal TDS_REF.

The touch driving signal TDS may be one of a first touch driving signal TDS1 applied to the touch sensor TS during a first period (e.g., a first touch sensing mode period) and a second touch driving signal TDS2 applied to the touch sensor TS during a second period (e.g., a second touch sensing mode period).

The first touch driving signal TDS1 and the second touch driving signal TDS2 may be signals having variable voltage levels. The first touch driving signal TDS1 may be a signal including first pulses having a first amplitude ΔV1, and the second touch driving signal TDS2 may be a signal including second pulses having a second amplitude ΔV2.

The second amplitude ΔV2 may be different from the first amplitude ΔV1, or the number of the second pulses may be different from the number of the first pulses. For example, the second amplitude uls may be greater than the first amplitude ΔV1, or the number of the second pulses may be greater than the number of the first pulses. Hereinafter, for convenience of explanation, there is exemplified a case in which the second amplitude uls is greater than the first amplitude ΔV1, the disclosure is not limited thereto.

For example, the first touch driving signal TDS1 and the second touch driving signal TDS2 may be square waves, sine waves, or triangular waves. For example, the first touch driving signal TDS1 and the second touch driving signal TDS2 may be pulse width modulation signals. The frequency of the first touch driving signal TDS1 and the second touch driving signal TDS2 may be the same as the frequency of the reference touch driving signal TDS_REF.

The touch controller 170 may control the touch driving circuit 160. To this end, the touch controller 170 may generate a second mode control signal MCS2 based on a first mode control signal MCS1 received from the display controller 140, and supply the second mode control signal MCS2 to the touch driving circuit 160, thereby controlling the operation timing of the touch driving circuit 160. Here, the second mode control signal MCS2 may also be referred to as a "touch mode control signal." The touch driving circuit 160 and the touch controller 170 may be implemented in separate devices or in a single device, without being limited thereto.

The operation timing and operation type of the touch driving circuit 160 according to the embodiments of the present disclosure may be defined by the first mode control signal MCS1 and the second mode control signal MCS2. In addition, the operation timing and operation type of the touch display device 100 according to the embodiments of the present disclosure may be defined by a combination of the first mode control signal MCS1 and the second mode control signal MCS2.

The touch driving circuit 160 and the touch controller 170 according to the embodiments of the present disclosure described above will be described again.

The touch driving circuit 160 according to the embodiments of the present disclosure may include a first signal input unit 310 (e.g., a circuit) configured to receive a reference touch driving signal and a touch mode control signal, and a first signal output unit 320 (e.g., a circuit) configured to output a first touch driving signal TDS1 having a first amplitude ΔV1 or a second touch driving signal TDS2 having a second amplitude ΔV2 different from the first amplitude ΔV1 to the touch sensor TS based on the reference touch driving signal TDS_REF and the second mode control signal MCS2.

The first signal output unit 320 may output the first touch driving signal TDS1 or the second touch driving signal TDS2 to touch electrodes TE according to the level voltage of the second mode control signal MCS2.

The first signal output unit 320 may output the first touch driving signal TDS1 to A touch electrodes TE if the second mode control signal MCS2 has a first level voltage. The A is a natural number greater than or equal to 1.

The first signal output unit 320 may output the second touch driving signal TDS2 to B touch electrodes TE if the second mode control signal MCS2 has a second level voltage. Here, the B may be a value greater than the A.

According to the above, the second mode control signal MCS2 may have a first level voltage or a second level voltage. If the second mode control signal MCS2 has a first level voltage, the first touch driving signal TDS1 may be applied to the A touch electrodes TE at one point in time. If the second mode control signal MCS2 has a second level voltage, the second touch driving signal TDS2 may be applied to B touch electrodes TE more than A at one point in time.

The touch controller 170 according to the embodiments of the present disclosure may be a control device for controlling a touch sensing operation of a touch display device 100, and may include a second signal input unit 330 and a second signal output unit 340. The touch controller 170 according to the embodiments of the present disclosure may be configured to receive the first mode control signal MCS1 and output a reference driving signal TDS_REF and the second mode control signal MCS2.

The second signal input unit 330 may be configured to receive the first mode control signal MCS1 from the display controller 140.

The second signal output unit 340 may be configured to output a reference touch driving signal TDS_REF, and may be configured to output a second mode control signal MCS2 generated based on the first mode control signal MCS1.

The first mode control signal MCS1 may include a first signal section having a first level voltage and a second signal section having a second level voltage different from the first level voltage.

If the first mode control signal MCS1 is a second signal section having a second level voltage, the second mode control signal MCS2 may have a third level voltage.

If the first mode control signal MCS1 is a first signal section having a first level voltage, the second mode control signal MCS2 may include a signal section having a third level voltage and a signal section having a fourth level voltage different from the third level voltage.

Figure 4:
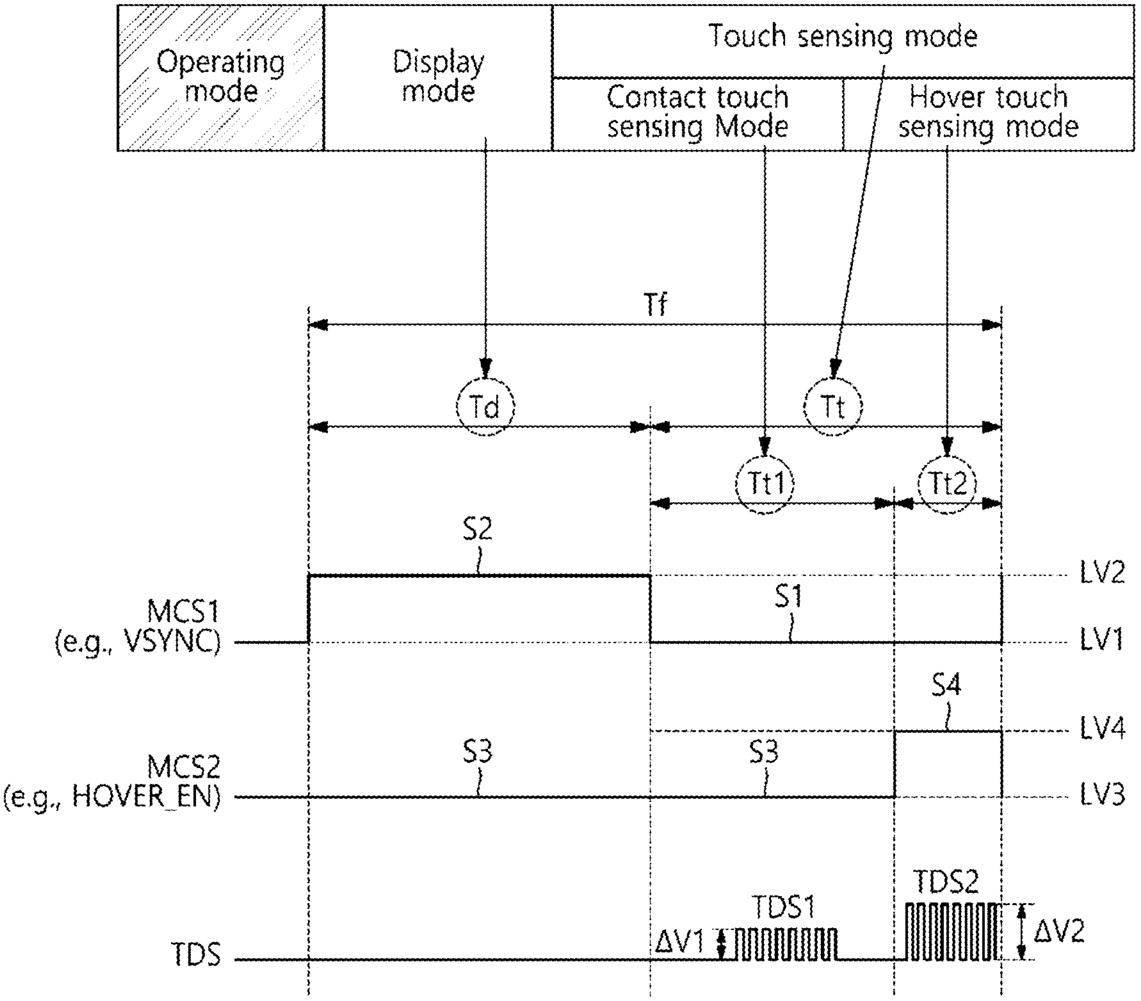
FIG. 4 illustrates a driving timing diagram of a touch display device according to embodiments of the present disclosure.
Figure 5:
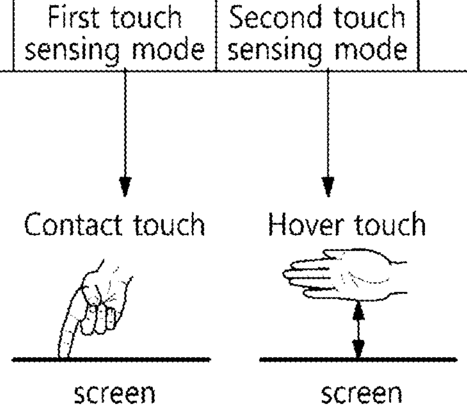
FIG. 5 illustrates an operating mode definition table of a touch display device according to embodiments of the present disclosure.

FIG. 4 illustrates a driving timing diagram of a touch display device 100 according to embodiments of the present disclosure, and FIG. 5 illustrates an operating mode definition table of a touch display device 100 according to embodiments of the present disclosure.

Referring to FIG. 4 and FIG. 5, the touch display device 100 according to embodiments of the present disclosure may have various operating modes. The various operating modes may include a display mode for displaying an image and a touch sensing mode for sensing a touch.

The touch sensing mode may include a first touch sensing mode and a second touch sensing mode. The first touch sensing mode may be a contact touch sensing mode for sensing a "contact touch", which is a touch contacting a screen, and the second touch sensing mode may be a hover touch sensing mode for sensing a "hover touch", which is a touch which is within a predetermined distance from the screen without contacting the screen. Hereinafter, the contact touch sensing mode may be simply referred to as the contact mode, and the hover touch sensing mode may be simply referred to as the hover mode.

In embodiments of the present disclosure, a "hover touch" may also be referred to as the "non-contact touch." In the embodiments of the present disclosure, a hover touch may mean an action in which the user's body or pen points to a specific point (or location) of the screen without the user touching the screen, or a gesture such as a hand gesture or movement of the user's body or pen moving on the screen.

In the embodiments of the present disclosure, sensing a hover touch may mean detecting a position of a body or pen that is not touching the screen (i.e., non-contact state), or detecting a movement of a body or pen that is not touching the screen (i.e., non-contact state).

Referring to FIGS. 4 and 5, an operating period of the touch display device 100 may include a display mode period Td for displaying an image and a touch sensing mode period Tt, and the touch sensing mode period Tt may include a first touch sensing mode period Tt1 and a second touch sensing mode period Tt2. The first touch sensing mode period Tt1 is a contact mode period for sensing a contact touch that has contacted a screen, and the second touch sensing mode period Tt2 is a hover mode period for sensing a non-contact touch that has not contacted the screen.

Referring to FIGS. 4 and 5, the display mode period Td may be a period during which the touch display device 100 operates in the display mode, and the touch sensing mode period Tt may be a period during which the touch display device 100 operates in the touch sensing mode.

Referring to FIGS. 4 and 5, the first touch sensing mode period Tt1 may be a period during which the touch display device 100 operates in the first touch sensing mode (e.g., contact mode), and the second touch sensing mode period Tt2 may be a period during which the touch display device 100 operates in the second touch sensing mode (e.g., hover mode).

During the touch sensing mode period Tt, the touch driving circuit 160 may supply a touch driving signal TDS to the touch sensor TS.

During the first touch sensing mode period Tt1, the touch driving circuit 160 may supply a first touch driving signal TDS1 to the touch sensor TS. Here, the first touch driving signal TDS1 may be a signal whose voltage level changes over time and having a first frequency and a first amplitude $\Delta V1$.

During the second touch sensing mode period Tt2, the touch driving circuit 160 may supply a second touch driving signal TDS2 to the touch sensor TS. Here, the second touch driving signal TDS2 may be a signal whose voltage level changes over time and having a second frequency and a second amplitude $\Delta V2$. The second frequency may be the same as or different from the first frequency. The second amplitude $\Delta V2$ may be different from the first amplitude $\Delta V1$.

If the second touch sensing mode period Tt2 is a hover mode period and the first touch sensing mode period Tt1 is a contact mode period, the second amplitude $\Delta V2$ of the second touch driving signal TDS2 may be greater than the first amplitude $\Delta V1$ of the first touch driving signal TDS1 in order to further improve the sensing performance of the hover touch.

The operating period of the touch display device 100 may also be referred to as the operating period of the display panel 110.

Referring to FIG. 4, during the first touch sensing mode period Tt1, the first touch driving signal TDS1 may be applied to a plurality of first touch electrodes TE1. For example, during the first touch sensing mode period Tt1, the first touch driving signal TDS1 may be sequentially applied to each of the plurality of first touch electrodes TE1.

Referring to FIG. 4, during the second touch sensing mode period Tt2, two or more first touch electrodes TE1 among the plurality of first touch electrodes TE1 may be electrically connected to operate as one large first touch electrode TE1. In addition, during the second touch sensing mode period Tt2, two or more second touch electrodes TE2 among the plurality of second touch electrodes TE2 may be electrically connected to operate as one large second touch electrode TE2.

Referring to FIG. 4, during the second touch sensing mode period Tt2, the second touch driving signal TDS2 may be simultaneously applied to two or more first touch electrodes TE1 that are electrically connected to each other among the plurality of first touch electrodes TE1, or the second touch driving signal TDS2 may be simultaneously applied to two or more second touch electrodes TE2 that are electrically connected to each other among the plurality of second touch electrodes TE2.

As described above, the touch display device 100 according to the embodiments of the present disclosure may further include a display driving circuit for driving a plurality of subpixels SP, a display controller 140 for controlling the display driving circuit and supplying a first mode control signal MCS1 to the touch controller 170, and a touch controller 170 for supplying a second mode control signal MCS2 to the touch driving circuit 160. Here, the display driving circuit may include a data driving circuit 120 and a gate driving circuit 130, etc.

Referring to FIGS. 4 and 5, the display mode period Td and the touch sensing mode period Tt may be distinguished and defined by the first mode control signal MCS1 and the second mode control signal MCS2. For example, the display mode period Td, the first touch sensing mode period Tt1, and the second touch sensing mode period Tt2 may be distinguished and defined by the first mode control signal MCS1 and the second mode control signal MCS2.

The first mode control signal MCS1 may be a control signal for distinguishing between the display mode period Td and the touch sensing mode period Tt, and the second mode control signal MCS2 may be a control signal for distinguishing between the first touch sensing mode period Tt1 and the second touch sensing mode period Tt2.

Referring to FIG. 4, for example, the first mode control signal MCS1 may be a vertical synchronization signal VSYNC for distinguishing one display frame period into an active period and a blank period. In the vertical synchronization signal VSYNC, the active period may be the display mode period Td, and the blank period may be the touch sensing mode period Tt.

The vertical synchronization signal VSYNC may be one of the display driving control signals DDCS provided from the host system 180 to the display controller 140.

The display controller 140 may provide the vertical synchronization signal VSYNC received from the host system 180 to the touch controller 170 as the first mode control signal MCS1.

Referring to FIG. 4, for example, the second mode control signal MCS2 may be a hover enable signal HOVER_EN for enabling the hover touch sensing mode, which is the second touch sensing mode.

Referring to FIG. 4, the first mode control signal MCS1 may include a first signal section S1 having a first level voltage LV1 and a second signal section S2 having a second level voltage LV2 different from the first level voltage LV1. For example, the first mode control signal MCS1 may include a first signal section S1 having a first level voltage LV1 during the touch sensing mode period Tt and a second signal section S2 having a second level voltage LV2 different from the first level voltage LV1 during the display mode period Td.

The second mode control signal MCS2 may include a third signal section S3 having a third level voltage LV3 and a fourth signal section S4 having a fourth level voltage LV4 different from the third level voltage LV3. For example, the second mode control signal MCS2 may include a third signal section S3 having a third level voltage LV3 during the display mode period Td and the first touch sensing mode period Tt1 and a fourth signal section S4 having a fourth level voltage LV4 different from the third level voltage LV3 during the second touch sensing mode period Tt2.

Referring to FIG. 4, during the display mode period Td, the first mode control signal MCS1 may have a second level voltage LV2, and the second mode control signal MCS2 may have a third level voltage LV3.

Referring to FIG. 4, during the first touch sensing mode period Tt1, the first mode control signal MCS1 may have a first level voltage LV1, and the second mode control signal MCS2 may have a third level voltage LV3.

Referring to FIG. 4, during the second touch sensing mode period Tt2, the first mode control signal MCS1 may have a first level voltage LV1, and the second mode control signal MCS2 may have a fourth level voltage LV4.

The touch display device 100 according to embodiments of the present disclosure may include a display panel 110 including a plurality of subpixels SP and a plurality of touch electrodes TE, a display driving circuit for driving the plurality of subpixels SP, a touch driving circuit 160 for supplying a touch driving signal to at least one of the plurality of touch electrodes TE, a display controller 140 for controlling the display driving circuit and supplying a first mode control signal MCS1 to the touch controller 170, and a touch controller 170 for supplying a second mode control signal MCS2 to the touch driving circuit 160.

Referring to FIGS. 4 and 5, the display mode period Td, the first touch sensing mode period Tt1, and the second touch sensing mode period Tt2 may be distinguished by the first mode control signal MCS1 and the second mode control signal MCS2.

Figure 6:
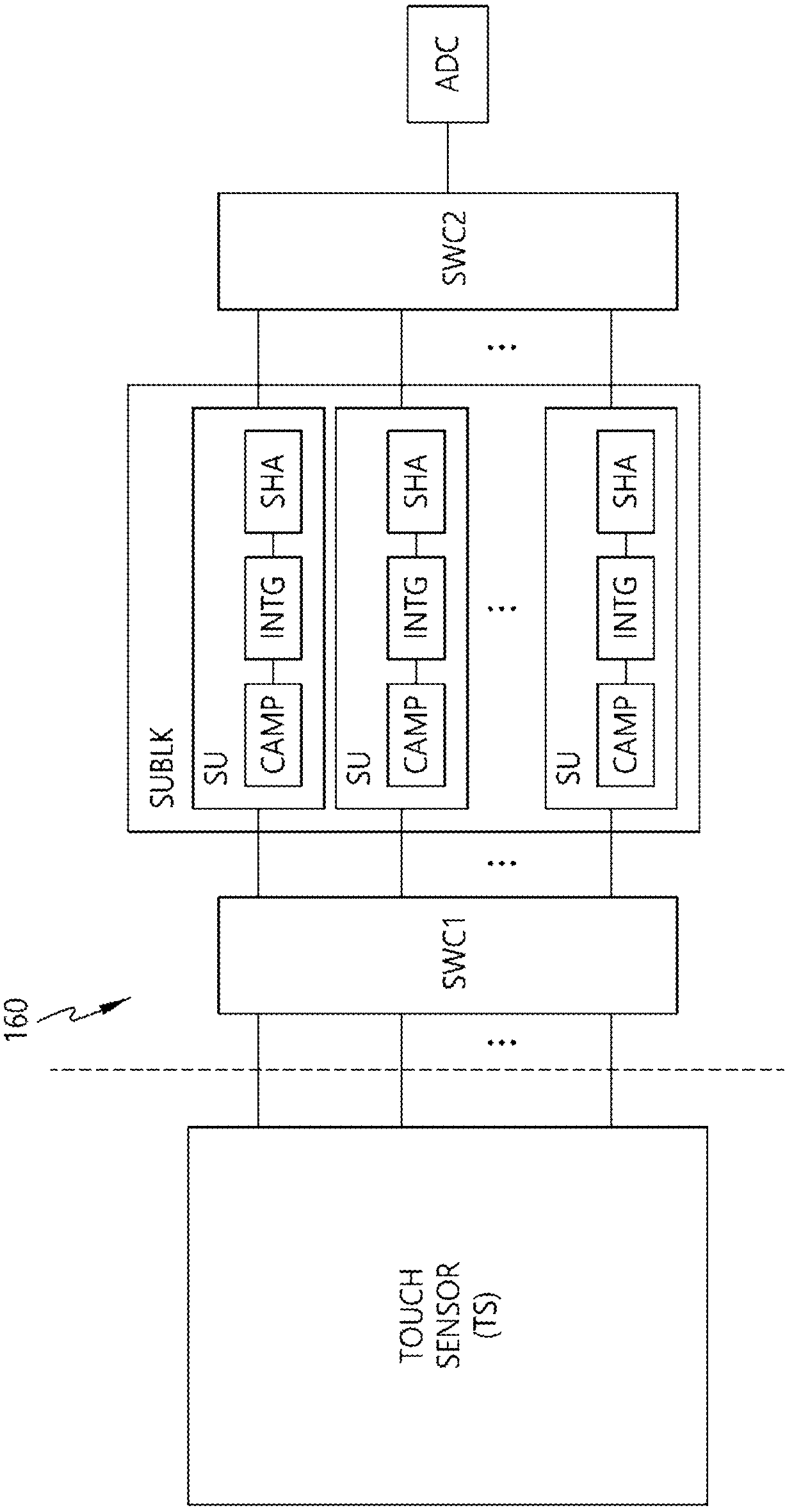
FIG. 6 illustrates a touch driving circuit according to embodiments of the present disclosure.
Figure 7:
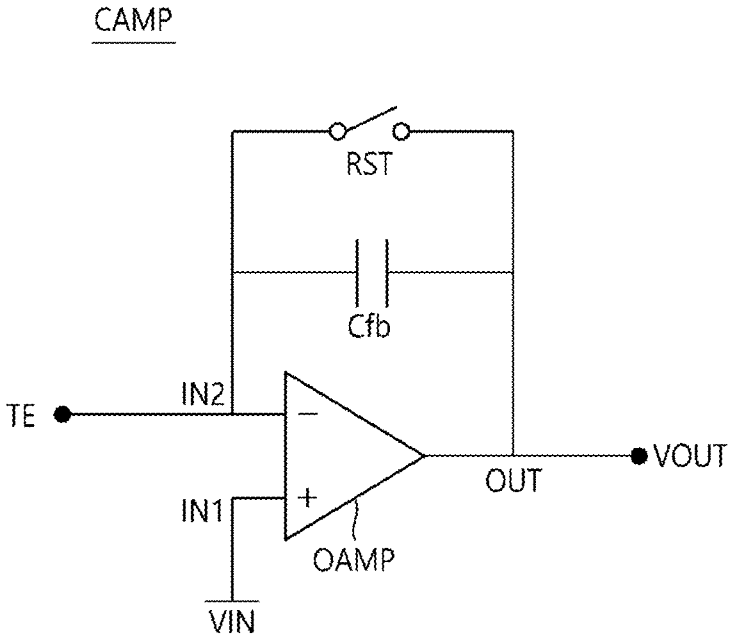
FIG. 7 illustrates a charge amplifier in a touch driving circuit according to embodiments of the present disclosure.

FIG. 6 illustrates a touch driving circuit 160 according to embodiments of the present disclosure, and FIG. 7 illustrates a charge amplifier CAMP in a touch driving circuit 160 according to embodiments of the present disclosure.

Referring to FIG. 6, a touch driving circuit 160 according to embodiments of the present disclosure may include a sensing unit block SUBLK (e.g., a circuit) for sensing a touch sensor TS. The sensing unit block SUBLK may include a plurality of sensing units SU (e.g., a circuits).

Referring to FIG. 6, the touch driving circuit 160 according to embodiments of the present disclosure may further include a first switch circuit SWC1, a second switch circuit SWC2, and an analog-to-digital converter ADC. For example, the first switch circuit SWC1 may be disposed between the touch sensor TS and the sensing unit block SUBLK to control the connection therebetween, and the second switch circuit SWC2 may be disposed between the sensing unit block SUBLK and the analog-to-digital converter ADC to control the connection therebetween.

Referring to FIG. 6, the first switch circuit SWC1 may connect the touch electrodes TE to be sensed among the plurality of touch electrodes TE included in the touch sensor TS to the sensing unit block SUBLK. The first switch circuit SWC1 may include a plurality of switches, and may also be referred to as a multiplexer circuit.

Referring to FIG. 6, the second switch circuit SWC2 may connect one of the plurality of sensing units SU included in the sensing unit block SUBLK to an analog-to-digital converter ADC. The second switch circuit SWC2 may include a plurality of switches, and may also be referred to as a multiplexer circuit.

Referring to FIG. 6, each of the plurality of sensing units SU may include a charge amplifier CAMP, an integrator INTG, and a sample and hold circuit SHA. For example, the integrator INTG may be connected between the charge amplifier CAMP and the sample and hold circuit SHA.

Referring to FIG. 6, the charge amplifier CAMP may be electrically connected to one or more touch electrodes TE selected by the first switch circuit SWC1 among the plurality of touch electrodes TE included in the touch sensor TS.

The charge amplifier CAMP may receive a touch sensing signal from one or more touch electrodes TE selected as a sensing target among the plurality of connectable touch electrodes TE.

Referring to FIG. 6, the first switch circuit SWC1 may connect a touch electrode TE as a sensing target among a plurality of connectable touch electrodes TE to the charge amplifier CAMP in a corresponding sensing unit SU among a plurality of sensing units SU.

Accordingly, the charge amplifier CAMP in the corresponding sensing unit SU may receive a touch sensing signal from the touch electrode TE which is a sensing target. That is, the charge amplifier CAMP in the corresponding sensing unit SU may detect a touch sensing signal from the touch electrode TE as a sensing target. Here, the touch sensing signal detected in the touch electrode TE may correspond to a capacitance (e.g., mutual capacitance or self capacitance) related to the touch electrode TE.

Referring to FIGS. 6 and 7, the charge amplifier CAMP may output an output signal VOUT corresponding to a touch sensing signal detected at the touch electrode TE. That is, the charge amplifier CAMP may output an output signal VOUT based on a touch sensing signal detected at the touch electrode TE.

Referring to FIG. 7, the charge amplifier CAMP may include an operational amplifier OAMP including a first input node IN1, a second input node IN2 and an output node OUT, and a feedback capacitor Cfb between the second input node IN2 and the output node OUT.

Referring to FIG. 7, the first input node IN1 may be a node into which an input signal VIN is input. The second input node IN2 may be a node electrically connected to the touch electrode TE selected by the first switch circuit SWC1. The output node OUT may be a node connected to an integrator INTG, and may be a node outputting an output signal VOUT.

Referring to FIG. 7, a charge corresponding to the capacitance (e.g., self capacitance or mutual capacitance) of the touch electrode TE may be charged in the feedback capacitor Cfb, and an output signal VOUT corresponding to the amount of charge charged to the feedback capacitor Cfb may be output. to an integrator INTG. Here, the touch driving circuit 160 detecting a touch sensing signal from the touch electrode TE may mean detecting the capacitance (e.g., self capacitance or mutual capacitance) of the touch electrode TE, and may mean charging the amount of charge corresponding to the capacitance (e.g., self capacitance or mutual capacitance) of the touch electrode TE to the feedback capacitor Cfb and outputting an output signal VOUT corresponding to the amount of charge charged.

Referring to FIG. 7, the charge amplifier CAMP may further include a reset switch RST which controls the connection between the second input node IN2 and the output node OUT. That is, when the reset switch RST is turned on, the second input node IN2 is connected to the output node OUT.

Referring to FIG. 6, the integrator INTG may output an integral value by integrating the output signal VOUT of the charge amplifier CAMP. Here, the charge amplifier CAMP and the integrator INTG may be implemented in an integrated manner.

The sample and hold circuit SHA may store the integral value output from the integrator INTG until the next integral value is output from the integrator INTG.

The second switch circuit SWC2 may connect one of the plurality of sensing units SU included in the sensing unit block SUBLK to an analog-to-digital converter ADC.

The analog-to-digital converter ADC may convert the integral value stored in the sample and hold circuit SHA in the sensing unit SU selected by the second switch circuit SWC2 into a digital value to generate touch sensing data.

The touch driving circuit 160 may transmit the touch sensing data generated by the analog-to-digital converter ADC to the touch controller 170. In this case, the touch sensing data may be transmitted in the form of a differential signal.

Meanwhile, referring to FIG. 7, the input signal VIN input to the first input node IN1 of the charge amplifier CAMP may be a signal whose voltage level does not fluctuate or a signal whose voltage level fluctuates or swings.

The type of the input signal VIN may vary depending on the sensing method.

More specifically, if touch sensing is performed in a mutual-sensing manner, the input signal VIN may be a reference voltage whose voltage level does not fluctuate. If touch sensing is performed in a self-sensing manner, the input signal VIN may be a second touch driving signal TDS2 whose voltage level fluctuates.

The type of the input signal VIN may vary depending on the type of the touch sensing mode.

More specifically, during the first touch sensing mode period Tt1, the input signal VIN may be a reference voltage whose voltage level does not fluctuate. During the second touch sensing mode period Tt2, the input signal VIN may be a second touch driving signal TDS2 whose voltage level fluctuates.

Hereinafter, it will be described a circuit structure and operation during the first touch sensing mode period Tt1 and the second touch sensing mode period Tt2 in more detail.

Figure 8:
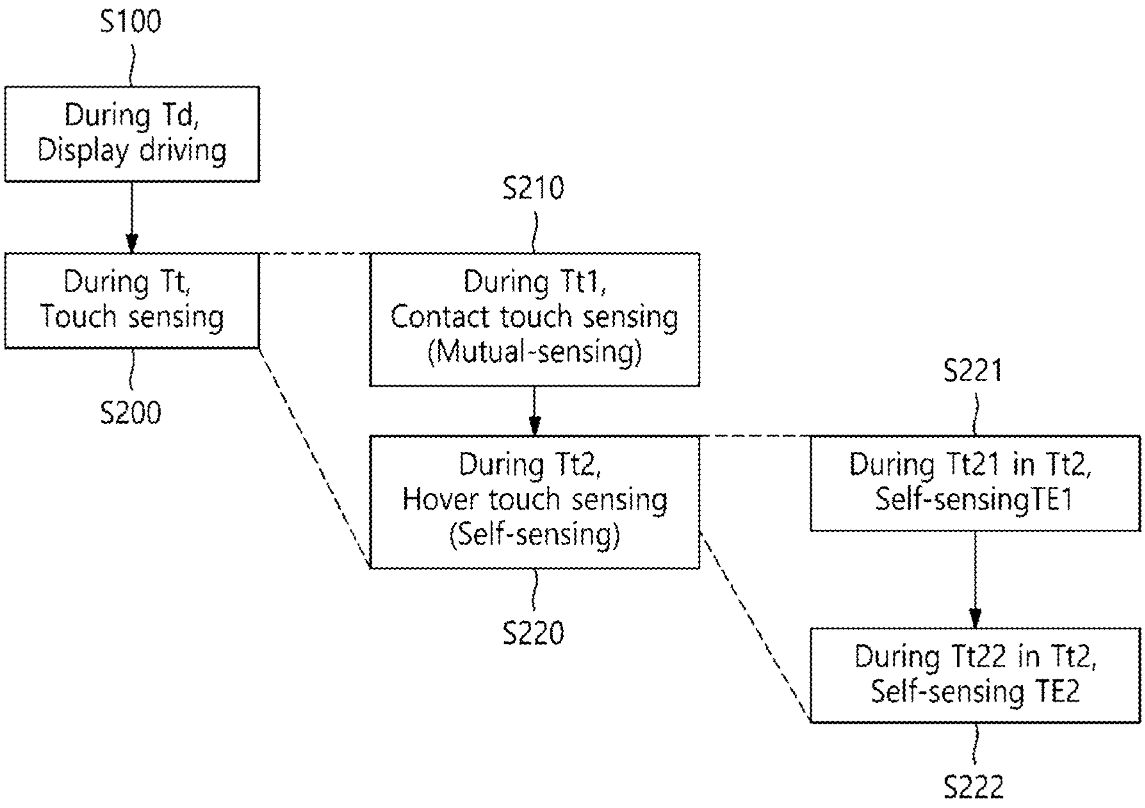
FIG. 8 is a flowchart of an operating method of a touch display device according to embodiments of the present disclosure.

FIG. 8 is a flowchart of an operating method of a touch display device 100 according to embodiments of the present disclosure.

Referring to FIG. 8, the operating method of the touch display device 100 according to the embodiments of the present disclosure may include a step (S100) in which the display driving circuit performs display driving for displaying an image through the display panel 110 during the display mode period Td, and a step (S200) in which the touch sensing circuit 150 performs touch sensing during the touch sensing mode period Tt.

The touch sensing mode period Tt may include a first touch sensing mode period Tt1 and a second touch sensing mode period Tt2 which do not temporally overlap with each other.

During the first touch sensing mode period Tt1, a contact touch sensing may be performed in a mutual-sensing manner. During the second touch sensing mode period Tt2, a hover touch sensing (i.e., non-contact touch sensing) may be performed in a self-sensing manner.

Referring to FIG. 8, step S200 may include a step (S210) in which the touch sensing circuit 150 senses a contact touch in a mutual-sensing manner during the first touch sensing mode period Tt1, and a step (S220) in which the touch sensing circuit 150 senses a hover touch (i.e., non-contact touch) in a self-sensing manner during the second touch sensing mode period Tt2.

The second touch sensing mode period Tt2 may include a first sub-sensing period Tt21 and a second sub-sensing period Tt22 that do not overlap with each other. The first sub-sensing period Tt21 may be a period for sensing a plurality of first touch electrodes TE1 in a self-sensing manner, and the second sub-sensing period Tt22 may be a period for sensing a plurality of second touch electrodes TE2 in a self-sensing manner.

Referring to FIG. 8, step S220 may include a step (S221) in which the touch sensing circuit 150 senses a plurality of first touch electrodes TE1 in a self-sensing manner during the first sub-sensing period Tt21, and a step (S222) in which the touch sensing circuit 150 senses a plurality of second touch electrodes TE2 in a self-sensing manner during the second sub-sensing period Tt22.

In step S221, during the first sub-sensing period Tt21, a second touch driving signal TDS2 may be simultaneously applied to two or more first touch electrodes TE1 which are electrically connected to each other among a plurality of first touch electrodes TE1.

In step S222, during the second sub-sensing period Tt22, a second touch driving signal TDS2 may be simultaneously applied to two or more second touch electrodes TE2 that are electrically connected to each other among a plurality of second touch electrodes TE2.

Figure 9A:
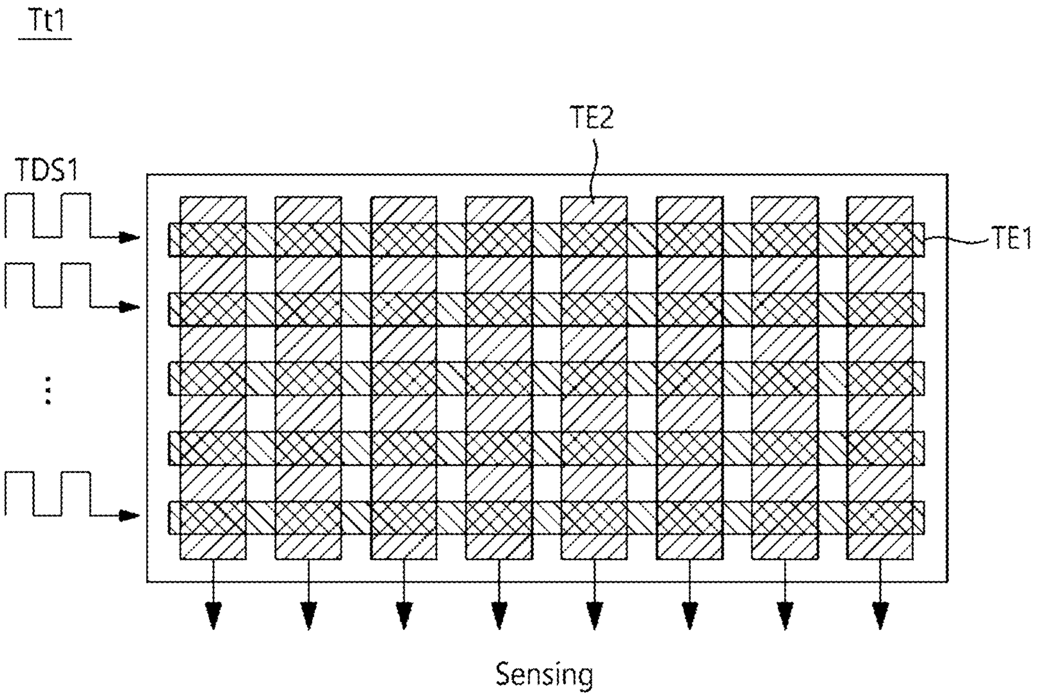
FIG. 9A and FIG. 9B are diagrams illustrating a driving situation when an operation period of a touch display device is a first touch sensing mode period according to embodiments of the present disclosure.
Figure 9B:
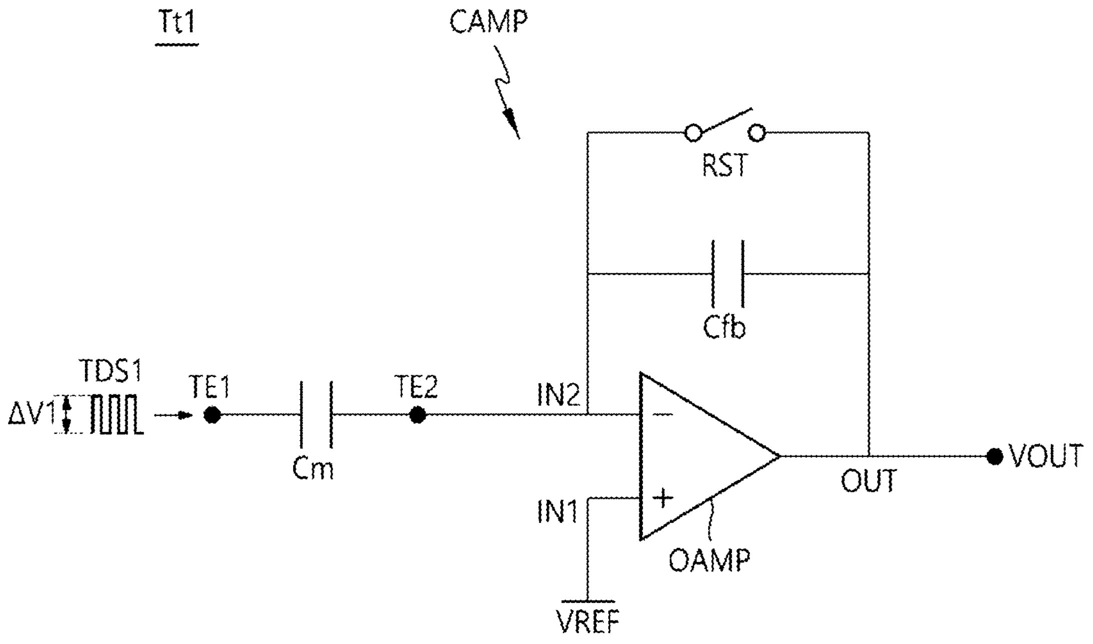

FIG. 9A and FIG. 9B are diagrams illustrating a driving situation when an operating period of a touch display device 100 is a first touch sensing mode period Tt1 according to embodiments of the present disclosure.

Referring to FIGS. 9A and 9B, during the first touch sensing mode period Tt1, there may be performed an operation for sensing a contact touch in a mutual-sensing manner.

Referring to FIGS. 9A and 9B, during the first touch sensing mode period Tt1, the touch driving circuit 160 may apply a first touch driving signal TDS1 having a first amplitude ΔV1 to at least one of the plurality of first touch electrodes TE1.

For example, during the first touch sensing mode period Tt1, the first touch driving signal TDS1 may be sequentially applied to the plurality of first touch electrodes TE1. That is, at any point in time during the first touch sensing mode period Tt1, the first touch driving signal TDS1 may be applied to one first touch electrode TE1.

For another example, during the first touch sensing mode period Tt1, the plurality of first touch electrodes TE1 may be grouped into a plurality of first touch electrode groups. Each of the plurality of first touch electrode groups may include two or more first touch electrodes TE1. During the first touch sensing mode period Tt1, the first touch driving signal TDS1 may be sequentially applied to the plurality of first touch electrode groups. That is, at any point in time during the first touch sensing mode period Tt1, the first touch driving signal TDS1 may be simultaneously applied to two or more first touch electrodes TE1 included in one first touch electrode group. In this way, when the first touch driving signal TDS1 is simultaneously applied to two or more first touch electrodes TE1 included in one first touch electrode group during the first touch sensing mode period Tt1, the first touch driving signal TDS1 applied to at least one first touch electrode TE1 among the two or more first touch electrodes TE1 and the first touch driving signal TDS1 applied to the remaining first touch electrodes TE1 may have a phase difference. For example, during the first touch sensing mode period Tt1, the first touch driving signal TDS1 applied to at least one of the two or more first touch electrodes TE1 and the first touch driving signal TDS1 applied to the remaining first touch electrodes TE1 may be in an antiphase relationship (e.g., 180-degree phase difference).

Referring to FIGS. 9A and 9B, during the first touch sensing mode period Tt1, a reference voltage VREF in the form of a direct current voltage (i.e., DC voltage) whose voltage level does not change may be input to the first input node IN1 of the charge amplifier CAMP in the touch driving circuit 160.

Referring to FIGS. 9A and 9B, during the first touch sensing mode period Tt1, the second input node IN2 of the charge amplifier CAMP in the touch driving circuit 160 may be electrically connected to at least one second touch electrode TE2 among the plurality of second touch electrodes TE2.

Referring to FIGS. 9A and 9B, during the first touch sensing mode period Tt1, a mutual capacitance Cm may be formed between the first touch electrode TE1 and the second touch electrode TE2. The charges corresponding to the mutual capacitance Cm between the first touch electrode TEL and the second touch electrode TE2 may be charged in the feedback capacitor Cfb of the charge amplifier CAMP. An output voltage VOUT corresponding to the amount of charge charged in the feedback capacitor Cfb may be output to the output node OUT of the charge amplifier CAMP. Referring to FIG. 6, the integrator INTG may output an integral value by integrating the output voltage VOUT of the charge amplifier CAMP.

Figure 10A:
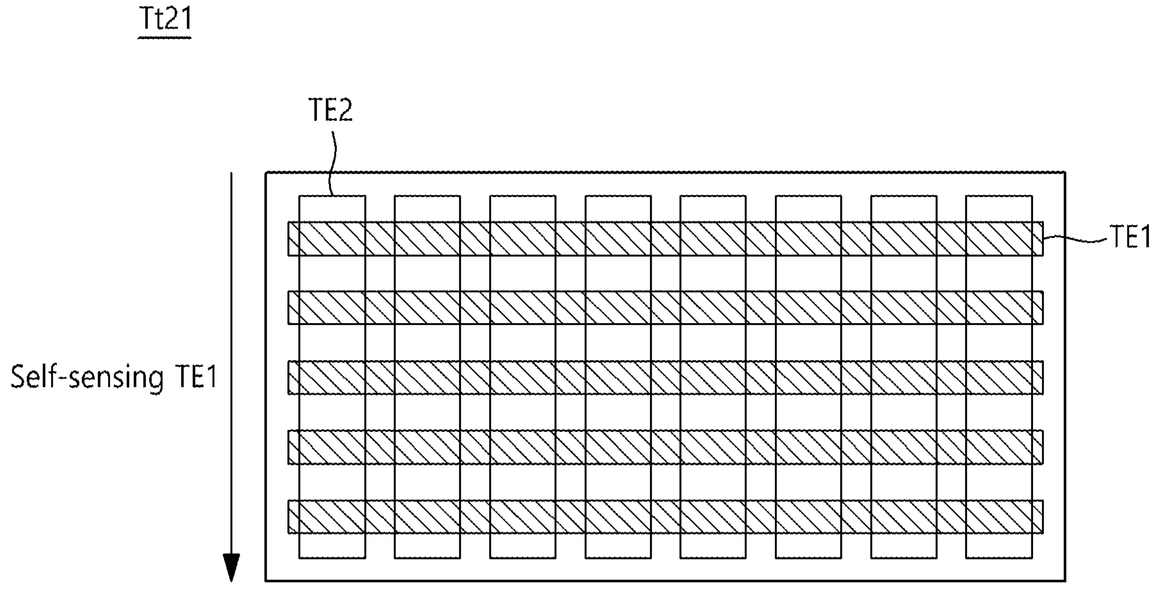
FIG. 10A and FIG. 10B are diagrams illustrating a driving situation when an operating period of a touch display device is a first sub-sensing period during a second touch sensing mode period according to embodiments of the present disclosure.
Figure 10B:
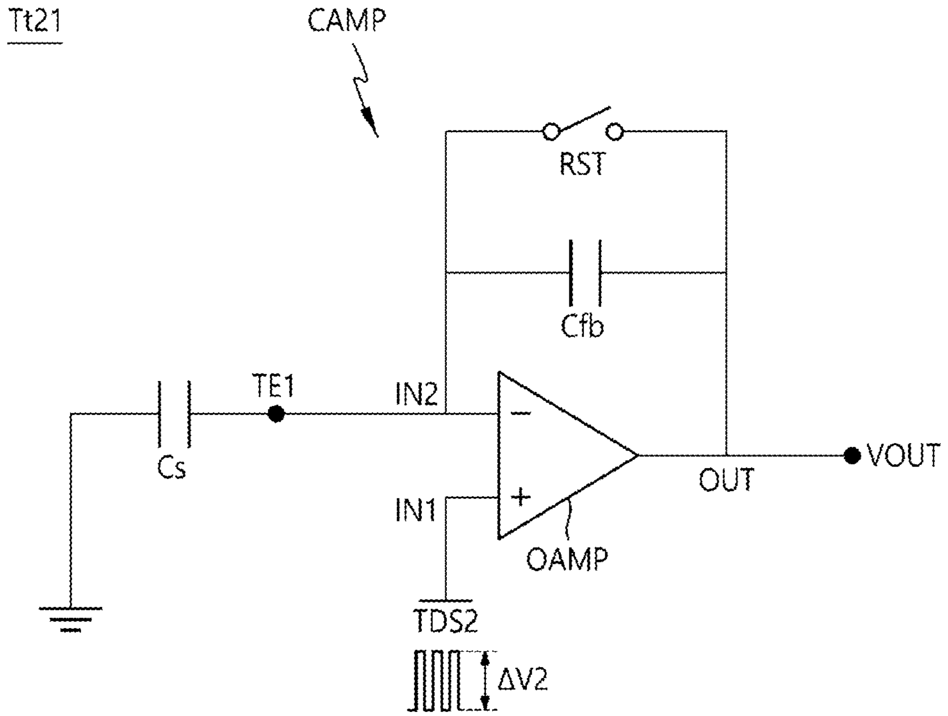

FIG. 10A and FIG. 10B are diagrams illustrating a driving situation when an operating period of a touch display device 100 is a first sub-sensing period Tt21 during a second touch sensing mode period Tt2 according to embodiments of the present disclosure.

Figure 11A:
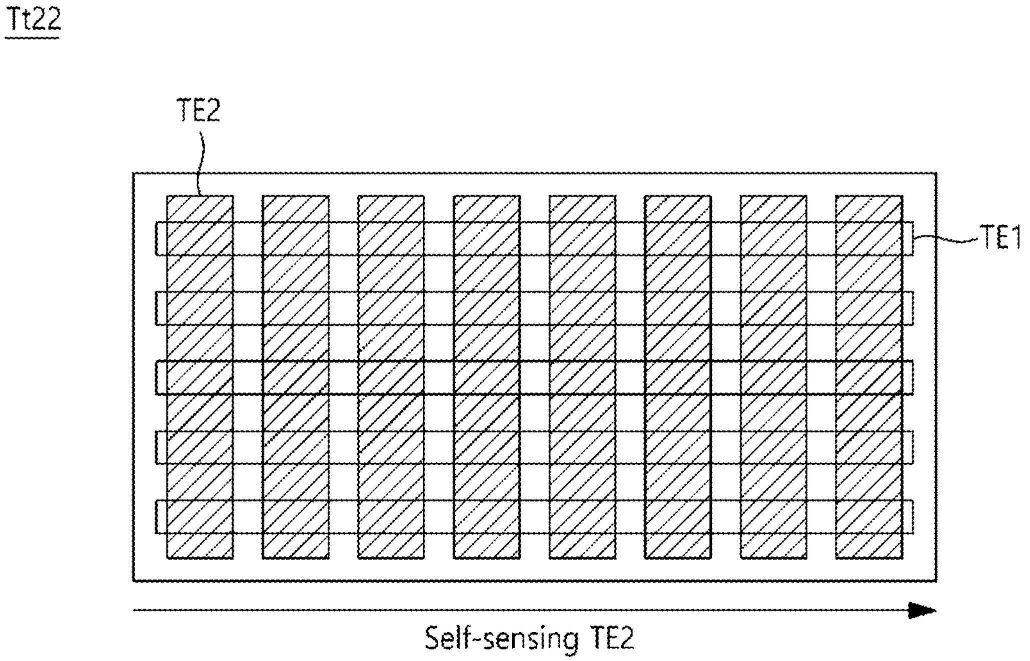
FIGS. 11A and 11B are diagrams illustrating a driving situation when the operating period of a touch display device is a second sub-sensing period during a second touch sensing mode period according to embodiments of the present disclosure.
Figure 11B:
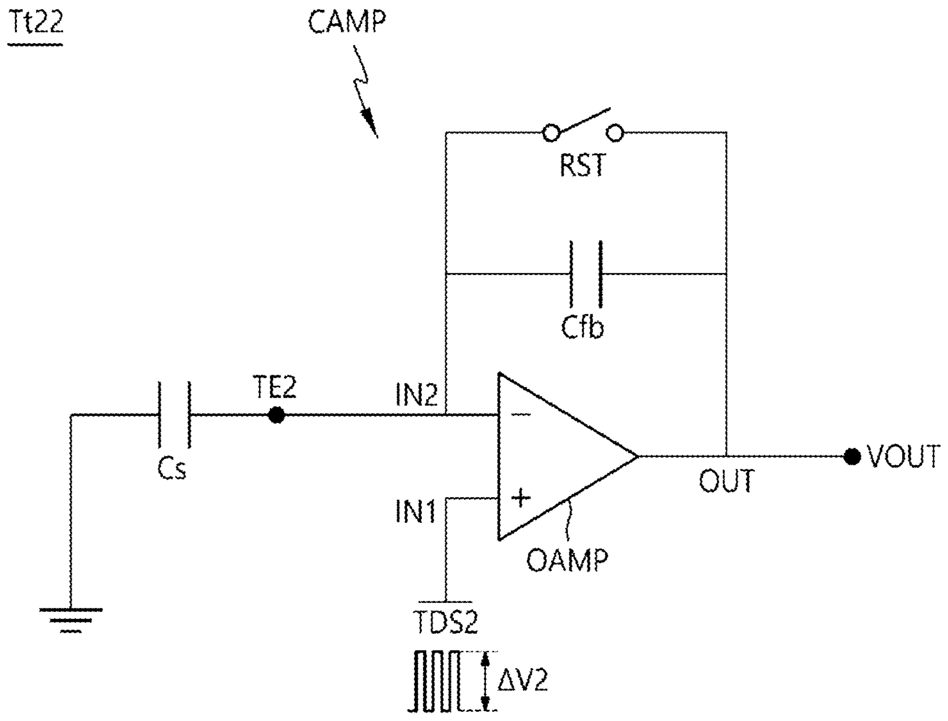

FIGS. 11A and 11B are diagrams illustrating a driving situation when the operating period of a touch display device 100 is a second sub-sensing period Tt22 during a second touch sensing mode period Tt2 according to embodiments of the present disclosure.

Referring to FIGS. 10A, 10B, 11A and 11B, during the second touch sensing mode period Tt2, there may be performed an operation for sensing a hover touch in a self-sensing manner.

Referring to FIGS. 10A, 10B, 11A and 11B, during the second touch sensing mode period Tt2, the first sub-sensing period Tt21 may be performed first, and then the second sub-sensing period Tt22 may be performed. Alternatively, during the second touch sensing mode period Tt2, the second sub-sensing period Tt22 may be performed first, and then the first sub-sensing period Tt21 may be performed.

Referring to FIGS. 10A and 10B, during the first sub-sensing period Tt21, the plurality of second touch electrodes TE2 may be in an electrically floating state. That is, during the first sub-sensing period Tt21, the plurality of second touch electrodes TE2 may be in a state in which no electrical signal or voltage is applied.

Referring to FIGS. 10A and 10B, during the first sub-sensing period Tt21, a second touch driving signal TDS2 having a variable voltage level may be input to the first input node IN1 of the charge amplifier CAMP in the touch driving circuit 160. The second touch driving signal TDS2 may have a second amplitude ΔV2 greater than the first amplitude ΔV1.

Referring to FIGS. 10A and 10B, during the first sub-sensing period Tt21, the second input node IN2 of the charge amplifier CAMP in the touch driving circuit 160 may be electrically connected to at least one first touch electrode TE1 among the plurality of first touch electrodes TE1.

Accordingly, the second touch driving signal TDS2 input to the first input node IN1 of the charge amplifier CAMP may be applied to at least one first touch electrode TE1 connected to the second input node IN2 of the charge amplifier CAMP.

Referring to FIGS. 10A and 10B, during the first sub-sensing period Tt21, a self-capacitance Cs may be formed in the first touch electrode TE1. The charges corresponding to the self-capacitance Cs formed in the first touch electrode TE1 may be charged in the feedback capacitor Cfb of the charge amplifier CAMP. An output voltage VOUT corresponding to the amount of charge charged in the feedback capacitor Cfb may be output to the output node OUT of the charge amplifier CAMP. Referring to FIG. 6, the integrator INTG may output an integral value by integrating the output voltage VOUT of the charge amplifier CAMP.

Referring to FIGS. 11A and 11B, during the second sub-sensing period Tt22, the plurality of first touch electrodes TE1 may be in an electrically floating state. That is, during the second sub-sensing period Tt22, the plurality of first touch electrodes TE1 may be in a state where no electrical signal or voltage is applied.

Referring to FIGS. 11A and 11B, during the second sub-sensing period Tt22, the second touch driving signal TDS2 may be input to the first input node IN1 of the charge amplifier CAMP in the touch driving circuit 160. The second touch driving signal TDS2 may have a second amplitude ΔV2 greater than the first amplitude ΔV1.

Referring to FIGS. 11A and 11B, during the second sub-sensing period Tt22, the second input node IN2 of the charge amplifier CAMP in the touch driving circuit 160 may be electrically connected to at least one second touch electrode TE2 among the plurality of second touch electrodes TE2.

Accordingly, the second touch driving signal TDS2 input to the first input node IN1 of the charge amplifier CAMP may be applied to at least one second touch electrode TE2 connected to the second input node IN2 of the charge amplifier CAMP.

Referring to FIGS. 11A and 11B, during the second sub-sensing period Tt22, a self-capacitance Cs may be formed in the second touch electrode TE2. The charges corresponding to the self-capacitance Cs formed on the second touch electrode TE2 may be charged in the feedback capacitor Cfb of the charge amplifier CAMP. An output voltage VOUT corresponding to the amount of charge charged to the feedback capacitor Cfb may be output to the output node OUT of the charge amplifier CAMP. Referring to FIG. 6, the integrator INTG may output an integral value by integrating the output voltage VOUT of the charge amplifier CAMP.

As described above, during the second touch sensing mode period Tt2, which is the hover mode period, self-sensing may be performed when sensing a non-contact touch.

Meanwhile, the touch display device 100 according to the embodiments of the present disclosure may perform a signal control method for increasing the second amplitude s, during the second touch driving signal TDS2 in order to improve the sensing performance during the second touch sensing mode period Tt2, which is the hover mode period, and may also perform a sensing area expansion method for expanding the touch electrode area to which the second touch driving signal TDS2 is simultaneously applied and sensed.

The touch display device 100 according to the embodiments of the present disclosure may bind two or more first touch electrodes TE1 among the plurality of first touch electrodes TE1 to one first sensing group (hereinafter, referred to as a horizontal binding group), and may bind two or more second touch electrodes TE2 among the plurality of second touch electrodes TE2 to one second sensing group (hereinafter, referred to as a vertical binding group) in order to perform the sensing area expansion method.

Hereinafter, it will be described in more detail a method for improving self-sensing performance during the second touch sensing mode period Tt2 as a hover mode period.

Figure 12:
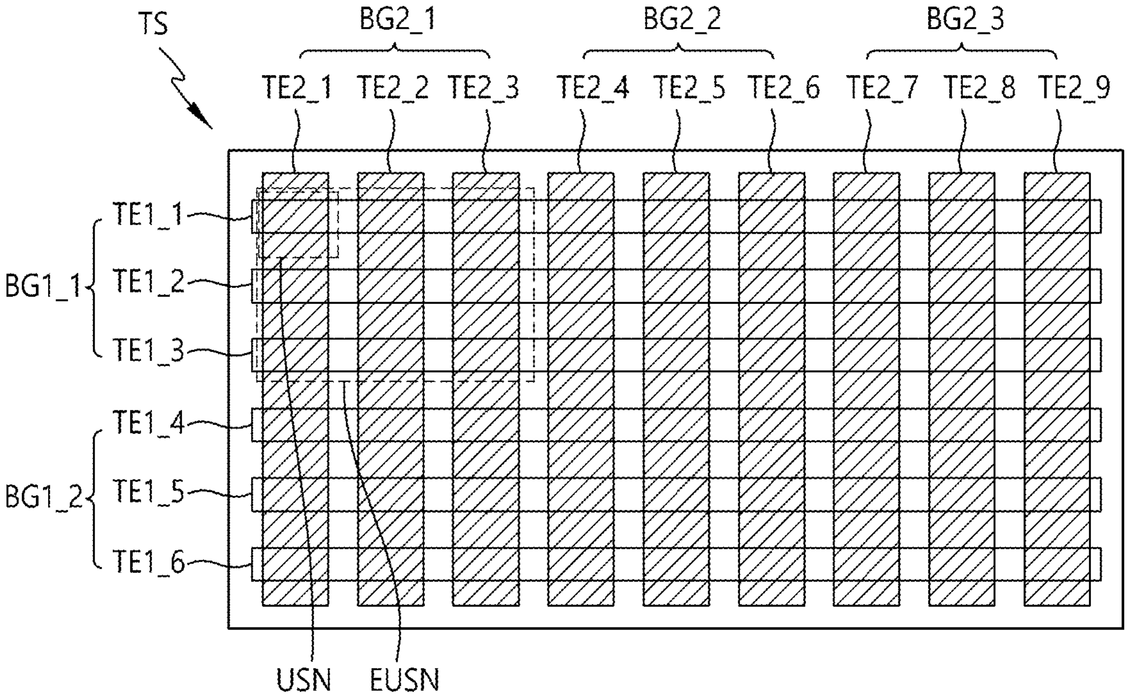
FIG. 12 illustrates binding groups for a touch sensor according to embodiments of the present disclosure as examples.

FIG. 12 exemplarily illustrates binding groups BG1_1, BG1_2, BG2_1, BG2_2 and BG2_3 for a touch sensor TS according to embodiments of the present disclosure. For example, FIG. 12 exemplarily illustrates two horizontal binding groups BG1_1 and BG1_2 and three vertical binding groups BG2_1, BG2_2 and BG2_3.

Referring to FIG. 12, in order to explain a sensing area expansion method for improving self-sensing performance during the second touch sensing mode period Tt2, which is a hover mode period, it will be exemplified a case in which the touch sensor TS includes six first touch electrodes TE1_1 to TE1_6 and nine second touch electrodes TE2_1 to TE2_9.

Referring to FIG. 12, six first touch electrodes TE1_1 to TE1_6 may be bound in groups of three to include two horizontal binding groups BG1_1 and BG1_2. Nine second touch electrodes TE2_1 to TE2_9 may be bound in groups of three to include three vertical binding groups BG2_1, BG2_2 and BG2_3.

Referring to FIG. 12, three first touch electrodes included in each of two horizontal binding groups BG1_1 and BG1_2 may be electrically connected to each other. Three second touch electrodes included in each of three vertical binding groups BG2_1, BG2_2 and BG2_3 may be electrically connected to each other.

If the touch display device 100 according to the embodiments of the present disclosure does not adopt the binding technique for the sensing area expansion method during the second touch sensing mode period Tt2 as the hover mode period, during self-sensing, a regular unit sensor node USN may be an area where one first touch electrode TE1_1 and one second touch electrode TE2_1 intersect.

Alternatively, if the touch display device 100 according to the embodiments of the present disclosure adopts the binding technique for the sensing area expansion method during the second touch sensing mode period Tt2 which is the hover mode period, during self-sensing, an expanded unit sensor node EUSN may be an area where binding groups BG1_1 and binding groups BG2_1 intersect, such as an area where three first touch electrodes TE1_1, TE1_2 and TE1_3 and three second touch electrodes TE2_1, TE2_2 and TE2_3 intersect, without being limited thereto.

The extended unit sensor node EUSN may be significantly larger than a regular unit sensor node USN. According to the example of FIG. 12, an extended unit sensor node EUSN is about 9 times larger than a regular unit sensor node USN.

If the touch display device 100 according to the embodiments of the present disclosure adopts a binding technique for a sensing area expansion method during the second touch sensing mode period Tt2 which is a hover mode period, there may be improved the self-sensing performance for a non-contact touch, and the self-sensing speed may also be increased.

If the touch display device 100 according to the embodiments of the present disclosure applies a binding technique for a sensing area expansion method during the second touch sensing mode period Tt2 which is a hover mode period, the second touch driving signal TDS2 may be simultaneously applied to at least one of the binding groups BG1_1, BG1_2, BG2_1, BG2_2 and BG2_3.

Referring to FIG. 12, since the six first touch electrodes TE1_1 to TE1_6 and the nine second touch electrodes TE2_1 to TE2_9 intersect and overlap with each other, an unwanted parasitic capacitance may occur between a binding group supplied with the second touch driving signal TDS2 and a binding group to which the second touch driving signal TDS2 is not applied.

Due to the occurrence of this parasitic capacitance, there may be increased a load for the binding group to which the second touch driving signal TDS2 is applied, and the sensing performance may deteriorate. Here, the load for the binding group to which the second touch driving signal TDS2 is applied may be the resistance-capacitance (RC) delay value of the touch electrodes included in the binding group.

Accordingly, the touch display device 100 according to the embodiments of the present disclosure may perform an auxiliary driving method capable of preventing the formation of parasitic capacitance when applying a binding technique for a sensing area expansion method during the second touch sensing mode period Tt2 which is a hover mode period.

Hereinafter, it will be described an auxiliary driving method during the second touch sensing mode period Tt2 as a hover mode period in detail.

Figure 13:
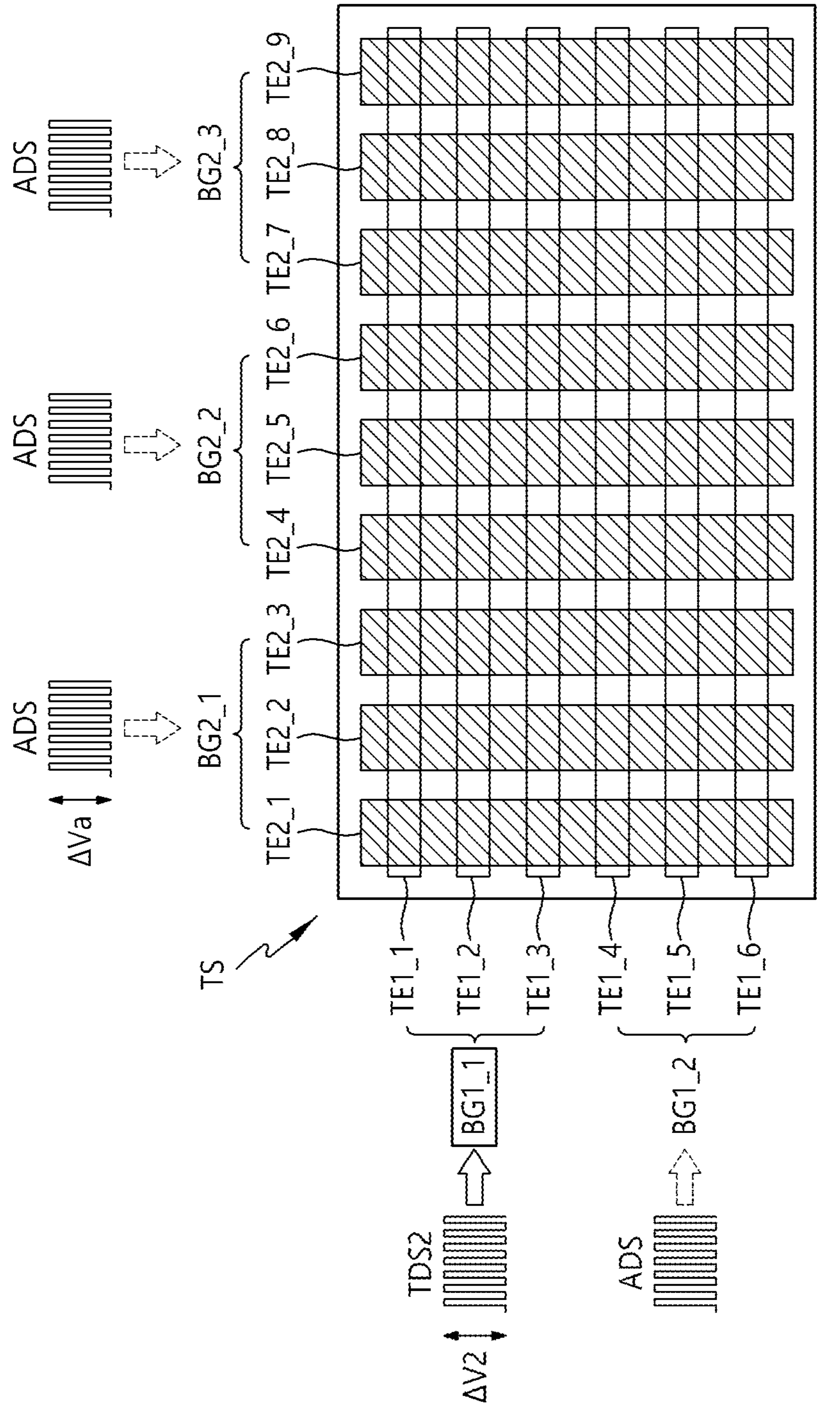
FIGS. 13 and 14 illustrate a touch driving and an auxiliary driving for binding groups for a touch sensor according to embodiments of the present disclosure as examples.
Figure 14:
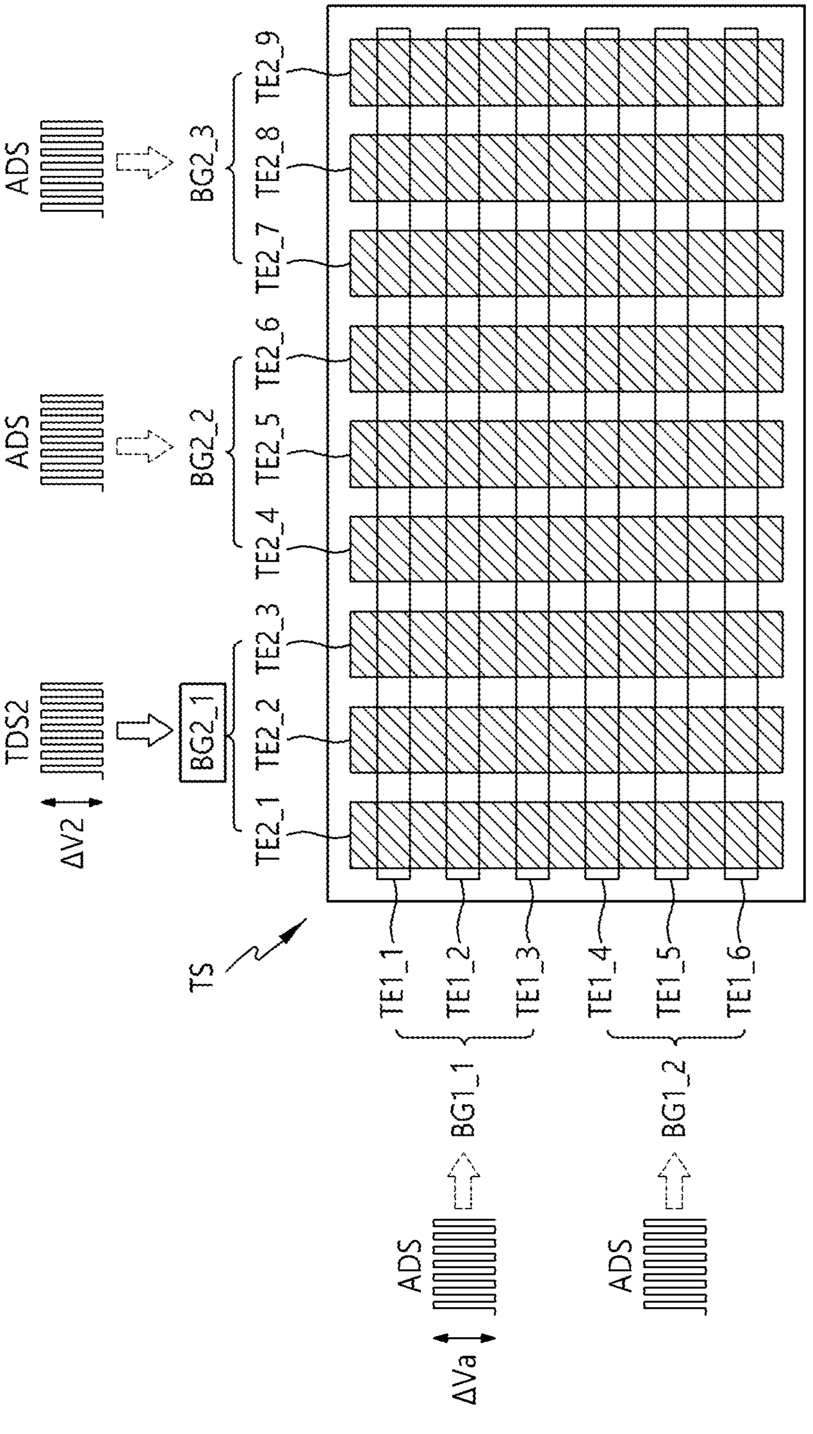

FIG. 13 and FIG. 14 exemplarily illustrate touch driving and auxiliary driving for binding groups BG1_1, BG1_2, BG2_1, BG2_2 and BG2_3 for a touch sensor TS according to the embodiments of the present disclosure. For example, FIG. 13 and FIG. 14 exemplarily illustrate two horizontal binding groups BG1_1 and BG1_2 and three vertical binding groups BG2_1, BG2_2 and BG2_3.

Referring to FIG. 13 and FIG. 14, six first touch electrodes TE1_1 to TE1_6 may be bound in groups of three to include two horizontal binding groups BG1_1 and BG1_2. Nine second touch electrodes TE2_1 to TE2_9 may be bound in groups of three to include three vertical binding groups BG2_1, BG2_2 and BG2_3.

Referring to FIG. 13, the touch driving circuit 160 may perform self-sensing for a first horizontal binding group BG1_1 among the two horizontal binding groups BG1_1 and BG1_2 at a time point during the second touch sensing mode period Tt2 which is the hover mode period. That is, at any time point in the second touch sensing mode period Tt2 as the hover mode period, the touch driving circuit 160 may perform touch driving for the first horizontal binding group BG1_1 and sense the first horizontal binding group BG1_1.

Referring to FIG. 13, the touch driving circuit 160 performing touch driving for the first horizontal binding group BG1_1 may mean simultaneously supplying the second touch driving signal TDS2 to three first touch electrodes TE1_1, TE1_2 and TE1_3 included in the first horizontal binding group BG1_1.

Referring to FIG. 13, the sensing of the first horizontal binding group BG1_1 by the touch driving circuit 160 may mean sensing of the capacitance formed by integrally on three first touch electrodes TE1_1, TE1_2 and TE1_3 included in the first horizontal binding group BG1_1.

Referring to FIG. 13, in self-sensing for the first horizontal binding group BG1_1, the three first touch electrodes TE1_1, TE1_2 and TE1_3 included in the first horizontal binding group BG1_1 may form a parasitic capacitance with other surrounding touch electrodes TE1_4 to TE1_6 and TE2_1 to TE2_9.

Referring to FIG. 13, the touch driving circuit 160 may perform the auxiliary driving to prevent or at least reduce the formation of parasitic capacitance in the first horizontal binding group BG1_1 sensed at the present time.

Referring to FIG. 13, the touch driving circuit 160 may supply an auxiliary driving signal ADS having completely identical or substantially identical signal characteristics to the second touch driving signal TDS2 to a second horizontal binding group BG1_2 excluding the first horizontal binding group BG1_1 among the two horizontal binding groups BG1_1 and BG1_2 when performing self-sensing for the first horizontal binding group BG1_1.

Accordingly, since a potential difference does not occur or decreases between the first horizontal binding group BG1_1 and the second horizontal binding group BG1_2, a parasitic capacitance may not occur or decrease between the first horizontal binding group BG1_1 and the second horizontal binding group BG1_2.

In addition, the touch driving circuit 160 may supply an auxiliary driving signal ADS having the same or substantially the same signal characteristics as the second touch driving signal TDS2 to three vertical binding groups BG2_1, BG2_2 and BG2_3 when performing self-sensing for the first horizontal binding group BG1_1.

Accordingly, since a potential difference does not occur or decreases between the first horizontal binding group BG1_1 and the three vertical binding groups BG2_1, BG2_2 and BG2_3, the parasitic capacitance may not occur or decrease between the first horizontal binding group BG1_1 and the three vertical binding groups BG2_1, BG2_2 and BG2_3.

Referring to FIG. 14, at any point in time during the second touch sensing mode period Tt2 which is a hover mode period, the touch driving circuit 160 may perform self-sensing for a first vertical binding group BG2_1 among the three vertical binding groups BG2_1, BG2_2 and BG2_3. That is, at any point in time during the second touch sensing mode period Tt2 which is a hover mode period, the touch driving circuit 160 may perform touch driving for the first vertical binding group BG2_1 and sense the first vertical binding group BG2_1.

Referring to FIG. 14, performing touch driving for the first vertical binding group BG2_1 by the touch driving circuit 160 may mean simultaneously supplying the second touch driving signal TDS2 to three second touch electrodes TE2_1, TE2_2 and TE2_3 included in the first vertical binding group BG2_1.

Referring to FIG. 14, sensing the first vertical binding group BG2_1 by the touch driving circuit 160 may mean sensing the capacitance integrally formed by three second touch electrodes TE2_1, TE2_2 and TE2_3 included in the first vertical binding group BG2_1.

Referring to FIG. 14, when performing self-sensing for the first vertical binding group BG2_1, the three second touch electrodes TE2_1, TE2_2 and TE2_3 included in the first vertical binding group BG2_1 may form parasitic capacitance with other surrounding touch electrodes TE1_1 to TEL_6 and TE2_4 to TE2_9.

Referring to FIG. 14, the touch driving circuit 160 may perform auxiliary driving to prevent or at least reduce the formation of parasitic capacitance in the first vertical binding group BG2_1 sensed at a current time.

Referring to FIG. 14, when performing self-sensing for the first vertical binding group BG2_1, the touch driving circuit 160 may supply an auxiliary driving signal ADS having completely identical or substantially identical signal characteristics to the second touch driving signal TDS2 to the second and third vertical binding groups BG2_2 and BG2_3 excluding the first vertical binding group BG2_1 among the three vertical binding groups BG2_1, BG2_2 and BG2_3.

Accordingly, since a potential difference does not occur or decreases between the first vertical binding group BG2_1 and the second and third vertical binding groups BG2_2 and BG2_3, a parasitic capacitance may not occur or decrease between the first vertical binding group BG2_1 and the second and third vertical binding groups BG2_2 and BG2_3.

In addition, the touch driving circuit 160 may supply an auxiliary driving signal ADS having completely identical or substantially identical signal characteristics to the second touch driving signal TDS2 to two horizontal binding groups BG1_1 and BG1_2 when performing self-sensing for the first vertical binding group BG2_1.

Accordingly, since the electric potential difference does not occur or decreases between the first vertical binding group BG2_1 and the two horizontal binding groups BG1_1 and BG1_2, the parasitic capacitance may not occur or decrease between the first vertical binding group BG2_1 and the two horizontal binding groups BG1_1 and BG1_2.

Referring to FIGS. 13 and 14, the configuration that the auxiliary driving signal ADS has completely or substantially the same signal characteristics as the second touch driving signal TDS2 may mean that the phases of the auxiliary driving signal ADS and the second touch driving signal TDS2 are completely identical or substantially identical within a tolerance range.

In addition, the configuration that the auxiliary driving signal ADS has the same or similar signal characteristics as the second touch driving signal TDS2 may mean that the frequency of the auxiliary driving signal ADS is completely identical to the frequency of the second touch driving signal TDS2 or is substantially identical within a tolerance range.

In addition, the configuration that the auxiliary driving signal ADS has the same or similar signal characteristics as the second touch driving signal TDS2 may mean that the amplitude ΔVa of the auxiliary driving signal ADS is completely identical to the second amplitude ΔV2 of the second touch driving signal TDS2 or is substantially identical within a tolerance range.

In summary, a touch display device 100 according to embodiments of the present disclosure may include a touch sensor TS including a plurality of first touch electrodes TE1 and a plurality of second touch electrodes TE2, and a touch driving circuit 160 for supplying a touch driving signal TDS to the touch sensor TS during a touch sensing mode period Tt.

The touch sensing mode period Tt may include a first touch sensing mode period Tt1 in which a first touch driving signal TDS1 is applied to the touch sensor TS as the touch driving signal and a second touch sensing mode period Tt2 in which a second touch driving signal TDS2 is applied to the touch sensor TS as the touch driving signal. For example, the touch sensing mode period Tt may include a first touch sensing mode period Tt1 in which a first touch driving signal TDS1 having a first amplitude pe is applied to the touch sensor TS as a touch driving signal TDS, and a second touch sensing mode period Tt2 in which a second touch driving signal TDS2 having a second amplitude ΔV2 greater than the first amplitude ΔV1 is applied to the touch sensor TS as a touch driving signal TDS.

During the second touch sensing mode period Tt2, the touch driving circuit 160 may supply the second touch driving signal TDS2 to a part of the touch sensor TS (e.g., at least one binding group which is sensed) and supply the auxiliary driving signal ADS to another part of the touch sensor TS (e.g., at least one binding group which is not sensed).

The "auxiliary driving" of the touch display device 100 according to the embodiments of the present disclosure may mean that, during the second touch sensing mode period Tt2 in which self-sensing is performed in units of binding groups, when the second touch driving signal TDS2 is applied to a sensing binding group, the auxiliary driving signal ADS is applied to the non-sensing binding group.

During the second touch sensing mode period Tt2, in order to prevent or reduce the occurrence of unnecessary parasitic capacitance, the signal characteristics of the auxiliary driving signal ADS may be completely or substantially the same as the signal characteristics of the second touch driving signal TDS2. For example, the auxiliary driving signal ADS and the second touch driving signal TDS2 may have the same phase. The frequency of the auxiliary driving signal ADS may be the same as the frequency of the second touch driving signal TDS2. The amplitude ΔVa of the auxiliary driving signal ADS may be completely identical to or substantially identical to the second amplitude ΔV2 of the second touch driving signal TDS2 within a tolerance range.

For example, the auxiliary driving signal ADS and the second touch driving signal TDS2 may have at least one of the phase, frequency, and amplitude completely identical or substantially identical. For another example, the auxiliary driving signal ADS and the second touch driving signal TDS2 may have all of the phase, frequency, and amplitude completely identical or substantially identical.

Hereinafter, it will be described the "auxiliary driving" of the touch display device 100 according to the embodiments of the present disclosure in more detail.

Figure 15:
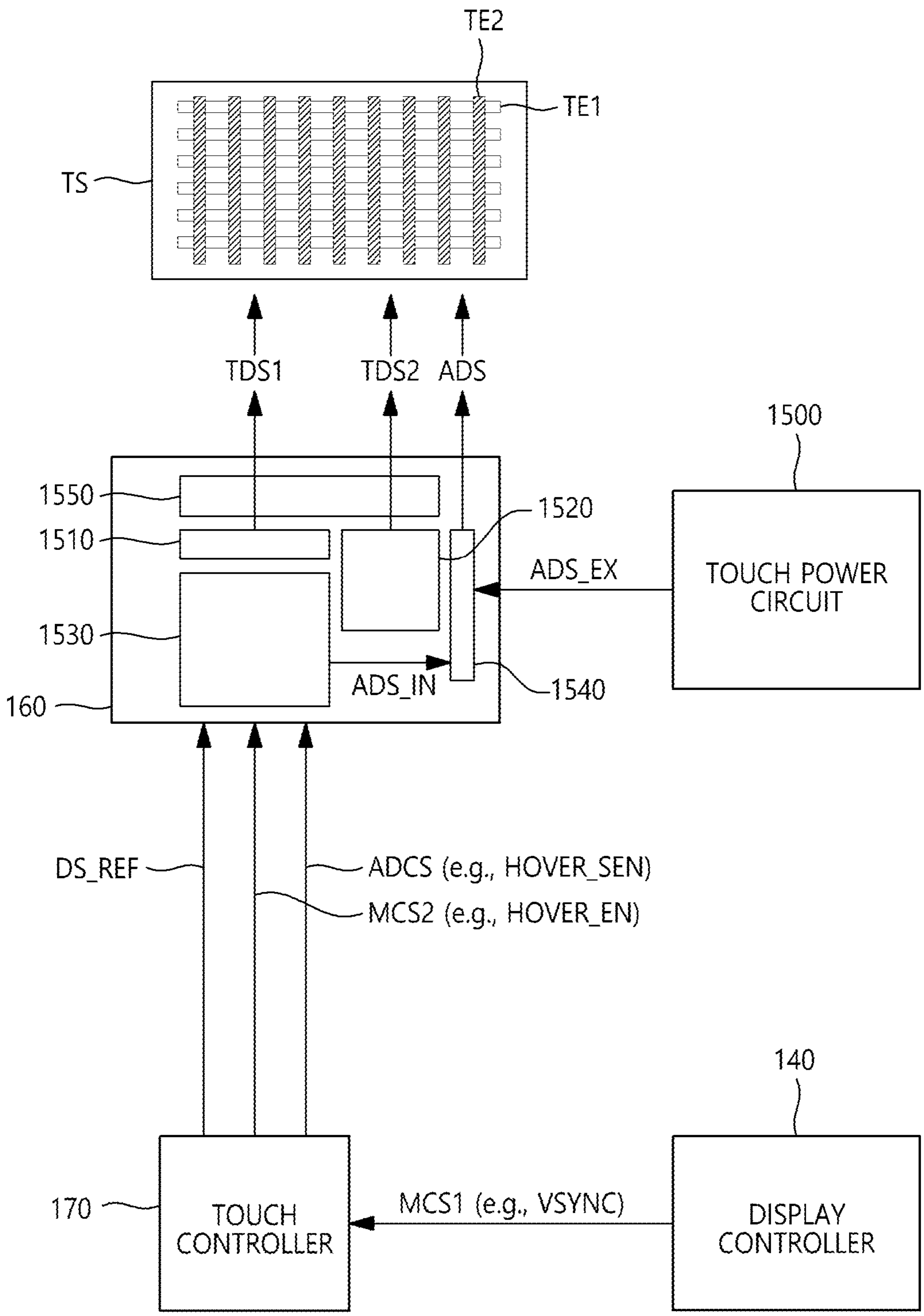
FIG. 15 illustrates a touch sensing system having an auxiliary driving function according to embodiments of the present disclosure.

FIG. 15 illustrates a touch sensing system having an auxiliary driving function according to embodiments of the present disclosure.

Referring to FIG. 15, a touch sensing system having an auxiliary driving function according to embodiments of the present disclosure may include a touch driving circuit 160, a touch controller 170, and a display controller 140. The touch driving circuit 160 may supply a first touch driving signal TDS1, a second touch driving signal TDS2 and an auxiliary driving signal ADS to the touch sensor TS.

The touch driving circuit 160 may supply a first touch driving signal TDS1 to a plurality of first touch electrodes TE1 during a first touch sensing mode period Tt1 and sense each of the plurality of first touch electrodes TE1 to which the first touch driving signal TDS1 is supplied.

The touch driving circuit 160 may supply a second touch driving signal TDS2 to each of a plurality of horizontal binding groups during a part of a second touch sensing mode period Tt2, and sense each of the plurality of horizontal binding groups to which the second touch driving signal TDS2 is supplied. At this time, the touch driving circuit 160 may supply an auxiliary driving signal ADS to each of at least one horizontal binding group to which the second touch driving signal TDS2 is not applied and the plurality of vertical binding groups.

In addition, the touch driving circuit 160 may supply the second touch driving signal TDS2 to each of the plurality of vertical binding groups during the second touch sensing mode period Tt2 and sense each of the plurality of vertical binding groups to which the second touch driving signal TDS2 is supplied. At this time, the touch driving circuit 160 may supply an auxiliary driving signal ADS to each of at least one vertical binding group to which the second touch driving signal TDS2 is not applied and each of the plurality of horizontal binding groups.

Each of the plurality of horizontal binding groups may include two or more first touch electrodes TE1 which are electrically connected to each other. Each of the plurality of vertical binding groups may include two or more second touch electrodes TE2 which are electrically connected to each other.

That is, the second touch sensing mode period Tt2 may include a first sub-sensing period in which the second touch driving signal TDS2 is simultaneously applied to two or more first touch electrodes TE1 electrically connected to each other among the plurality of first touch electrodes TE1, and a second sub-sensing period in which the second touch driving signal TDS2 is simultaneously applied to two or more second touch electrodes TE2 electrically connected to each other among the plurality of second touch electrodes TE2.

During the first sub-sensing period which is a part of the second touch sensing mode period Tt2, the touch driving circuit 160 may supply the auxiliary driving signal ADS to the remaining first touch electrodes TE1 except for two or more first touch electrodes TE1 to which the second touch driving signal TDS2 is simultaneously applied and/or the plurality of second touch electrodes TE2.

During the second sub-sensing period which is another part of the second touch sensing mode period Tt2, the touch driving circuit 160 may supply an auxiliary driving signal ADS to the remaining second touch electrodes TE2 excluding two or more second touch electrodes TE2 to which the second touch driving signal TDS2 is simultaneously applied and/or a plurality of first touch electrodes TE1.

The touch controller 170 may control the touch sensing operation of the touch display device 100 as a whole and control the operation of the touch driving circuit 160.

The display controller 140 may inform the touch controller 170 of the driving timing related to the display operation so that the touch controller 170 may control the driving timing related to the touch sensing operation.

Referring to FIG. 15, the touch sensing system having an auxiliary driving function according to embodiments of the present disclosure may further include a touch power circuit 1500 for supplying various powers required for touch driving. The touch power circuit 1500 may be configured to output an external auxiliary driving signal.

Meanwhile, referring to FIG. 15, the touch driving circuit 160 may perform auxiliary driving during the second touch sensing mode period Tt2. In more detail, the touch driving circuit 160 may supply an auxiliary driving signal ADS to a non-sensing binding group (including a non-sensing horizontal binding group and/or a non-sensing vertical binding group) when supplying a second touch driving signal TDS2 to a sensing binding group during the second touch sensing mode period Tt2.

The touch driving circuit 160 further receives an auxiliary driving control signal ADCS from the touch controller 170, and outputs the external auxiliary driving signal as the auxiliary driving signal ADS according to the auxiliary driving control signal ADCS, or generates and outputs an internal auxiliary driving signal based on the reference driving signal DS_REF input from the outside (e.g., a touch controller 170, etc.) as the auxiliary driving signal ADS.

The touch driving circuit 160 may perform auxiliary driving in at least one of an external driving method and an internal driving method.

For example, during one second touch sensing mode period Tt2, there may be performed both external driving type auxiliary driving and internal driving type auxiliary driving. As another example, during one second touch sensing mode period Tt2, only external driving type auxiliary driving may be performed. As another example, during one second touch sensing mode period Tt2, only internal driving type auxiliary driving may be performed.

Referring to FIG. 15, when performing the external driving type auxiliary driving, the touch driving circuit 160 may output an external auxiliary driving signal ADS_EX input from the outside (e.g., a touch power circuit 1500, etc.) as an auxiliary driving signal ADS in a bypass form.

The external auxiliary driving signal ADS_EX and the second touch driving signal TDS2 may have the same phase. In addition, the external auxiliary driving signal ADS_EX and the second touch driving signal TDS2 may have the same frequency and amplitude.

Referring to FIG. 15, when performing the internal driving type auxiliary driving, the touch driving circuit 160 may generate an internal auxiliary driving signal ADS_IN based on a reference driving signal DS_REF input from the outside (e.g., a touch controller 170, etc.) and output the internal auxiliary driving signal ADS_IN as an auxiliary driving signal ADS.

The internal auxiliary driving signal ADS_IN and the second touch driving signal TDS2 may have the same phase. In addition, the internal auxiliary driving signal ADS_IN and the second touch driving signal TDS2 may have the same frequency and amplitude.

Hereinafter, it will be described components included in a touch sensing system having an auxiliary driving function according to embodiments of the present disclosure in more detail.

Referring to FIG. 15, the touch driving circuit 160 according to embodiments of the present disclosure may include a first touch driving signal output unit 1510 (e.g., a circuit), a sensing unit 1520 (e.g., a circuit), and an auxiliary driving signal output unit 1540 (e.g., a circuit).

The first touch driving signal output unit 1510 may supply a first touch driving signal TDS1 having a first amplitude ΔV1 to each of the plurality of first touch electrodes TE1 during the first touch sensing mode period Tt1.

The sensing unit 1520 may sense each of the plurality of second touch electrodes TE2 during the first touch sensing mode period Tt1.

The sensing unit 1520 may supply a second touch driving signal TDS2 having a second amplitude V1*m* greater than a first amplitude ΔV1 to two or more of the plurality of touch electrodes during the second touch sensing mode period Tt2, and can sense two or more of the touch electrodes (e.g., sensing touch electrodes) to which the second touch driving signal TDS2 is supplied.

The sensing unit 1520 may include the sensing unit block SUBLK of FIG. 6.

The auxiliary driving signal output unit 1540 may supply an auxiliary driving signal ADS to two or more of the plurality of touch electrodes to which the second touch driving signal TDS2 is not applied (e.g., non-sensing touch electrodes included in the non-sensing binding group) during the second touch sensing mode period Tt2.

Referring to FIG. 15, the touch controller 170 may receive a first mode control signal MCS1, and output a reference driving signal DS_REF and a second mode control signal MCS2 to the touch driving circuit 160.

The touch driving circuit 160 may receive a reference driving signal DS_REF and a second mode control signal MCS2 from the touch controller 170, and output a touch driving signal TDS and an auxiliary driving signal ADS according to the reference driving signal DS_REF and the second mode control signal MCS2.

Referring to FIG. 15, the touch power circuit 1500 may output an external auxiliary driving signal ADS_EX to the touch driving circuit 160.

Referring to FIG. 15, the touch driving circuit 160 may further receive an auxiliary driving control signal ADCS from the touch controller 170, and according to the auxiliary driving control signal ADCS, output the external auxiliary driving signal ADS_EX as the auxiliary driving signal ADS, or generate an internal auxiliary driving signal ADS_IN based on the reference driving signal DS_REF and output the internal auxiliary driving signal ADS_IN as the auxiliary driving signal ADS.

Referring to FIG. 15, the touch driving circuit 160 according to the embodiments of the present disclosure may further include a driving signal generation unit 1530.

The driving signal generation unit 1530 may generate an internal auxiliary driving signal ADS_IN having substantially the same signal characteristics as the second touch driving signal TDS2 based on an input reference driving signal DS_REF input from the outside (e.g., a touch controller 170, etc.) and output the internal auxiliary driving signal ADS_IN as an auxiliary driving signal ADS.

The auxiliary driving signal output unit 1540 may supply the auxiliary driving signal ADS generated by the driving signal generation unit 1530 to a touch electrode (e.g., non-sensing touch electrode) among a plurality of touch electrodes to which the second touch driving signal TDS2 is not applied during the second touch sensing mode period Tt2.

Referring to FIG. 15, the touch driving circuit 160 according to the embodiments of the present disclosure may further include a binding circuit 1550 which controls an electrical connection between a plurality of first touch electrodes TEL and an electrical connection between a plurality of second touch electrodes TE2.

The binding circuit 1550 may electrically separate a plurality of first touch electrodes TEL and electrically separate a plurality of second touch electrodes TE2 during a first touch sensing mode period Tt1.

The binding circuit 1550 may electrically connect two or more first touch electrodes TE1 to which the second touch driving signal TDS2 is simultaneously applied among the plurality of first touch electrodes TE1 during the second touch sensing mode period Tt2, or may electrically connect two or more second touch electrodes TE2 to which the second touch driving signal TDS2 is simultaneously applied among the plurality of second touch electrodes TE2.

By using the binding circuit 1550, during the first touch sensing mode period Tt1, the plurality of first touch electrodes TE1 may be electrically separated, and the plurality of second touch electrodes TE2 may be electrically separated.

Accordingly, during the first touch sensing mode period Tt1, the first touch driving signal TDS1 may be applied to at least one of the plurality of first touch electrodes TE1 or at least one of the plurality of second touch electrodes TE2.

By using the binding circuit 1550, during the second touch sensing mode period Tt2, two or more first touch electrodes TE1 among the plurality of first touch electrodes TE1 may be electrically connected to each other, or two or more second touch electrodes TE2 among the plurality of second touch electrodes TE2 may be electrically connected to each other.

Accordingly, during the second touch sensing mode period Tt2, the second touch driving signal TDS2 may be applied to two or more first touch electrodes TE1 among the plurality of first touch electrodes TE1, or to two or more second touch electrodes TE2 among the plurality of second touch electrodes TE2.

The first touch sensing mode period Tt1 may be a contact mode period for sensing a contact touch that has contacted a screen, and the second touch sensing mode period Tt2 may be a hover mode period for sensing a non-contact touch (e.g., hover touch) that has not contacted the screen.

Referring to FIG. 15, the display controller 140 may output a first mode control signal MCS1 to the touch controller 170 in order to inform the touch controller 170 of the driving timing related to the display operation.

For example, the first mode control signal MCS1 may be a vertical synchronization signal VSYNC for defining a display frame time. The second mode control signal MCS2 may be a hover enable signal HOVER_EN for enabling the hover mode. The auxiliary driving control signal ADCS may be a signal for controlling the auxiliary driving method, and may also be referred to as a hover sensing signal HOVER_SEN.

Hereinafter, it will be described the first mode control signal MCS1, the second mode control signal MCS2, and the auxiliary driving control signal ADCS in more detail, and it will be described a method for controlling the driving timing according to the first mode control signal MCS1, the second mode control signal MCS2 and the auxiliary driving control signal ADCS.

Figure 16:
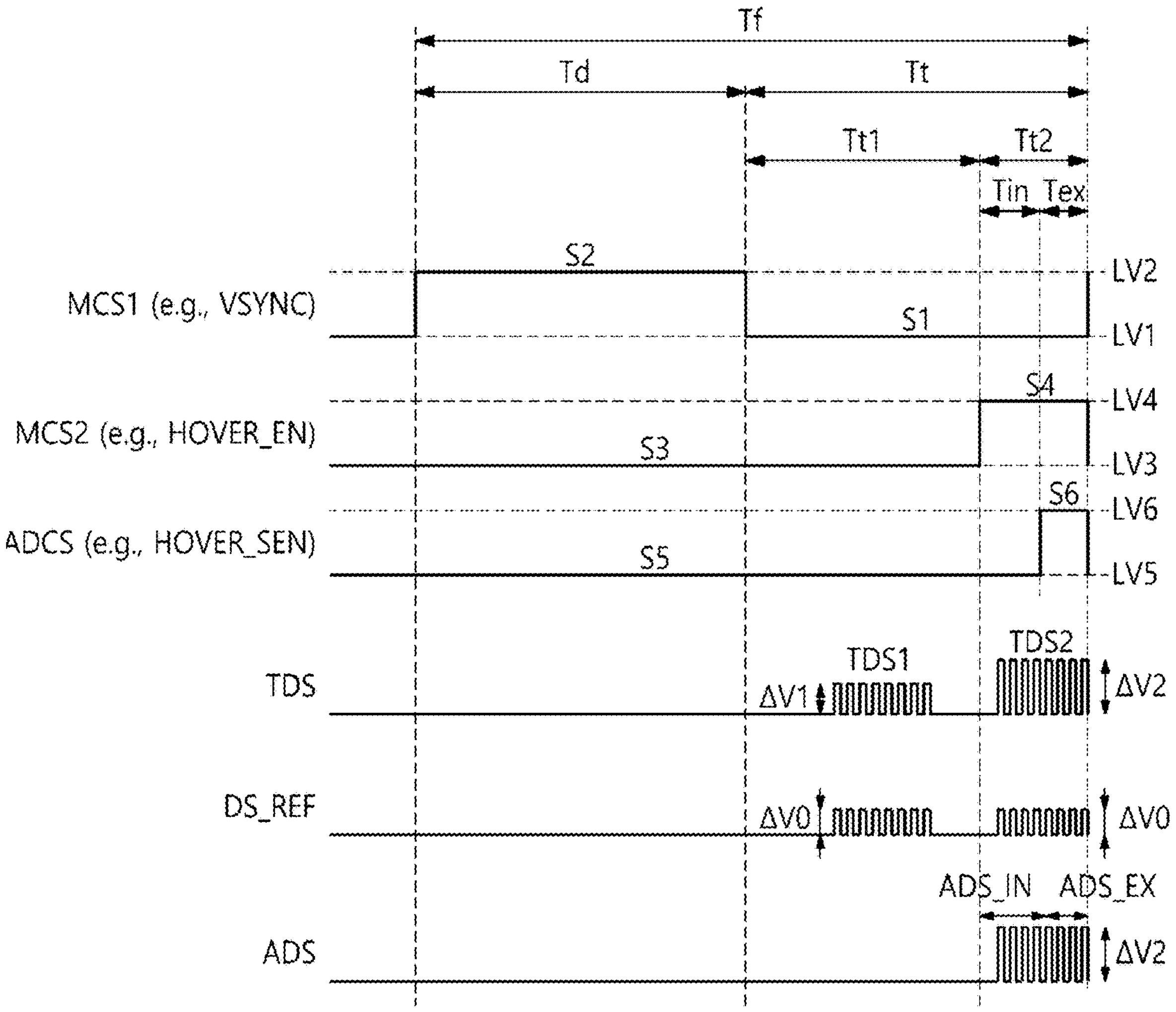
FIGS. 16 to 18 illustrate driving timing diagrams of a touch display device according to embodiments of the present disclosure.
Figure 17:
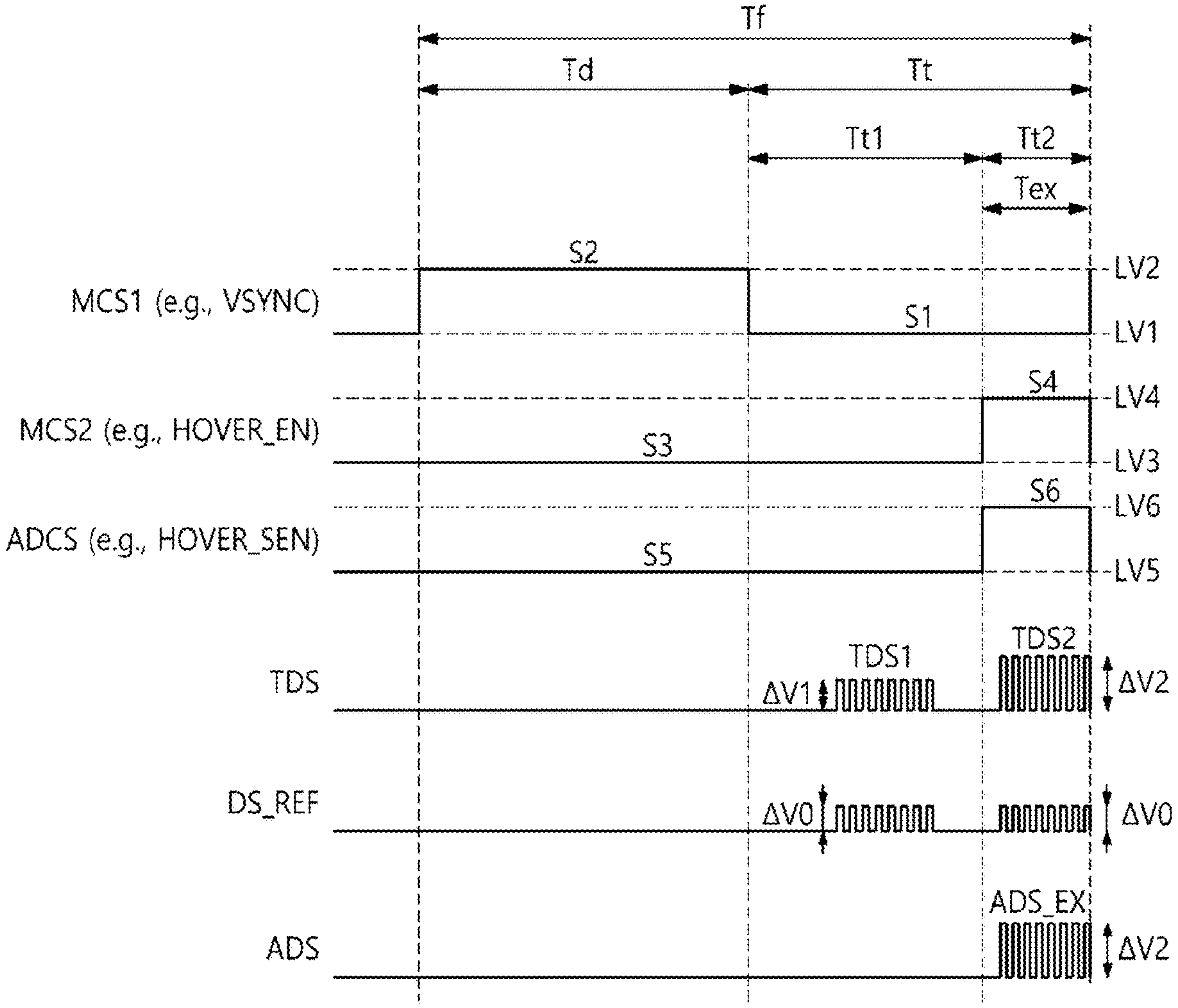
Figure 18:
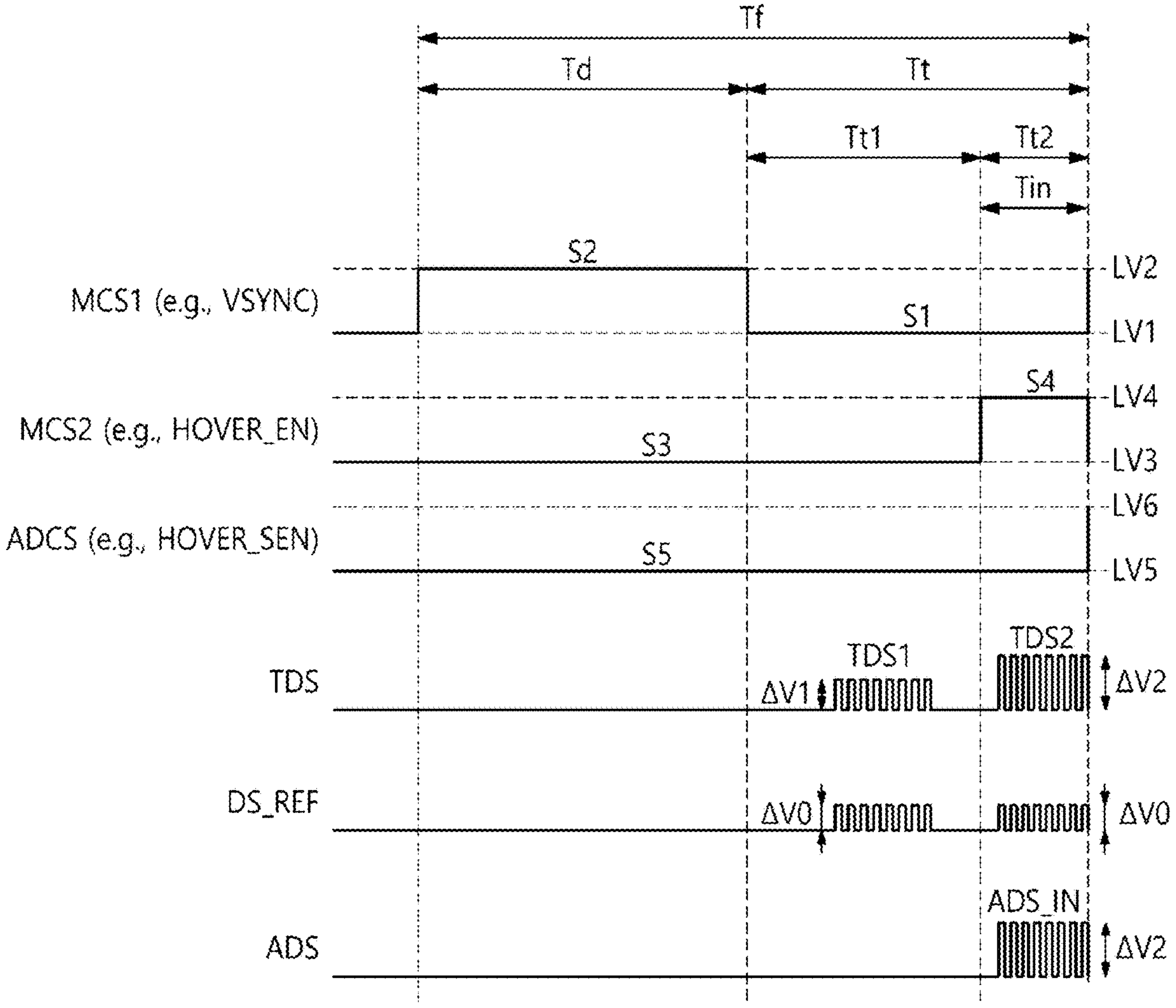

FIGS. 16 to 18 illustrate driving timing diagrams of a touch display device 100 according to embodiments of the present disclosure.

Referring to FIGS. 16 to 18, the touch display device 100 according to the embodiments of the present disclosure may utilize a first mode control signal MCS1, a second mode control signal MCS2, and an auxiliary driving control signal ADCS to control the operation timing.

Referring to FIGS. 16 to 18, an operating period of the touch display device 100 according to the embodiments of the present disclosure may include a display mode period Td for displaying an image, and a touch sensing mode period Tt including a first touch sensing mode period Tt1 and a second touch sensing mode period Tt2.

Referring to FIGS. 16 to 18, the display mode period Td may be a period during which the touch display device 100 operates in the display mode, and the touch sensing mode period Tt may be a period during which the touch display device 100 operates in the touch sensing mode.

Referring to FIGS. 16 to 18, the display mode period Td, the first touch sensing mode period Tt1 and the second touch sensing mode period Tt2 may be defined by the first mode control signal MCS1 and the second mode control signal MCS2 having different signal waveforms.

Referring to FIGS. 16 to 18, the first mode control signal MCS1 may include a first signal section S1 having a first level voltage LV1 and a second signal section S2 having a second level voltage LV2 different from the first level voltage LV1. For example, the first mode control signal MCS1 may include a first signal section S1 having a first level voltage LV1 during the touch sensing mode period Tt and a second signal section S2 having a second level voltage LV2 different from the first level voltage LV1 during the display mode period Td.

Referring to FIGS. 16 to 18, the second mode control signal MCS2 may include a third signal section S3 having a third level voltage LV3 and a fourth signal section S4 having a fourth level voltage LV4 different from the third level voltage LV3. For example, the second mode control signal MCS2 may include a third signal section S3 having a third level voltage LV3 during the display mode period Td and the first touch sensing mode period Tt1 and a fourth signal section S4 having a fourth level voltage LV4 different from the third level voltage LV3 during the second touch sensing mode period Tt2.

Referring to FIGS. 16 to 18, the auxiliary driving control signal ADCS may include at least one of a fifth signal section S5 having a fifth level voltage LV5 and a sixth signal section S6 having a sixth level voltage LV6 different from the fifth level voltage LV5.

Referring to FIGS. 16 to 18, during the display mode period Td, the first mode control signal MCS1 may have a second level voltage LV2, and the second mode control signal MCS2 may have a third level voltage LV3.

During the display mode period Td, each of the touch driving signal TDS, the reference driving signal DS_REF, and the auxiliary driving signal ADS may be a DC voltage having a constant voltage level.

Referring to FIGS. 16 to 18, during the first touch sensing mode period Tt1, the first mode control signal MCS1 may have a first level voltage LV1, and the second mode control signal MCS2 may have a third level voltage LV3.

During the first touch sensing mode period Tt1, each of the touch driving signal TDS and the reference driving signal DS_REF may be voltages whose voltage levels fluctuate or swing according to a predetermined frequency.

During the first touch sensing mode period Tt1, the reference driving signal DS_REF may have a reference amplitude ΔV0, and the touch driving signal TDS may be a first touch driving signal TDS1 having a first amplitude ΔV1. Here, the first amplitude ΔV1 may be equal to or different from the reference amplitude ΔV0. For example, the first amplitude ΔV1 may be greater than the reference amplitude ΔV0.

During the first touch sensing mode period Tt1, the auxiliary driving signal ADS may be a DC voltage having a constant voltage level.

Referring to FIGS. 16 to 18, during the second touch sensing mode period Tt2, the first mode control signal MCS1 may have a first level voltage LV1, and the second mode control signal MCS2 may have a fourth level voltage LV4.

During the second touch sensing mode period Tt2, each of the touch driving signal TDS, the reference driving signal DS_REF, and the auxiliary driving signal ADS may be voltages whose voltage levels fluctuate or swing according to a predetermined frequency.

During the second touch sensing mode period Tt2, the reference driving signal DS_REF may have a reference amplitude ΔV0, the touch driving signal TDS may be a second touch driving signal TDS2 having a second amplitude ΔV2, and the auxiliary driving signal ADS may have a second amplitude ΔV2.

Here, the second amplitude signal DS_REF may have a reference amplitude ΔV0, the touch driving signal TDS may be a second touch driving signal TDS2 having a second amplitude example, the second amplitude ΔV2 may be greater than the reference amplitude ΔV0.

Referring to FIGS. 16 to 18, during the second touch sensing mode period Tt2, the auxiliary driving control signal ADCS may include at least one of a fifth signal section S5 having a fifth level voltage LV5 and a sixth signal section S6 having a sixth level voltage LV6.

Referring to FIG. 16, the second touch sensing mode period Tt2 may include an internal driving period Tin and an external driving period Tex.

During the internal driving period Tin, the auxiliary driving control signal ADCS may be a fifth signal section S5 having a fifth level voltage LV5, and the auxiliary driving signal ADS may be an internal auxiliary driving signal ADS_IN.

During the external driving period Tex, the auxiliary driving control signal ADCS may be a sixth signal section S6 having a sixth level voltage LV6, and the auxiliary driving signal ADS may be an external auxiliary driving signal ADS_EX.

Specifically, the auxiliary driving control signal ADCS may be a fifth signal section S5 having a fifth level voltage LV5 during the display mode period Td, the first touch sensing mode period Tt1 and the internal driving period Tin, and the auxiliary driving signal ADS may be an internal auxiliary driving signal ADS_IN during the external driving period Tex.

As a modified example of FIG. 16, the second touch sensing mode period Tt2 may include an internal driving period Tin and an external driving period Tex, and may further include at least one internal driving period Tin and/or at least one external driving period Tex.

Referring to FIG. 17, the second touch sensing mode period Tt2 may include an external driving period Tex.

During the external driving period Tex, the auxiliary driving control signal ADCS may include a sixth signal section S6 having a sixth level voltage LV6, and the auxiliary driving signal ADS may be an external auxiliary driving signal ADS_EX.

For example, the auxiliary driving control signal ADCS may include a fifth signal section S5 having a fifth level voltage LV5 during the display mode period Td and the first touch sensing mode period Tt1 and a sixth signal section S6 having a sixth level voltage LV6 during the ternal driving period Tex.

Referring to FIG. 18, the second touch sensing mode period Tt2 may include an internal driving period Tin.

During the internal driving period Tin, the auxiliary driving control signal ADCS may include a fifth signal section S5 having a fifth level voltage LV5, and the auxiliary driving signal ADS may be an internal auxiliary driving signal ADS_IN.

For example, the auxiliary driving control signal ADCS may include a fifth signal section S5 having a fifth level voltage LV5 during the display mode period Td, the first touch sensing mode period Tt1 and the internal driving period Tin.

Referring to FIG. 16 and FIG. 18, in the second touch sensing mode period Tt2, when the auxiliary driving control signal ADCS is the fifth signal section S5, the auxiliary driving signal ADS may be an internal auxiliary driving signal ADS_IN.

Referring to FIG. 16 and FIG. 17, in the second touch sensing mode period Tt2, when the auxiliary driving control signal ADCS is the sixth signal section S6, the auxiliary driving signal ADS may be an external auxiliary driving signal ADS_EX.

Figure 19:
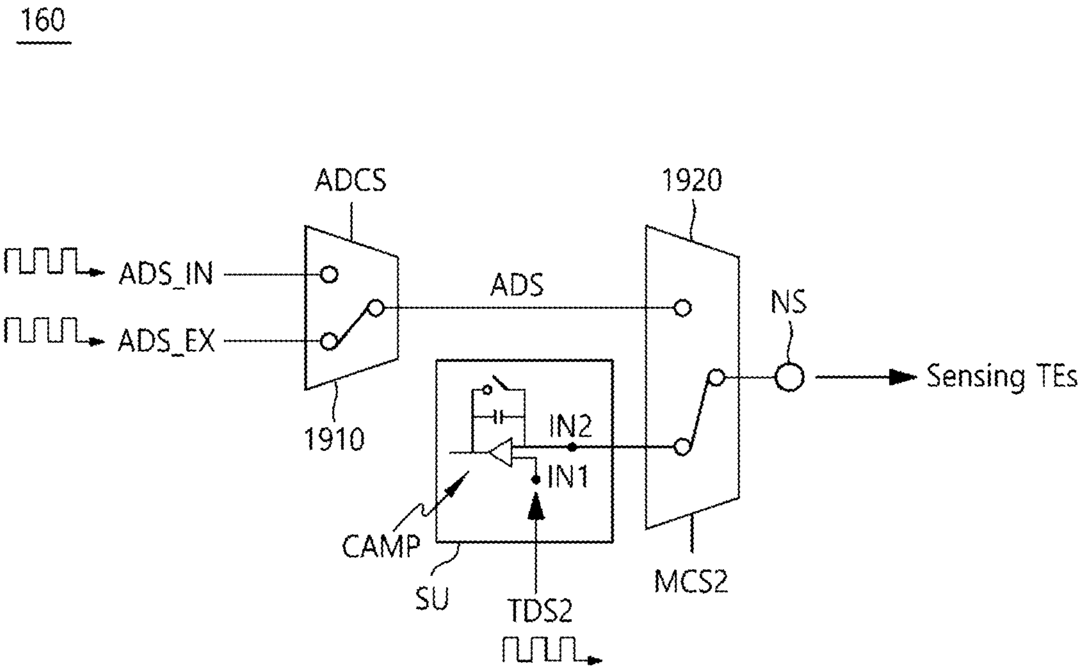
FIGS. 19 to 21 illustrate signal output structures of a touch driving circuit according to embodiments of the present disclosure.
Figure 20:
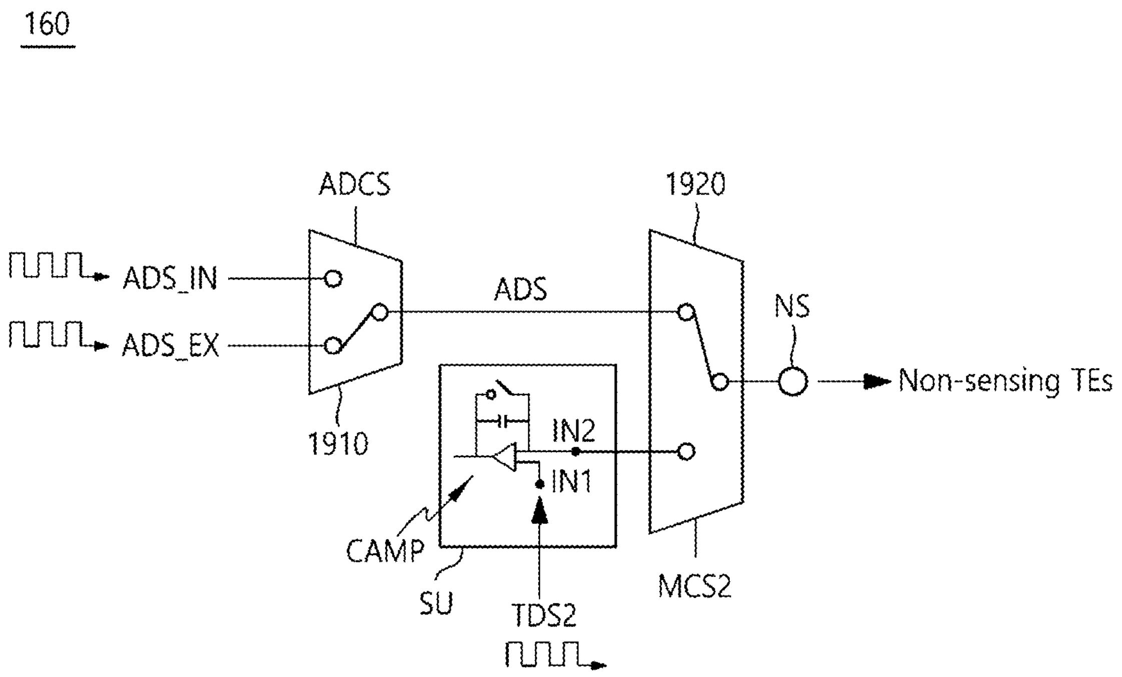
Figure 21:
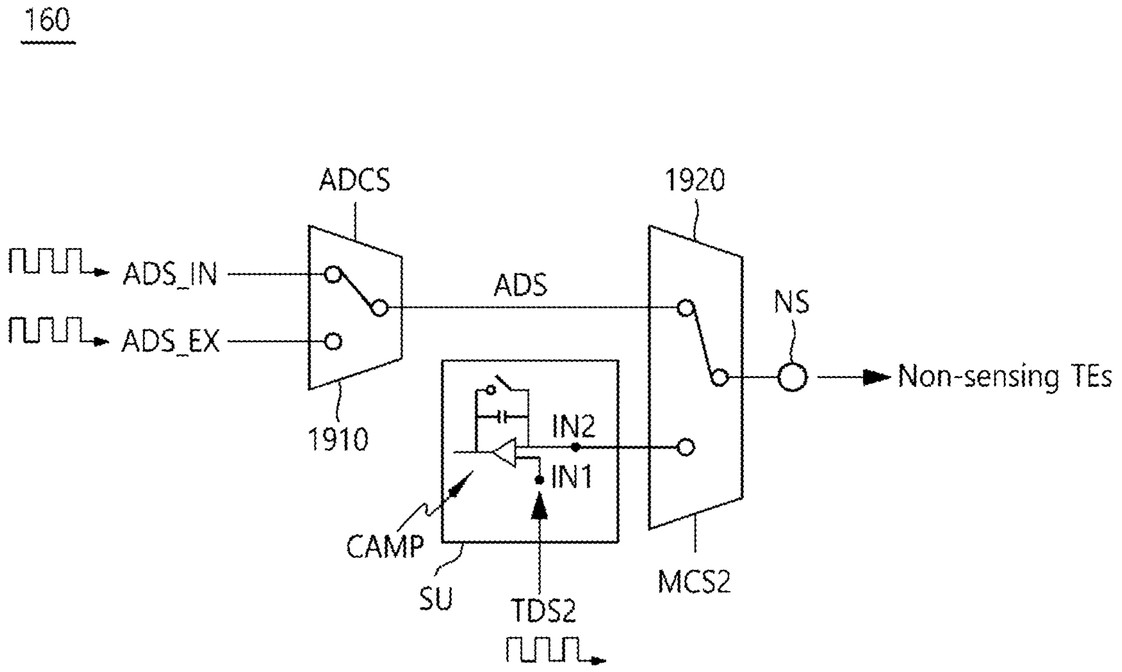

FIG. 19 to FIG. 21 illustrate a signal output structure of a touch driving circuit 160 according to embodiments of the present disclosure. In the following description, there are also referred to FIG. 15 to FIG. 18.

FIG. 19 illustrates a signal output structure for supplying a second touch driving signal TDS2 to sensing touch electrodes (e.g., Sensing TEs) during a second touch sensing mode period Tt2, FIG. 20 illustrates a signal output structure for supplying an external auxiliary driving signal ADS_EX as an auxiliary driving signal ADS to non-sensing touch electrodes (e.g., Non-sensing TEs) during a second touch sensing mode period Tt2, and FIG. 21 illustrates a signal output structure for supplying an internal auxiliary driving signal ADS_IN as an auxiliary driving signal ADS to non-sensing touch electrodes (e.g., Non-sensing TEs) during a second touch sensing mode period Tt2.

Referring to FIGS. 19 to 21, the signal output structure of the touch driving circuit 160 according to the embodiments of the present disclosure may include a first selector 1910 (e.g., a circuit) for outputting one of the external auxiliary driving signal ADS_EX and the internal auxiliary driving signal ADS_IN as the auxiliary driving signal ADS, and a second selector 1920 (e.g., a circuit) for outputting one of the auxiliary driving signal ADS and the second touch driving signal TDS2 to a signal output node NS. The first selector 1910 can be configured to receive the external auxiliary driving signal ADS_EX and the internal auxiliary driving signal ADS_IN and output one of the external auxiliary driving signal ADS_EX and the internal auxiliary driving signal ADS_IN as the auxiliary driving signal ADS.

The signal output node NS may be electrically connected to two or more first touch electrodes TE1 among the plurality of first touch electrodes TEL or two or more second touch electrodes TE2 among the plurality of second touch electrodes TE2.

That is, the second selector 1920 may be configured to output one of the auxiliary driving signal ADS and the second touch driving signal TDS2 to two or more first touch electrodes TE1 among the plurality of first touch electrodes or two or more second touch electrodes TE2 among the plurality of second touch electrodes.

Referring to FIGS. 19 to 21, the first selector 1910 may select and output one of an internal auxiliary driving signal ADS_IN generated within the touch driving circuit 160 and an external auxiliary driving signal ADS_EX input from the outside of the touch driving circuit 160 as the auxiliary driving signal ADS based on an auxiliary driving control signal ADCS.

The second selector 1920 may be configured to receive the auxiliary driving signal ADS and the second touch driving signal TDS2 and output one of the auxiliary driving signal ADS and the second touch driving signal TDS2 to the signal output node NS.

Referring to FIGS. 19 to 21, the second selector 1920 may select and output one of an auxiliary driving signal ADS output from the first selector 1910 and a second touch driving signal TDS2 output from a sensing unit SU to the signal output node NS.

Referring to FIG. 19, during the second touch sensing mode period Tt2, if the second selector 1920 selects the second touch driving signal TDS2 output from the sensing unit SU and outputs the second touch driving signal TDS2 to the signal output node NS, the second touch driving signal TDS2 output from the second selector 1920 may be supplied to a sensing binding group electrically connected to the signal output node NS. Here, the sensing touch electrodes included in the sensing binding group may be electrically connected to each other by the binding circuit 1550.

During the second touch sensing mode period Tt2, since self-sensing is performed, the second touch driving signal TDS2 input to a first input node IN1 of a charge amplifier CAMP in the sensing unit SU may be output to a second input node IN2. The second touch driving signal TDS2 output to the second input node IN2 of the charge amplifier CAMP may be supplied to sensing touch electrodes which are included in the sensing binding group and are electrically connected to each other through the second selector 1920.

Referring to FIG. 20 and FIG. 21, during the second touch sensing mode period Tt2, if the second selector 1920 selects and output the auxiliary driving signal ADS output from the first selector 1910 to the signal output node NS, the auxiliary driving signal ADS output from the second selector 1920 may be supplied to the non-sensing binding group electrically connected to the signal output node NS. Here, the non-sensing touch electrodes included in the non-sensing binding group may be electrically connected to each other by the binding circuit 1550.

Referring to FIG. 20, the first selector 1910 may output the external auxiliary driving signal ADS_EX among the internal auxiliary driving signal ADS_IN and the external auxiliary driving signal ADS_EX as the auxiliary driving signal ADS if the input auxiliary driving control signal ADCS has the sixth level voltage LV6 defining the external driving.

Referring to FIG. 21, the first selector 1910 may output the internal auxiliary driving signal ADS_IN among the internal auxiliary driving signal ADS_IN and the external auxiliary driving signal ADS_EX as the auxiliary driving signal ADS if the input auxiliary driving control signal ADCS has the fifth level voltage LV5 defining the internal driving.

Referring to FIGS. 19 to 21, each of the first selector 1910 and the second selector 1920 may be configured as a switching circuit or a multiplexer.

As described above, the touch display device 100 according to the embodiments of the present disclosure may perform self-sensing during the second touch sensing mode period Tt2, and may effectively and quickly sense a non-contact touch by expanding the sensing area through binding processing for a plurality of first touch electrodes TE1 and a plurality of second touch electrodes TE2, and may prevent the formation of unnecessary parasitic capacitance through auxiliary driving, thereby improving the sensing performance.

Hereinafter, it will be described various examples of the operation of the touch display device 100 according to the embodiments of the present disclosure during the second touch sensing mode period Tt2 with reference to FIGS. 22 to 27.

FIGS. 22 to 27 illustrate examples of driving operations of a touch display device 100 according to embodiments of the present disclosure. However, in FIGS. 22 to 27, a plurality of touch electrodes TE may be bound as in FIG. 12. In the following description, there is also referred to FIG. 15.

Referring to FIGS. 22 to 27, a plurality of first touch electrodes TE1 may include N first touch electrodes such as six first touch electrodes TE1_1 to TE1_6, and a plurality of second touch electrodes TE2 may include M second touch electrodes such as nine second touch electrodes TE2_1 to TE2_9. N may be a natural number greater than or equal to 2, and M may be a natural number greater than or equal to 2.

Referring to FIGS. 22 to 27, the touch display device 100 according to the embodiments of the present disclosure may perform binding processing on N first touch electrodes TE1_1 to TE1_6 and M second touch electrodes TE2_1 to TE2_9 using the binding circuit 1550 during the second touch sensing mode period Tt2.

Referring to FIGS. 22 to 27, the binding circuit 1550 in the touch driving circuit 160 may perform binding processing to bind N first touch electrodes TE1_1 to TE1_6 by Peach to form H horizontal binding groups BG1_1 and BG1_2, and bind M second touch electrodes TE2_1 to TE2_9 by Q each to form V vertical binding groups BG2_1, BG2_2 and BG2_3.

N may be a natural number greater than or equal to 2, M may be a natural number greater than or equal to 2, P may be a natural number greater than or equal to 2, Q may be a natural number greater than or equal to 2, H may be N/P, and V may be M/Q. Hereinafter, there is exemplified a case where N is 6, M is 9, P is 3, Q is 3, H=2, and V=3 (i.e., N=6, M=9, P=3, Q=3, H=2, V=3).

By performing binding processing to expand one sensing area during the second touch sensing mode period Tt2, a non-contact touch (e.g., hover touch) may be sensed efficiently and quickly using the self-sensing method during the second touch sensing mode period Tt2.

Referring to FIGS. 22 to 27, during the second touch sensing mode period Tt2, when performing self-sensing (e.g., touch driving and sensing processing) for at least one binding group (e.g., sensing binding group) among two horizontal binding groups BG1_1 and BG1_2 and three vertical binding groups BG2_1, BG2_2 and BG2_3, there may be performed an auxiliary driving for at least one remaining binding group (e.g., non-sensing binding group).

By performing auxiliary driving during the second touch sensing mode period Tt2, when sensing a non-contact touch (e.g., hover touch) in a self-sensing method, a formation of unnecessary parasitic capacitance may be prevented or at least reduced, thereby improving sensing performance.

The touch driving circuit 160 of the touch display device 100 according to embodiments of the present disclosure may include a binding circuit 1550 which performs binding processing during the second touch sensing mode period Tt2.

The binding circuit 1550 may control an electrical connection between six first touch electrodes E1_1 to TE1_6 and an electrical connection between nine second touch electrodes TE2_1 to TE2_9.

The binding circuit 1550 may include a first binding circuit 2210 for controlling an electrical connection between six first touch electrodes TE1_1 to TE1_6, and a second binding circuit 2220 for controlling an electrical connection between nine second touch electrodes TE2_1 to TE2_9.

The first binding circuit 2210 may electrically separate the six first touch electrodes TE1_1 to TE1_6 during the first touch sensing mode period Tt1, and may bind the six first touch electrodes TE1_1 to TE1_6 in groups of three during the second touch sensing mode period Tt2) to form two horizontal binding groups BG1_1 and BG1_2, without being limited thereto.

The second binding circuit 2220 may electrically separate nine second touch electrodes TE2_1 to TE2_9 during the first touch sensing mode period Tt1, and may bind the nine second touch electrodes TE2_1 to TE2_9 in groups of three during the second touch sensing mode period Tt2 to form three vertical binding groups BG2_1, BG2_2 and BG2_3, without being limited thereto.

During the second touch sensing mode period Tt2, a second touch driving signal TDS2 or an auxiliary driving signal ADS may be applied to each of two horizontal binding groups BG1_1 and BG1_2 formed from six first touch electrodes TE1_1 to TE1_6 by the first binding circuit 2210.

During the second touch sensing mode period Tt2, a second touch driving signal TDS2 or an auxiliary driving signal ADS may be applied to each of three vertical binding groups BG2_1, BG2_2 and BG2_3 formed from nine second touch electrodes TE2_1 to TE2_9 by the second binding circuit 2220.

During the second touch sensing mode period Tt2, a second touch driving signal TDS2 may be applied to at least one binding group among five binding groups BG1_1, BG1_2, BG2_1, BG2_2 and BG2_3 including two horizontal binding groups BG1_1 and BG1_2 and three vertical binding groups BG2_1, BG2_2 and BG2_3, and an auxiliary driving signal ADS may be applied to the remaining binding groups.

Referring to FIGS. 22 to 27, the first binding circuit 2210 may include six horizontal switches ST1 to ST6 each connected to six first touch electrodes TE1_1 to TE1_6, and five (i.e., N−1=5) horizontal binding switches BT1 to BT5 connected between two adjacent first touch electrodes among the six first touch electrodes TE1_1 to TE1_6.

The six horizontal switches ST1 to ST6 may control a connection between six first touch electrodes TE1_1 to TE1_6 and six horizontal signal output nodes NS1.

For example, among five horizontal binding switches BT1 to BT5, the first and second horizontal binding switches BT1 and BT2 may be turned on, so that three first touch electrodes TE1_1, TE1_2 and TE1_3 may be bound (i.e., electrically connected) to form a first horizontal binding group BG1_1. Among five horizontal binding switches BT1 to BT5, the fourth and fifth horizontal binding switches BT4 and BT5 may be turned on, so that three other first touch electrodes TE1_4, TE1_5 and TE1_6 may be bound (i.e., electrically connected) to form a second horizontal binding group BG1_2.

In this case, if the third horizontal binding switch BT3 is turned off, the first horizontal binding group BG1_1 and the second horizontal binding group BG1_2 may be electrically separated.

In this case, there is required to apply a separate second touch driving signal TDS2 or a separate auxiliary driving signal ADS to each of the first horizontal binding group BG1_1 and the second horizontal binding group BG1_2.

Accordingly, one of the first to third horizontal switches ST1 to ST3 among the six horizontal switches ST1 to ST6 may be turned on and the remaining two of the first to third horizontal switches ST1 to ST3 may be turned off, and the second touch driving signal TDS2 or the auxiliary driving signal ADS may be applied to the first horizontal binding group BG1_1 through the one horizontal switch that is turned on. In addition, among the six horizontal switches ST1 to ST6, one of the fourth to sixth horizontal switches ST4 to ST6 may be turned on and the remaining two may be turned off, and the second touch driving signal TDS2 or the auxiliary driving signal ADS may be applied to the first horizontal binding group BG1_1 through the one horizontal switch that is turned on.

As another example, all five horizontal binding switches BT1 to BT5 may be turned on, and all six first touch electrodes TE1_1 to TE1_6 may be bound (i.e., electrically connected), so that there may be formed an extended horizontal binding group including both the first horizontal binding group BG1_1 and the second horizontal binding group BG1_2.

In this case, there is required to apply a separate second touch driving signal TDS2 or a separate auxiliary driving signal ADS to the extended horizontal binding group.

To this end, one of the six horizontal switches ST1 to ST6 may be turned on and the remaining five may be turned off, so that the second touch driving signal TDS2 or the auxiliary driving signal ADS may be applied to the extended horizontal binding group through the one horizontal switch that is turned on.

Referring to FIGS. 22 to 27, the second binding circuit 2220 may include nine vertical switches SR1 to SR9 each connected to nine second touch electrodes TE2_1 to TE2_9, and eight (i.e., M−1=8) vertical binding switches BR1 to BR8 connected between two adjacent second touch electrodes among the nine second touch electrodes TE2_1 to TE2_9.

The nine vertical switches SR1 to SR9 may control the connection between nine second touch electrodes TE2_1 to TE2_9 and nine vertical signal output nodes NS2.

For example, the first and second vertical binding switches BR1 and BR2 of the nine vertical switches SR1 to SR9 may bind or electrically connect three second touch electrodes TE2_1, TE2_2 and TE2_3, the fourth and fifth vertical binding switches BR4 and BR5 of the nine vertical switches SR1 to SR9 may bind or electrically connect three second touch electrodes TE2_4, TE2_5 and TE2_6, and the seventh and eighth vertical binding switches BR7 and BR8 of the nine vertical switches SR1 to SR9 may bind or electrically connect three second touch electrodes TE2_7, TE2_8 and TE2_9, without being limited thereto.

For example, among the eight vertical binding switches BR1 to BR8, the first and second vertical binding switches BR1 and BR2 may be turned on, and three second touch electrodes TE2_1, TE2_2 and TE2_3 may be bound or electrically connected to form a first vertical binding group BG2_1. Among the eight vertical binding switches BR1 to BR8, the fourth and fifth vertical binding switches BR4 and BR5 may be turned on, and three other second touch electrodes TE2_4, TE2_5 and TE2_6 may be bound or electrically connected to form a second vertical binding group BG2_2. Among the eight vertical binding switches BR1 to BR8, the seventh and eighth vertical binding switches BR7 and BR8 may be turned on, and the other three second touch electrodes TE2_7, TE2_8 and TE2_9 may be bound or electrically connected to form a third vertical binding group BG2_3.

In this case, if a third vertical binding switch BT3 and a sixth vertical binding switch BT6 may be turned off, and the first vertical binding group BG2_1, the second vertical binding group BG2_2, and the third vertical binding group BG2_3 may be electrically separated.

In this case, there is required to apply a separate second touch driving signal TDS2 or a separate auxiliary driving signal ADS to each of the first vertical binding group BG2_1, the second vertical binding group BG2_2, and the third vertical binding group BG2_3. As one example, the nine vertical switches SR1 to SR9 can be configured to apply a second touch driving signal TDS2 or an auxiliary driving signal ADS to the first vertical binding group BG2_1, the second vertical binding group BG2_2, or the third vertical binding group BG2_3.

To this end, among the nine vertical switches SR1 to SR9, one of the first to third vertical switches SR1 to SR3 may be turned on and the remaining two may be turned off, so that a second touch driving signal TDS2 or an auxiliary driving signal ADS may be applied to the first vertical binding group BG2_1 through the one vertical switch that is turned on. In addition, among the nine vertical switches SR1 to SR9, one of the fourth to sixth vertical switches SR4 to SR6 may be turned on and the remaining two may be turned off, so that a second touch driving signal TDS2 or an auxiliary driving signal ADS may be applied to the second vertical binding group BG2_2 through the one vertical switch that is turned on. In addition, among the nine vertical switches SR1 to SR9, one of the seventh to ninth vertical switches SR7 to SR9 may be turned on and the remaining two may be turned off, and a second touch driving signal TDS2 or an auxiliary driving signal ADS may be applied to the third vertical binding group BG2_3 through the one vertical switch that is turned on.

As another example, all eight vertical binding switches BR1 to BR8 may be turned on, and all nine second touch electrodes TE2_1 to TE2_9 may be bound or electrically connected, so that there may be configured an extended vertical binding group including all of the first vertical binding group BG2_1, the second vertical binding group BG2_2, and the third vertical binding group BG2_3.

In this case, it is required to apply a separate second touch driving signal TDS2 or a separate auxiliary driving signal ADS to the extended vertical binding group.

To this end, one of the nine vertical switches SR1 to SR9 may be turned on and the remaining five may be turned off, and the second touch driving signal TDS2 or auxiliary driving signal ADS may be applied to the extended vertical binding group through the one vertical switch that is turned on.

Referring to FIGS. 22 to 27, among five binding groups BG1_1, BG1_2, BG2_1, BG2_2 and BG2_3 including two horizontal binding groups BG1_1 and BG1_2 and three vertical binding groups BG2_1, BG2_2 and BG2_3, sensing may be performed for at least one binding group (i.e., sensing binding group).

In addition, among the five binding groups BG1_1, BG1_2, BG2_1, BG2_2 and BG2_3, auxiliary driving may be performed for the remaining binding groups except for the binding group for which sensing is performed.

During the second touch sensing mode period Tt2, sensing for one binding group may include an operation in which two or more touch electrodes included in one binding group are bound, an operation in which two or more touch electrodes included in one binding group are commonly connected to a second input node N2 of one charge amplifier CAMP included in one sensing unit SU, an operation in which a second touch driving signal TDS2 input to a first input node IN1 of one charge amplifier CAMP is commonly applied to two or more touch electrodes included in one binding group through the second input node IN2, and an operation (e.g., sensing operation) in which one charge amplifier CAMP detects a signal with two or more touch electrodes included in one binding group.

During the second touch sensing mode period Tt2, the auxiliary driving for one binding group may include an operation in which two or more touch electrodes included in one binding group are bound, and an operation in which two or more touch electrodes included in one binding group are commonly applied with an auxiliary driving signal ADS.

Hereinafter, it will be described various examples of performing binding processing and auxiliary driving when performing touch driving in a self-sensing manner in more detail.

Figure 22:
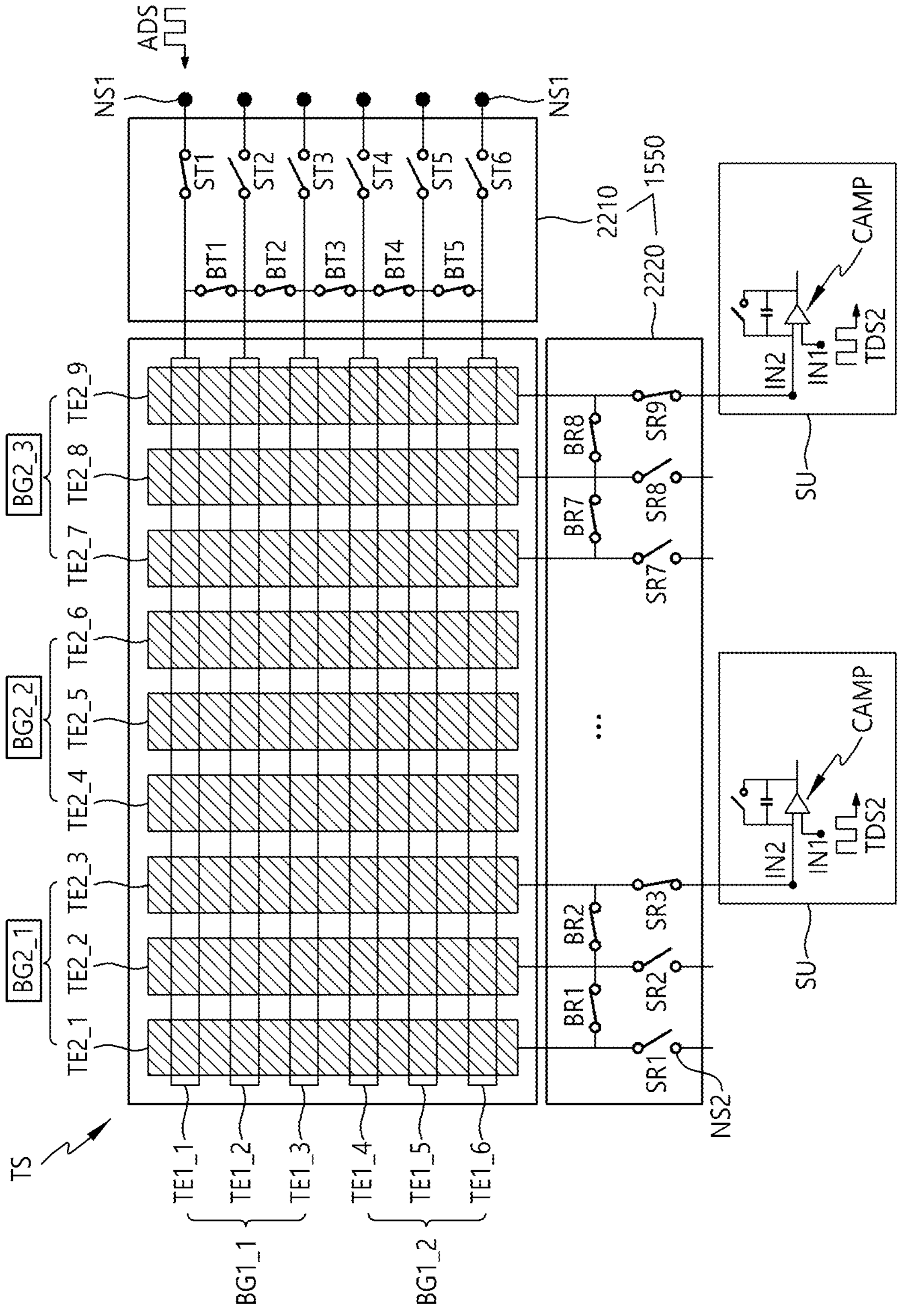
FIGS. 22 to 27 illustrate driving operation examples of a touch display device according to embodiments of the present disclosure.

Referring to FIG. 22, sensing may be performed for each of three vertical binding groups BG2_1, BG2_2 and BG2_3, and auxiliary driving may be performed for an extended horizontal binding group including two horizontal binding groups BG1_1 and BG1_2.

Figure 23:
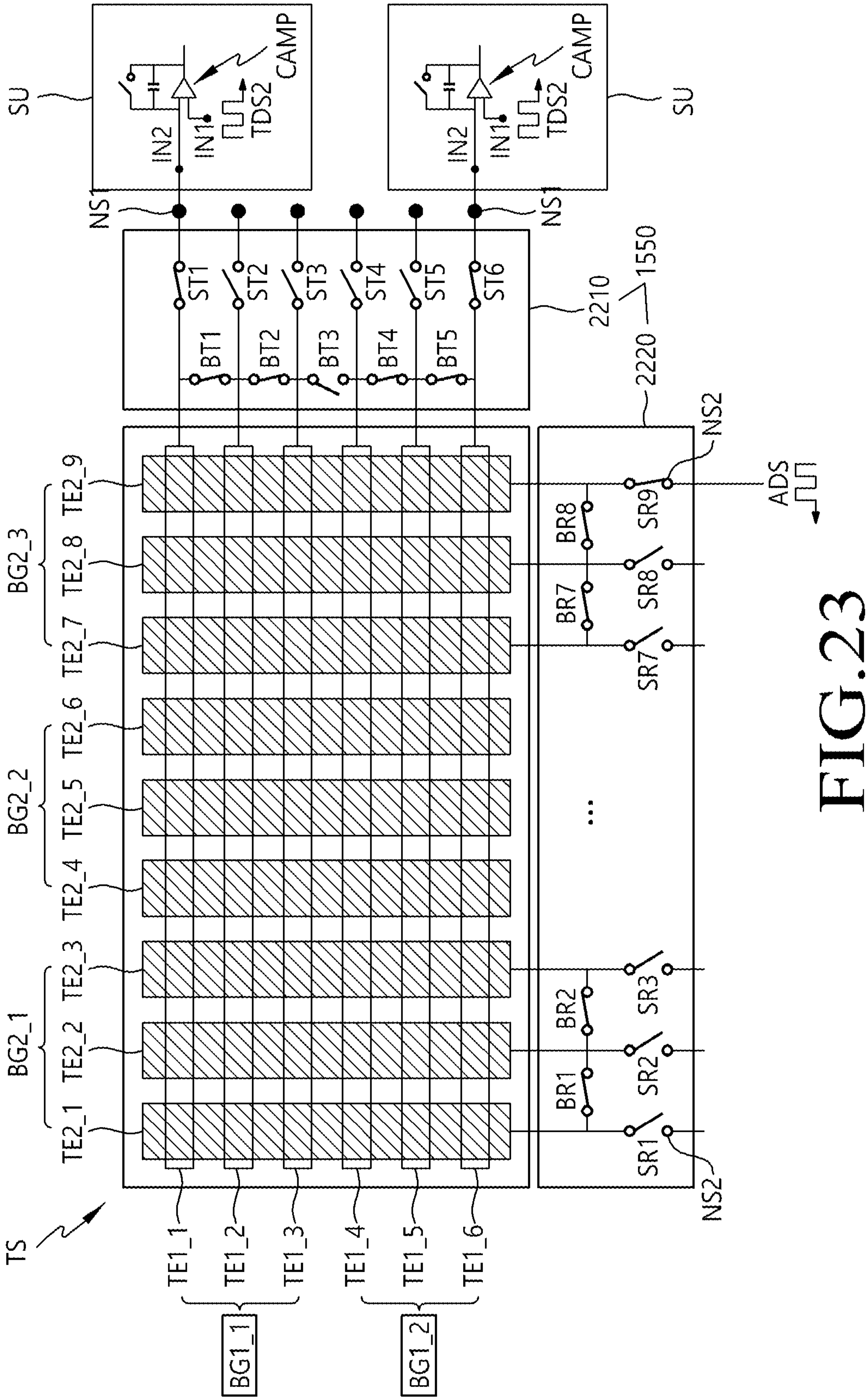

Referring to FIG. 23, sensing may be performed for each of the two horizontal binding groups BG1_1 and BG1_2, and auxiliary driving may be performed for an extended vertical binding group including three vertical binding groups BG2_1, BG2_2 and BG2_3.

Figure 24:
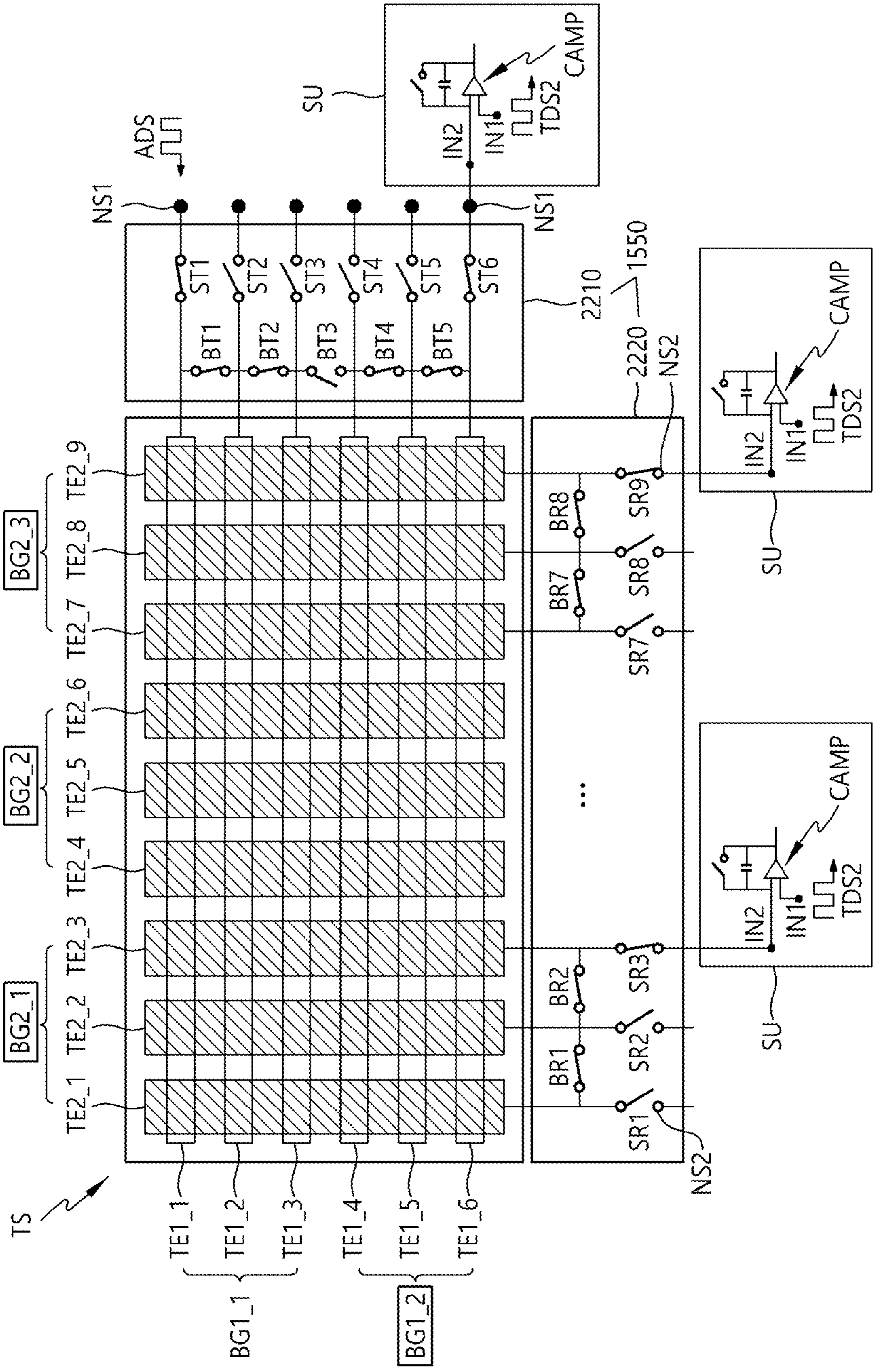

Referring to FIG. 24, sensing may be performed for each of the three vertical binding groups BG2_1, BG2_2 and BG2_3, sensing may be performed for a second horizontal binding group BG1_2 among the two horizontal binding groups BG1_1 and BG1_2, and auxiliary driving may be performed for a first horizontal binding group BG1_1 among the two horizontal binding groups BG1_1 and BG1_2.

Figure 25:
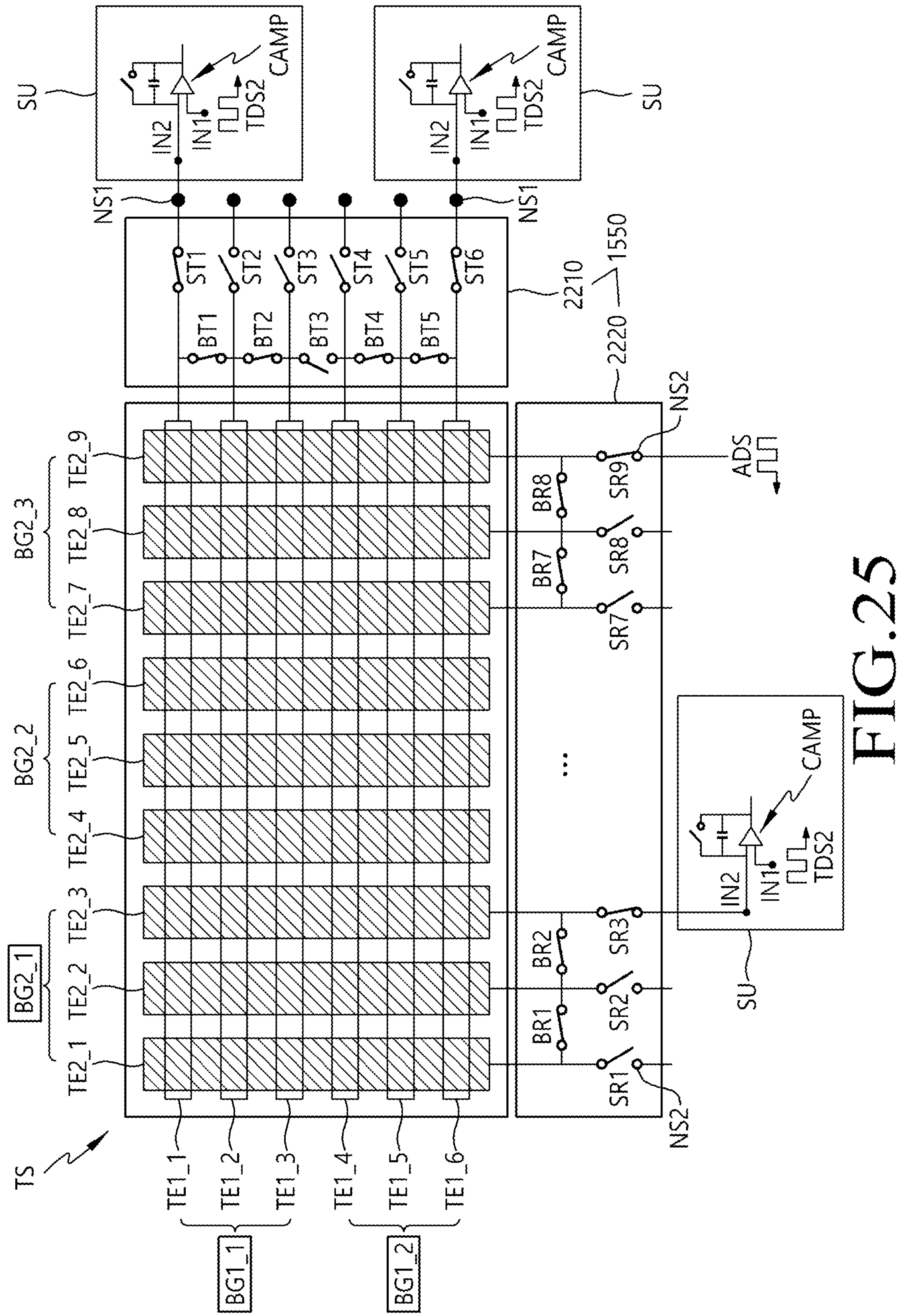

Referring to FIG. 25, sensing may be performed for each of the two horizontal binding groups BG1_1 and BG1_2, sensing may be performed for a first vertical binding group BG2_1 among the three vertical binding groups BG2_1, BG2_2 and BG2_3, and auxiliary driving may be performed for a second and third vertical binding groups BG2_2 and BG2_3 among the three vertical binding groups BG2_1, BG2_2 and BG2_3.

Figure 26:
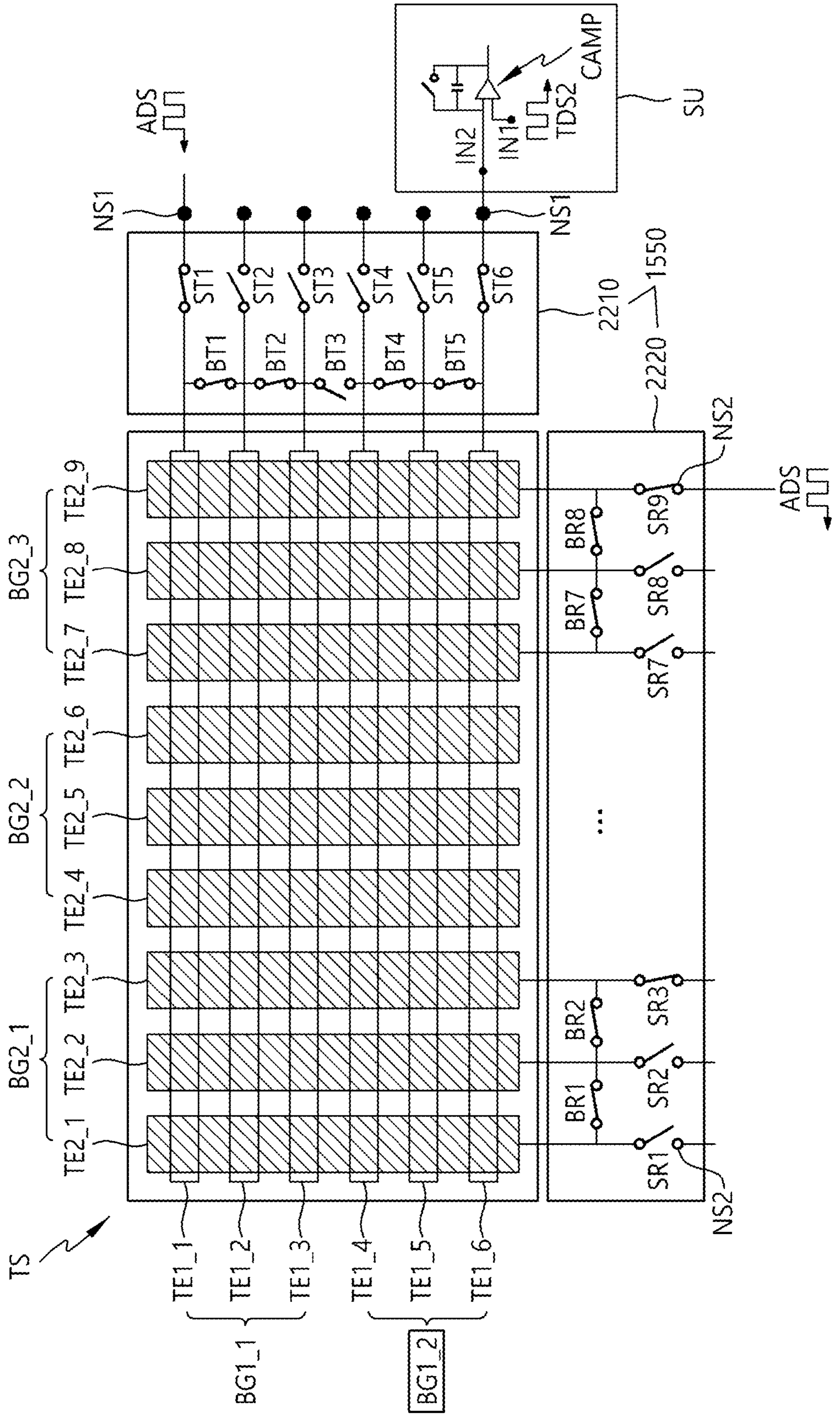

Referring to FIG. 26, sensing may be performed for a second horizontal binding group BG1_2 among two horizontal binding groups BG1_1 and BG1_2, auxiliary driving may be performed for a first horizontal binding group BG1_1 among two horizontal binding groups BG1_1 and BG1_2, and auxiliary driving may be performed for an extended vertical binding group including three vertical binding groups BG2_1, BG2_2 and BG2_3.

Figure 27:
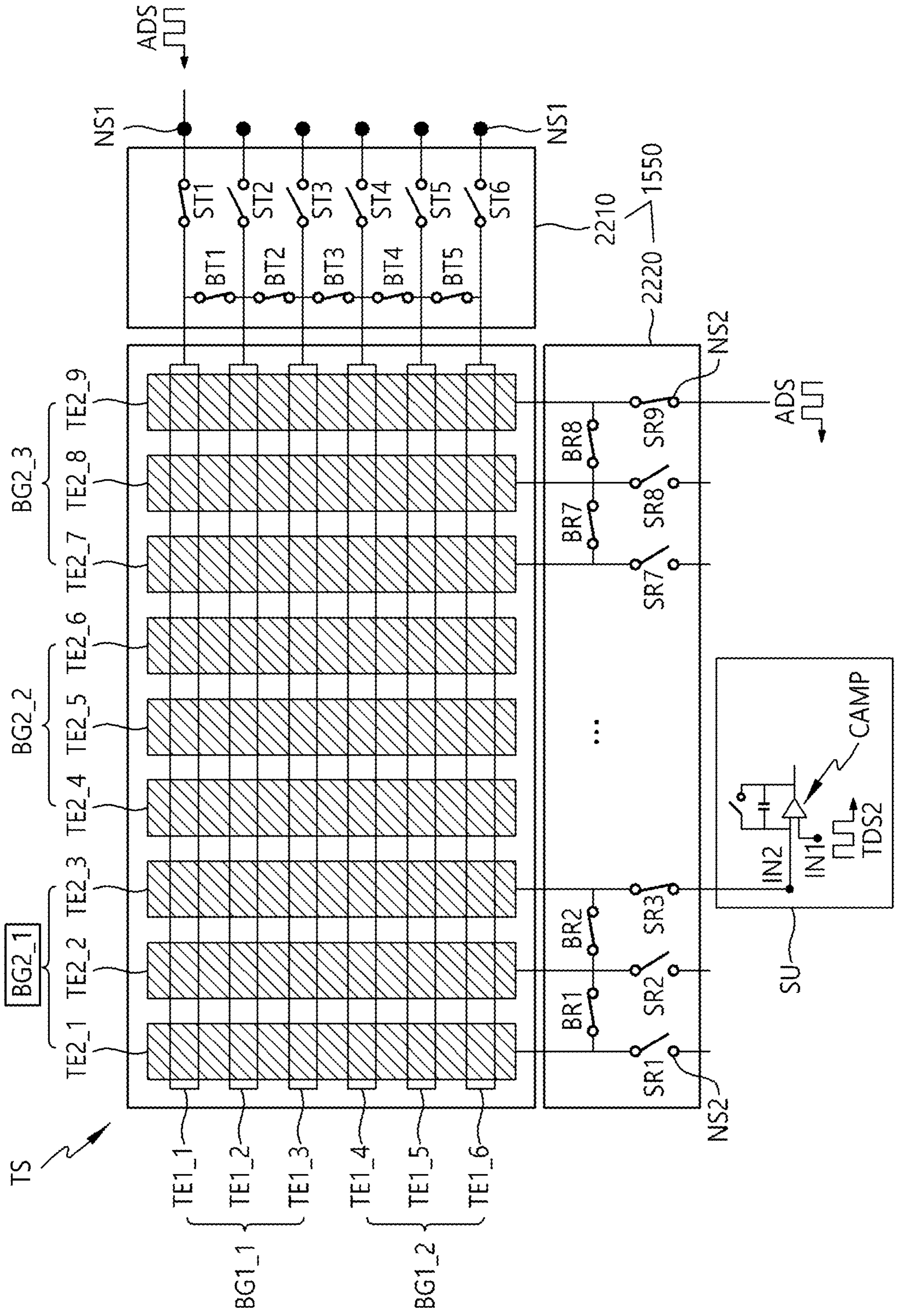

Referring to FIG. 27, sensing may be performed for a first vertical binding group BG2_1 among three vertical binding groups BG2_1, BG2_2 and BG2_3, auxiliary driving may be performed for the second and third vertical binding groups BG2_2 and BG2_3 among three vertical binding groups BG2_1, BG2_2 and BG2_3, and auxiliary driving may be performed for an extended horizontal binding group including two horizontal binding groups BG1_1 and BG1_2.

Embodiments of the present disclosure described above are briefly described as follows.

A touch display device according to the embodiments of the present disclosure may include a touch sensor including a plurality of first touch electrodes and a plurality of second touch electrodes, and a touch driving circuit configured to supply a touch driving signal to the touch sensor during a touch sensing mode period.

The touch sensing mode period may include a first touch sensing mode period in which a first touch driving signal is applied to the touch sensor as the touch driving signal, and a second touch sensing mode period in which a second touch driving signal is applied to the touch sensor as the touch driving signal.

During the first touch sensing mode period, the first touch driving signal may include first pulses having a first amplitude, and during the second touch sensing mode period, the second touch driving signal may include second pulses having a second amplitude.

The second amplitude may be different from the first amplitude, or the number of the second pulses may be different from the number of the first pulses. For example, the second amplitude may be greater than the first amplitude, or the number of the second pulses may be greater than the number of the first pulses.

During the second touch sensing mode period, the touch driving circuit may supply the second touch driving signal to a part of the touch sensor and supply an auxiliary driving signal to another part of the touch sensor.

The touch driving circuit may output an external auxiliary driving signal input from the outside as the auxiliary driving signal. In this case, the external auxiliary driving signal and the second touch driving signal may have the same phase.

The touch driving circuit may generate an internal auxiliary driving signal based on a reference driving signal input from the outside and output the internal auxiliary driving signal as the auxiliary driving signal. In this case, the internal auxiliary driving signal and the second touch driving signal may have the same phase.

During the first touch sensing mode period, the plurality of first touch electrodes may be electrically separated and the plurality of second touch electrodes may be electrically separated, During the second touch sensing mode period, two or more first touch electrodes among the plurality of first touch electrodes may be electrically connected to each other, or two or more second touch electrodes among the plurality of second touch electrodes may be electrically connected to each other.

During the first touch sensing mode period, the first touch driving signal may be applied to at least one of the plurality of first touch electrodes or at least one of the plurality of second touch electrodes.

During the second touch sensing mode period, the second touch driving signal may be applied commonly to two or more first touch electrodes among the plurality of first touch electrodes, or may be applied commonly to two or more second touch electrodes among the plurality of second touch electrodes.

The first touch sensing mode period may be a contact mode period for sensing a contact touch that has contacted a screen, and the second touch sensing mode period may be a hover mode period for sensing a non-contact touch that has not contacted the screen.

The second touch sensing mode period may include a first sub-sensing period in which the second touch driving signal is simultaneously applied to two or more first touch electrodes which are electrically connected to each other among the plurality of first touch electrodes, and a second sub-sensing period in which the second touch driving signal is simultaneously applied to two or more second touch electrodes which are electrically connected to each other among the plurality of second touch electrodes.

During the first sub-sensing period, the touch driving circuit may supply the auxiliary driving signal to the remaining first touch electrodes excluding the two or more first touch electrodes or the plurality of second touch electrodes.

During the second sub-sensing period, the touch driving circuit may supply the auxiliary driving signal to the remaining second touch electrodes excluding the two or more second touch electrodes or the plurality of first touch electrodes.

An operating period of the touch display device may include a display mode period for displaying an image, and a touch sensing mode period including the first touch sensing mode period and the second touch sensing mode period, The display mode period, the first touch sensing mode period, and the second touch sensing mode period may be defined by a first mode control signal and a second mode control signal having different signal waveforms.

The first mode control signal may include a first signal section having a first level voltage and a second signal section having a second level voltage different from the first level voltage.

The second mode control signal may include a third signal section having a third level voltage and a fourth signal section having a fourth level voltage different from the third level voltage.

During the display mode period, the first mode control signal may have the second level voltage, and the second mode control signal may have the third level voltage.

During the first touch sensing mode period, the first mode control signal may have the first level voltage, and the second mode control signal may have the third level voltage.

During the second touch sensing mode period, the first mode control signal may have the first level voltage, and the second mode control signal may have the fourth level voltage.

The touch display device according to the embodiments of the present disclosure may further include a touch controller for receiving the first mode control signal and output a reference driving signal and the second mode control signal.

The touch driving circuit may receive the reference driving signal and the second mode control signal, and may output the touch driving signal and the auxiliary driving signal according to the reference driving signal and the second mode control signal.

The touch display device according to the embodiments of the present disclosure may further include a display controller for outputting the first mode control signal to the touch controller.

The first mode control signal may be a vertical synchronization signal for defining a display frame time, and the second mode control signal may be a hover enable signal for enabling a hover mode.

The touch display device according to the embodiments of the present disclosure may further include a touch power circuit for outputting an external auxiliary driving signal.

The touch driving circuit may further receive an auxiliary driving control signal from the touch controller.

The touch driving circuit may output the external auxiliary driving signal as the auxiliary driving signal according to the auxiliary driving control signal, or generate and output an internal auxiliary driving signal based on the reference driving signal as the auxiliary driving signal.

During the second touch sensing mode period, the auxiliary driving control signal may include at least one of a fifth signal section having a fifth level voltage and a sixth signal section having a sixth level voltage different from the fifth level voltage.

During the second touch sensing mode period, when the auxiliary driving control signal is in the fifth signal section, the auxiliary driving signal may be the internal auxiliary driving signal.

During the second touch sensing mode period, when the auxiliary driving control signal is in the sixth signal section, the auxiliary driving signal may be the external auxiliary driving signal.

The touch driving circuit may include a first selector which outputs one of the internal auxiliary driving signal and the external auxiliary driving signal as the auxiliary driving signal, and a second selector which outputs one of the auxiliary driving signal and the second touch driving signal to two or more first touch electrodes among the plurality of first touch electrodes or two or more second touch electrodes among the plurality of second touch electrodes.

The plurality of first touch electrodes may include N first touch electrodes, the plurality of second touch electrodes may include M second touch electrodes. Here, N may be a natural number greater than or equal to 2, and M may be a natural number greater than or equal to 2.

The touch display device according to the embodiments of the present disclosure may further include a first binding circuit for binding the N first touch electrodes by P units to form H horizontal binding groups during the second touch sensing mode period, and a second binding circuit for binding the M second touch electrodes by Q units to form V vertical binding groups during the second touch sensing mode period.

The P may be a natural number greater than or equal to 2, the Q may be a natural number greater than or equal to 2, the H may be N/P, and the V may be M/Q.

The first binding circuit and the second binding circuit may be included in the touch driving circuit.

During the second touch sensing mode period, the second touch driving signal may be applied to at least one binding group among the (H+V) binding groups including the H horizontal binding groups and the V vertical binding groups, and the auxiliary driving signal may be applied to the remaining binding groups.

The first binding circuit may include N horizontal switches each connected to the N first touch electrodes, and (N−1) horizontal binding switches connected between two adjacent first touch electrodes among the N first touch electrodes.

The second binding circuit may include M vertical switches each connected to the M second touch electrodes, and (M−1) vertical binding switches connected between two adjacent second touch electrodes among the M second touch electrodes.

A touch driving circuit according to the embodiments of the present disclosure may include a first touch driving signal output unit configured to supply a first touch driving signal to each of the plurality of first touch electrodes during a first touch sensing mode period, a sensing unit configured to supply a second touch driving signal to two or more touch electrodes among the plurality of touch electrodes during a second touch sensing mode period, and an auxiliary driving signal output unit configured to supply, during the second touch sensing mode period, an auxiliary driving signal to two or more touch electrodes to which the second touch driving signal is not applied among the plurality of touch electrodes.

The touch driving circuit according to the embodiments of the present disclosure may further include a binding circuit for controlling an electrical connection between the plurality of first touch electrodes and an electrical connection between the plurality of second touch electrodes.

The binding circuit may electrically separate the plurality of first touch electrodes and electrically separate the plurality of second touch electrodes during the first touch sensing mode.

During the second touch sensing mode period, the binding circuit may electrically connect two or more first touch electrodes to which the second touch driving signal is simultaneously applied among the plurality of first touch electrodes, or may electrically connect two or more second touch electrodes to which the second touch driving signal is simultaneously applied among the plurality of second touch electrodes.

A touch display device according to the embodiments of the present disclosure may include a touch sensor including a plurality of first touch electrodes and a plurality of second touch electrodes, and a touch driving circuit configured to supply a touch driving signal to the touch sensor during a touch sensing mode period.

The touch sensing mode period may include a first touch sensing mode period in which a first touch driving signal having a first amplitude is applied to the touch sensor as the touch driving signal, and a second touch sensing mode period in which a second touch driving signal having a second amplitude greater than the first amplitude is applied to the touch sensor as the touch driving signal.

During the second touch sensing mode period, the touch driving circuit may supply the second touch driving signal to a part of the touch sensor and supply an auxiliary driving signal to another part of the touch sensor.

According to embodiments of the present disclosure as described above, it is possible to provide a touch display device and a touch driving circuit capable of supporting various touch sensing modes.

According to embodiments of the present disclosure, it is possible to provide a touch display device and a touch driving circuit capable of efficiently sensing contact touch and non-contact touch.

According to embodiments of the present disclosure, it is possible to provide a touch display device and a touch driving circuit capable of effectively and quickly sensing non-contact touch.

According to embodiments of the present disclosure, it is possible to provide a touch display device and a touch driving circuit capable of efficiently supporting a display mode, a contact touch sensing mode, and a hover touch sensing mode.

According to embodiments of the present disclosure, it is possible to provide a touch display device and a touch driving circuit capable of preventing unwanted parasitic capacitance from occurring when sensing non-contact touch.

According to embodiments of the present disclosure, it is possible to provide a touch display device and a touch driving circuit capable of efficiently driving a non-sensing touch electrode (e.g., auxiliary driving) when sensing non-contact touch.

According to embodiments of the present disclosure, it is possible to efficiently perform a display driving, a contact touch sensing, and a hover touch sensing in terms of driving time, thereby enabling low-power driving.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

What is claimed is:

1. A touch display device comprising:

a touch sensor including a plurality of first touch electrodes and a plurality of second touch electrodes; and a touch driving circuit configured to supply a touch driving signal to the touch sensor during a touch sensing mode period, wherein the touch sensing mode period comprises:

a first touch sensing mode period in which a first touch driving signal is applied to the touch sensor as the touch driving signal, and a second touch sensing mode period in which a second touch driving signal is applied to the touch sensor as the touch driving signal, wherein, during the second touch sensing mode period, the touch driving circuit supplies the second touch driving signal to a part of the touch sensor and supplies an auxiliary driving signal to another part of the touch sensor, and wherein the second touch sensing mode period is a self-sensing mode period, and wherein the second touch sensing mode period includes:

a first sub-sensing period in which the second touch driving signal is simultaneously applied to two or more first touch electrodes that are electrically connected to each other among the plurality of first touch electrodes, and a second sub-sensing period in which the second touch driving signal is simultaneously applied to two or more second touch electrodes that are electrically connected to each other among the plurality of second touch electrodes, wherein, during the first sub-sensing period, the touch driving circuit supplies the auxiliary driving signal to remaining first touch electrodes excluding the two or more first touch electrodes or the plurality of second touch electrodes, and wherein, during the second sub-sensing period, the touch driving circuit supplies the auxiliary driving signal to remaining second touch electrodes excluding the two or more second touch electrodes or the plurality of first touch electrodes.

2. The touch display device of claim 1, wherein the touch driving circuit outputs an external auxiliary driving signal input from outside as the auxiliary driving signal, and the external auxiliary driving signal and the second touch driving signal have a same phase.

3. The touch display device of claim 1, wherein the touch driving circuit generates an internal auxiliary driving signal based on a reference driving signal input from outside and outputs the internal auxiliary driving signal as the auxiliary driving signal, and the internal auxiliary driving signal and the second touch driving signal have a same phase.

4. The touch display device of claim 1, wherein, during the first touch sensing mode period, the plurality of first touch electrodes are electrically separated and the plurality of second touch electrodes are electrically separated, wherein, during the second touch sensing mode period, two or more first touch electrodes among the plurality of first touch electrodes are electrically connected to each other, or two or more second touch electrodes among the plurality of second touch electrodes are electrically connected to each other.

5. The touch display device of claim 1, wherein, during the first touch sensing mode period, the first touch driving signal is applied to at least one of the plurality of first touch electrodes or at least one of the plurality of second touch electrodes, wherein, during the second touch sensing mode period, the second touch driving signal is applied commonly to two or more first touch electrodes among the plurality of first touch electrodes, or is applied commonly to two or more second touch electrodes among the plurality of second touch electrodes.

6. The touch display device of claim 1, wherein the first touch sensing mode period is a contact mode period during which a contact touch that has contacted a screen is sensed, and the second touch sensing mode period is a hover mode period during which a non-contact touch that has not contacted the screen is sensed, wherein the first touch driving signal includes first pulses having a first amplitude during the first touch sensing mode period, and the second touch driving signal includes second pulses having a second amplitude during the second touch sensing mode period, wherein the second amplitude is different from the first amplitude, or a number of the second pulses is different from a number of the first pulses.

7. The touch display device of claim 1, wherein an operating period of the touch display device includes:

a display mode period during which an image is displayed; and a touch sensing mode period including the first touch sensing mode period and the second touch sensing mode period, wherein the display mode period, the first touch sensing mode period, and the second touch sensing mode period are defined by a first mode control signal and a second mode control signal having different signal waveforms.

8. The touch display device of claim 7, wherein the first mode control signal includes a first signal section having a first level voltage and a second signal section having a second level voltage that is different from the first level voltage, wherein the second mode control signal includes a third signal section having a third level voltage and a fourth signal section having a fourth level voltage that is different from the third level voltage, wherein, during the display mode period, the first mode control signal has the second level voltage, and the second mode control signal has the third level voltage, wherein, during the first touch sensing mode period, the first mode control signal has the first level voltage, and the second mode control signal has the third level voltage, wherein, during the second touch sensing mode period, the first mode control signal has the first level voltage, and the second mode control signal has the fourth level voltage.

9. The touch display device of claim 7, further comprising:

a touch controller configured to receive the first mode control signal and output a reference driving signal and the second mode control signal, wherein the touch driving circuit receives the reference driving signal and the second mode control signal, and outputs the touch driving signal and the auxiliary driving signal according to the reference driving signal and the second mode control signal.

10. The touch display device of claim 9, further comprising:

a display controller configured to output the first mode control signal to the touch controller, wherein the first mode control signal is a vertical synchronization signal for defining a display frame time, and the second mode control signal is a hover enable signal for enabling a hover mode.

11. The touch display device of claim 9, further comprising:

a touch power circuit configured to output an external auxiliary driving signal, wherein the touch driving circuit further receives an auxiliary driving control signal from the touch controller, and outputs the external auxiliary driving signal as the auxiliary driving signal according to the auxiliary driving control signal, or generates and outputs an internal auxiliary driving signal based on the reference driving signal as the auxiliary driving signal.

12. The touch display device of claim 11, wherein, during the second touch sensing mode period, the auxiliary driving control signal includes at least one of a fifth signal section having a fifth level voltage and a sixth signal section having a sixth level voltage different from the fifth level voltage.

13. The touch display device of claim 11, wherein the touch driving circuit includes:

a first selector that outputs one of the internal auxiliary driving signal and the external auxiliary driving signal as the auxiliary driving signal; and a second selector that outputs one of the auxiliary driving signal and the second touch driving signal to two or more first touch electrodes among the plurality of first touch electrodes or two or more second touch electrodes among the plurality of second touch electrodes.

14. The touch display device of claim 1, wherein the plurality of first touch electrodes include N first touch electrodes, the plurality of second touch electrodes include M second touch electrodes, where N is a natural number greater than or equal to 2, and M is a natural number greater than or equal to 2, wherein the touch driving circuit further includes:

a first binding circuit configured to bind the N first touch electrodes by P units and form H horizontal binding groups during the second touch sensing mode period; and a second binding circuit configured to bind the M second touch electrodes by Q units and form V vertical binding groups during the second touch sensing mode period, wherein the P is a natural number greater than or equal to 2, the Q is a natural number greater than or equal to 2, the His N/P, and the V is M/Q.

15. The touch display device of claim 14, wherein, during the second touch sensing mode period, the second touch driving signal is applied to at least one binding group among (H+V) binding groups including the H horizontal binding groups and the V vertical binding groups, and the auxiliary driving signal is applied to remaining binding groups.

16. The touch display device of claim 14, wherein the first binding circuit includes:

N horizontal switches each connected to the N first touch electrodes; and (N−1) horizontal binding switches connected between two adjacent first touch electrodes among the N first touch electrodes, wherein the second binding circuit includes:

M vertical switches each connected to the M second touch electrodes; and (M−1) vertical binding switches connected between two adjacent second touch electrodes among the M second touch electrodes.

17. A touch driving circuit for driving a plurality of touch electrodes including a plurality of first touch electrodes and a plurality of second touch electrodes, the touch driving circuit comprising:

a first touch driving signal output circuit configured to supply a first touch driving signal to each of the plurality of first touch electrodes during a first touch sensing mode period;

a sensing circuit configured to supply a second touch driving signal to two or more first touch electrodes or two or more second touch electrodes among the plurality of second touch electrodes among the plurality of touch electrodes during a second touch sensing mode period; and an auxiliary driving signal output circuit configured to supply, during the second touch sensing mode period, an auxiliary driving signal to two or more touch electrodes to which the second touch driving signal is not applied among the plurality of touch electrodes, wherein the second touch sensing mode period is a self-sensing mode period, and wherein the second touch sensing mode period includes:

a first sub-sensing period in which the second touch driving signal is simultaneously applied to two or more first touch electrodes that are electrically connected to each other among the plurality of first touch electrodes, and a second sub-sensing period in which the second touch driving signal is simultaneously applied to two or more second touch electrodes that are electrically connected to each other among the plurality of second touch electrodes, wherein, during the first sub-sensing period, the touch driving circuit supplies the auxiliary driving signal to remaining first touch electrodes excluding the two or more first touch electrodes or the plurality of second touch electrodes, and wherein, during the second sub-sensing period, the touch driving circuit supplies the auxiliary driving signal to remaining second touch electrodes excluding the two or more second touch electrodes or the plurality of first touch electrodes.

18. The touch driving circuit of claim 17, further comprising:

a binding circuit configured to control an electrical connection between the plurality of first touch electrodes and an electrical connection between the plurality of second touch electrodes, wherein, during the second touch sensing mode period, the binding circuit electrically connects two or more first touch electrodes to which the second touch driving signal is simultaneously applied among the plurality of first touch electrodes, or electrically connects two or more second touch electrodes to which the second touch driving signal is simultaneously applied among the plurality of second touch electrodes.

19. A touch display device comprising:

a touch sensor including a plurality of first touch electrodes and a plurality of second touch electrodes; and a touch driving circuit configured to supply a touch driving signal to the touch sensor during a touch sensing mode period, wherein the touch sensing mode period comprises:

a first touch sensing mode period in which a first touch driving signal having a first amplitude is applied to the touch sensor as the touch driving signal, and a second touch sensing mode period in which a second touch driving signal having a second amplitude greater than the first amplitude is applied to the touch sensor as the touch driving signal, wherein, during the second touch sensing mode period, the touch driving circuit supplies the second touch driving signal to a part of the touch sensor and supplies an auxiliary driving signal to another part of the touch sensor, and wherein the second touch sensing mode period is a self-sensing mode period, and wherein the second touch sensing mode period includes:

a first sub-sensing period in which the second touch driving signal is simultaneously applied to two or more first touch electrodes that are electrically connected to each other among the plurality of first touch electrodes, and a second sub-sensing period in which the second touch driving signal is simultaneously applied to two or more second touch electrodes that are electrically connected to each other among the plurality of second touch electrodes, wherein, during the first sub-sensing period, the touch driving circuit supplies the auxiliary driving signal to remaining first touch electrodes excluding the two or more first touch electrodes or the plurality of second touch electrodes, and wherein, during the second sub-sensing period, the touch driving circuit supplies the auxiliary driving signal to remaining second touch electrodes excluding the two or more second touch electrodes or the plurality of first touch electrodes.

* * * * *